United States Patent
Chun et al.

(10) Patent No.: US 10,349,388 B2
(45) Date of Patent: Jul. 9, 2019

(54) METHOD FOR FEEDING BACK CHANNEL STATE IN WIRELESS COMMUNICATION SYSTEM AND DEVICE THEREFOR

(71) Applicant: LG ELECTRONICS INC., Seoul (KR)

(72) Inventors: Jinyoung Chun, Seoul (KR); Kiseon Ryu, Seoul (KR); Jeongki Kim, Seoul (KR); Jinsoo Choi, Seoul (KR); Dongguk Lim, Seoul (KR); Hangyu Cho, Seoul (KR); Jinmin Kim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 15/242,008

(22) Filed: Aug. 19, 2016

(65) Prior Publication Data
US 2017/0079027 A1    Mar. 16, 2017

Related U.S. Application Data

(60) Provisional application No. 62/206,862, filed on Aug. 19, 2015, provisional application No. 62/209,899, (Continued)

(51) Int. Cl.
*H04W 72/04* (2009.01)
*H04W 72/08* (2009.01)
(Continued)

(52) U.S. Cl.
CPC ....... *H04W 72/0413* (2013.01); *H04L 1/0025* (2013.01); *H04L 1/0026* (2013.01);
(Continued)

(58) Field of Classification Search
CPC . H04W 72/0413; H04W 4/70; H04W 72/048; H04W 72/082; H04W 28/10;
(Continued)

(56) References Cited

U.S. PATENT DOCUMENTS

| 8,902,764 B2 | 12/2014 | Imai et al. |
| 2008/0014870 A1* | 1/2008 | Kim ..................... H04B 7/0417 455/69 |

(Continued)

FOREIGN PATENT DOCUMENTS

| WO | 2011108832 | 9/2011 |
| WO | 2015006637 | 1/2015 |

(Continued)

OTHER PUBLICATIONS

PCT International Application No. PCT/KR2016/008207, International Search Report dated Nov. 7, 2016, 3 pages.
(Continued)

*Primary Examiner* — Shailendra Kumar
(74) *Attorney, Agent, or Firm* — Lee, Hong, Degerman, Kang & Waimey

(57) ABSTRACT

Disclosed herein is a sounding method of a station (STA) for sending feedback information about a downlink (DL) channel state in a wireless LAN (WLAN) system. The sounding method includes receiving an NDP announcement (NDPA) frame providing notification of the transmission of a null data packet (NDP) frame; receiving the NDP frame; receiving a trigger frame comprising resource allocation information allocated to the STA; generating feedback information using the NDP frame; and sending a feedback frame comprising feedback information through uplink (UL) multi-user (MU) transmission using a frequency resource indicated by the resource allocation information. The feedback information may be generated in a frequency granularity (Continued)

(FG) unit with respect to a transmission bandwidth having a size smaller than or equal to the size of a transmission bandwidth of the NDP frame.

18 Claims, 40 Drawing Sheets

Related U.S. Application Data filed on Aug. 26, 2015, provisional application No. 62/264,836, filed on Dec. 8, 2015.

(51) Int. Cl.
| | |
|---|---|
| *H04L 5/00* | (2006.01) |
| *H04L 1/00* | (2006.01) |
| *H04W 84/12* | (2009.01) |
| *H04W 28/10* | (2009.01) |
| *H04W 4/70* | (2018.01) |
| *H04L 1/06* | (2006.01) |
| *H04B 7/06* | (2006.01) |
| *H04W 88/08* | (2009.01) |

(52) U.S. Cl.
CPC .......... *H04L 1/0075* (2013.01); *H04L 1/0618* (2013.01); *H04L 5/0023* (2013.01); *H04L 5/0053* (2013.01); *H04W 4/70* (2018.02); *H04W 28/10* (2013.01); *H04W 72/048* (2013.01); *H04W 72/082* (2013.01); *H04W 84/12* (2013.01); *H04B 7/063* (2013.01); *H04B 7/0626* (2013.01); *H04B 7/0639* (2013.01); *H04L 5/0007* (2013.01); *H04L 5/0055* (2013.01); *H04W 88/08* (2013.01)

(58) Field of Classification Search
CPC .... H04W 84/12; H04W 88/08; H04L 5/0053; H04L 5/0023; H04L 5/0007; H04L 1/0026; H04B 7/0639; H04B 7/063; H04B 7/0626
See application file for complete search history.

(56) References Cited

U.S. PATENT DOCUMENTS

| | | |
|---|---|---|
| 2011/0305176 A1 | 12/2011 | Wentink |
| 2013/0188630 A1 | 7/2013 | Song et al. |
| 2013/0223427 A1* | 8/2013 | Sohn, III .............. H04W 74/06 370/338 |
| 2013/0235836 A1 | 9/2013 | Roh et al. |
| 2015/0055525 A1 | 2/2015 | Ma et al. |
| 2015/0131517 A1 | 5/2015 | Chu et al. |
| 2015/0146807 A1 | 5/2015 | Zhang et al. |
| 2016/0165574 A1* | 6/2016 | Chu ..................... H04L 5/0007 370/312 |
| 2016/0227599 A1 | 8/2016 | Lee et al. |
| 2016/0262051 A1* | 9/2016 | Merlin ................. H04L 5/0057 |
| 2016/0366254 A1 | 12/2016 | Asterjadhi et al. |
| 2018/0359761 A1 | 12/2018 | Chun et al. |

FOREIGN PATENT DOCUMENTS

| | | |
|---|---|---|
| WO | 2015016684 | 2/2015 |
| WO | 2015068968 | 5/2015 |
| WO | 2016053024 | 4/2016 |
| WO | 2016090372 | 6/2016 |

OTHER PUBLICATIONS

PCT International Application No. PCT/KR2016/008135, International Search Report dated Nov. 10, 2016, 3 pages.
European Patent Office Application Serial No. 16184653.0, Search Report dated Jan. 4, 2017, 9 pages.
European Patent Office Application Serial No. 16184659.7, Search Report dated Jan. 9, 2017, 9 pages.
Ghosh, et al., "DL Sounding Sequence with UL MU Feedback", doc.: IEEE 802.11-15/1103r0, XP068098340, Sep. 2015, 18 pages.
U.S. Appl. No. 15/241,010, Office Action dated Mar. 22, 2018, 17 pages.
U.S. Appl. No. 15/241,010, Office Action dated Oct. 31, 2018, 18 pages.
U.S. Appl. No. 15/241,010, Notice of Allowance dated Apr. 3, 2019, 9 pages.

* cited by examiner

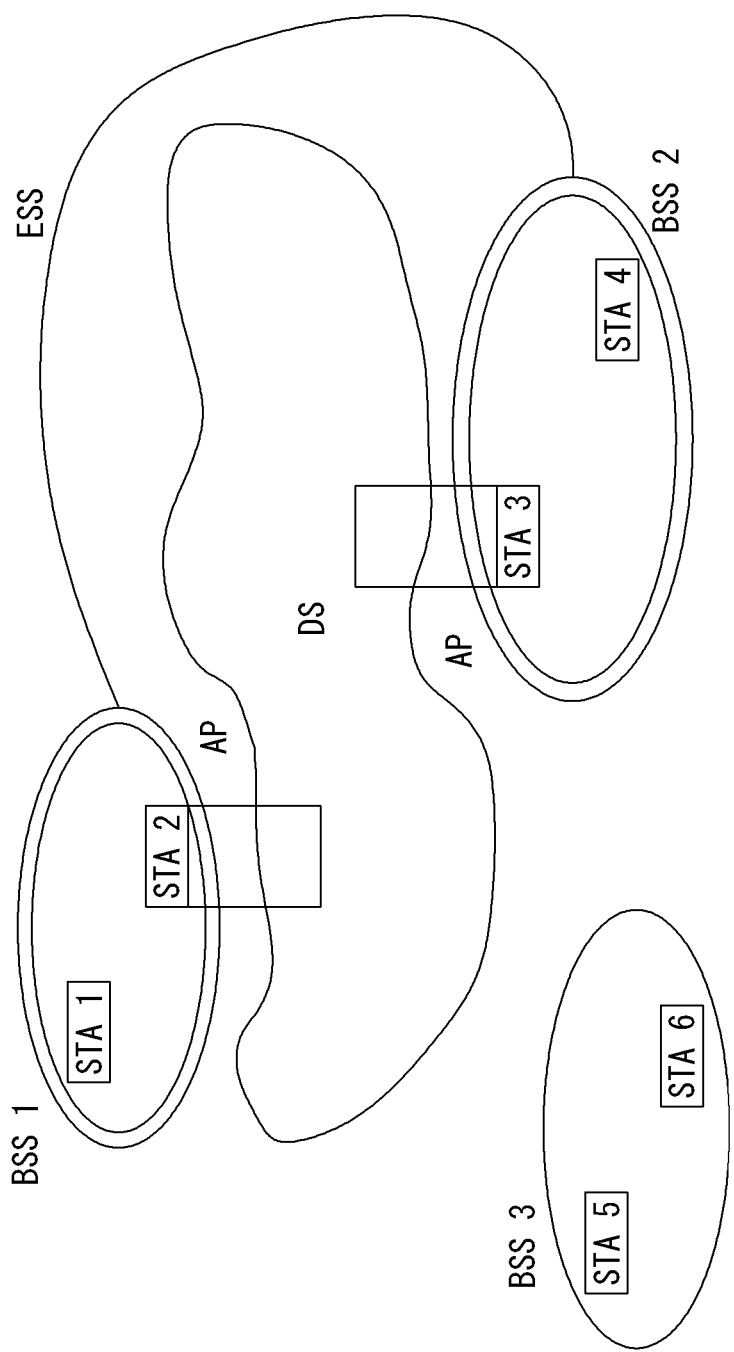
[Fig. 1]

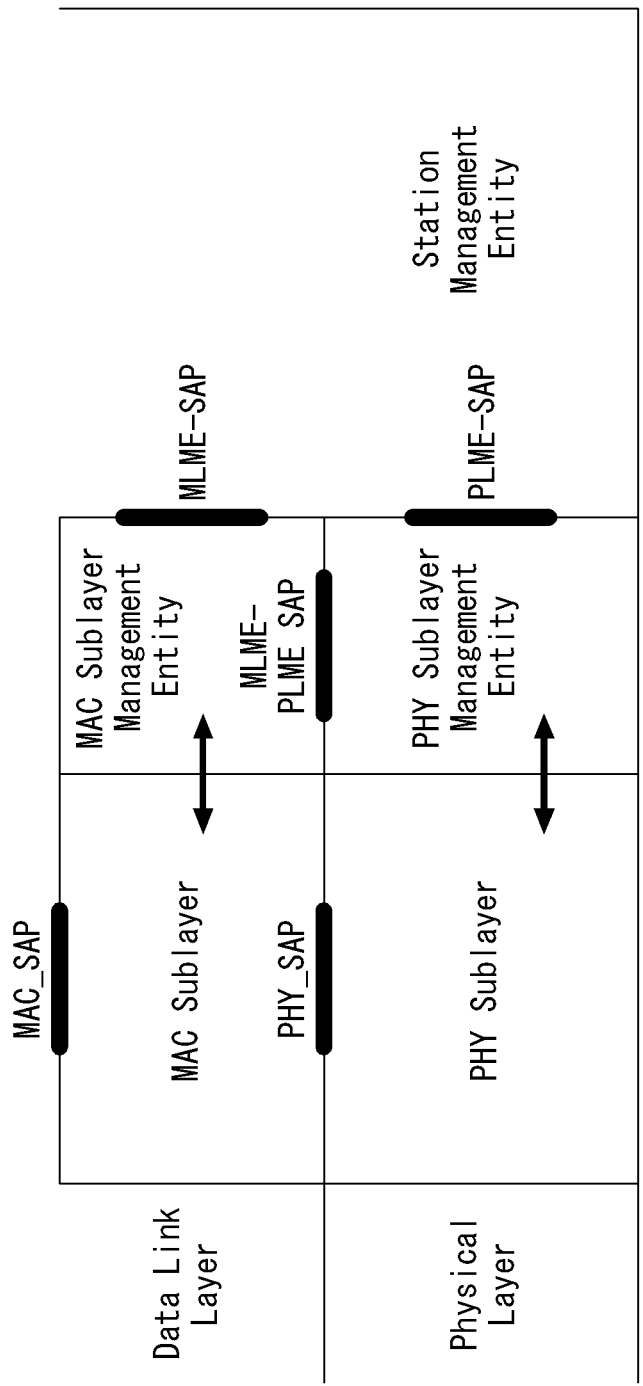
[Fig. 2]

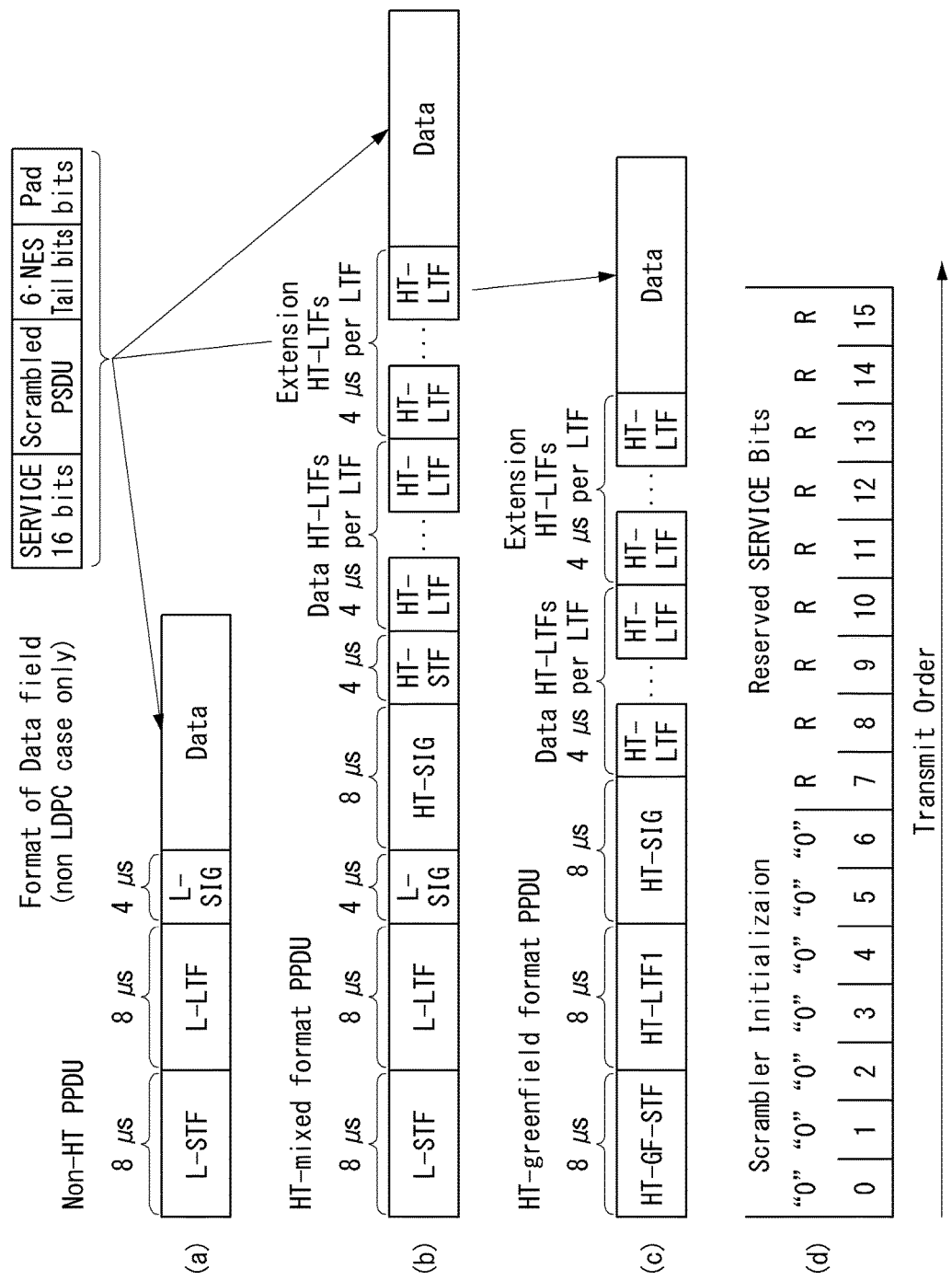
[Fig. 3]

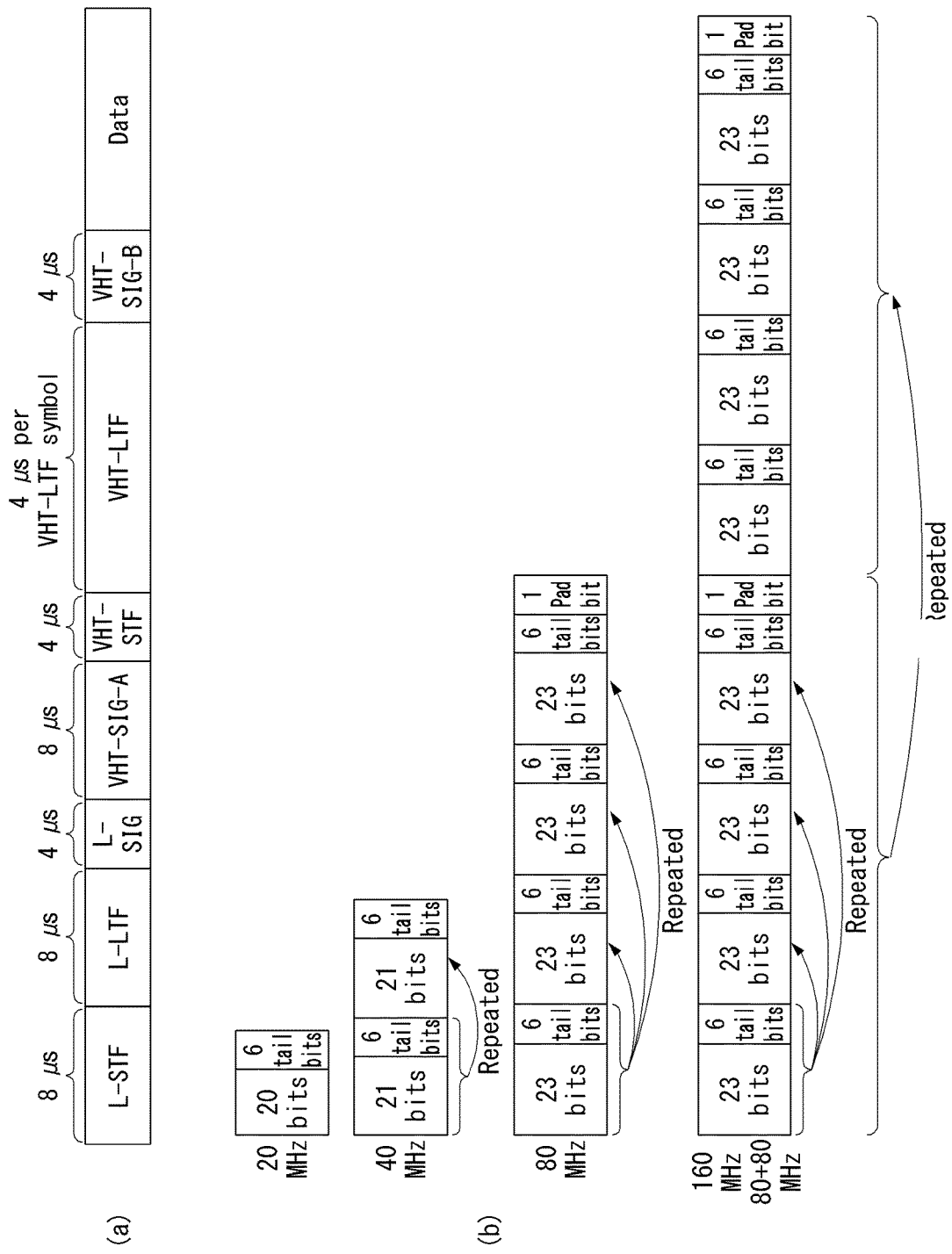
[Fig. 4]

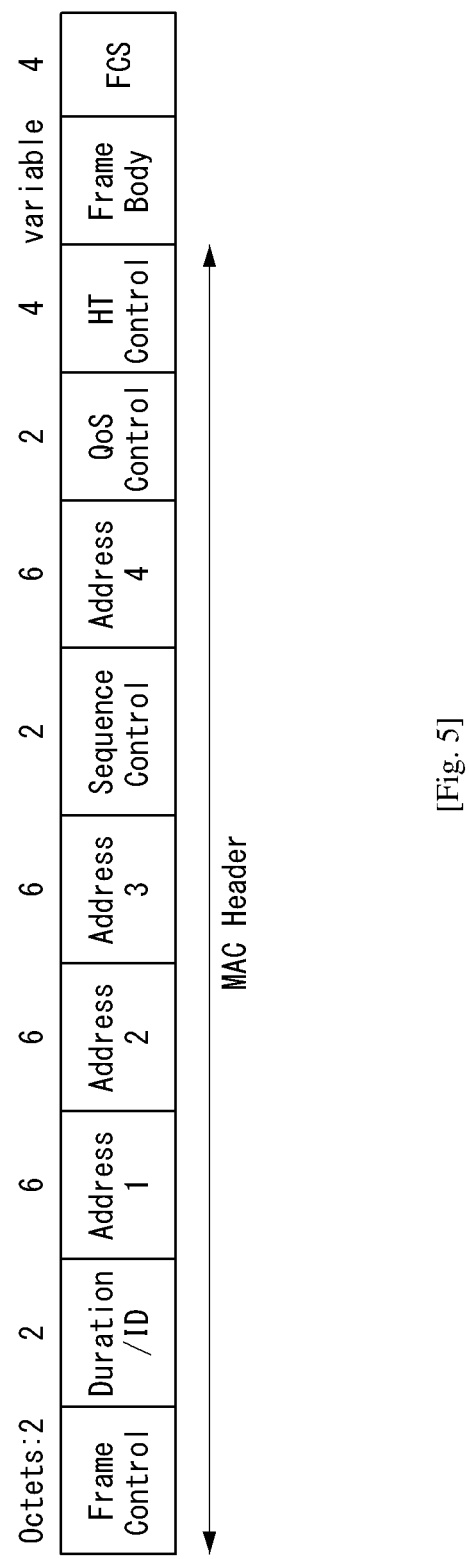
[Fig. 5]

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Frag- ments | Retry | Power Management | More Data | Protected Frame | Order |
| 2 | 2 | 4 | 1 | 1 | 1 | 1 | 1 | 1 | 1 | 1 |

Bits:

[Fig. 6]

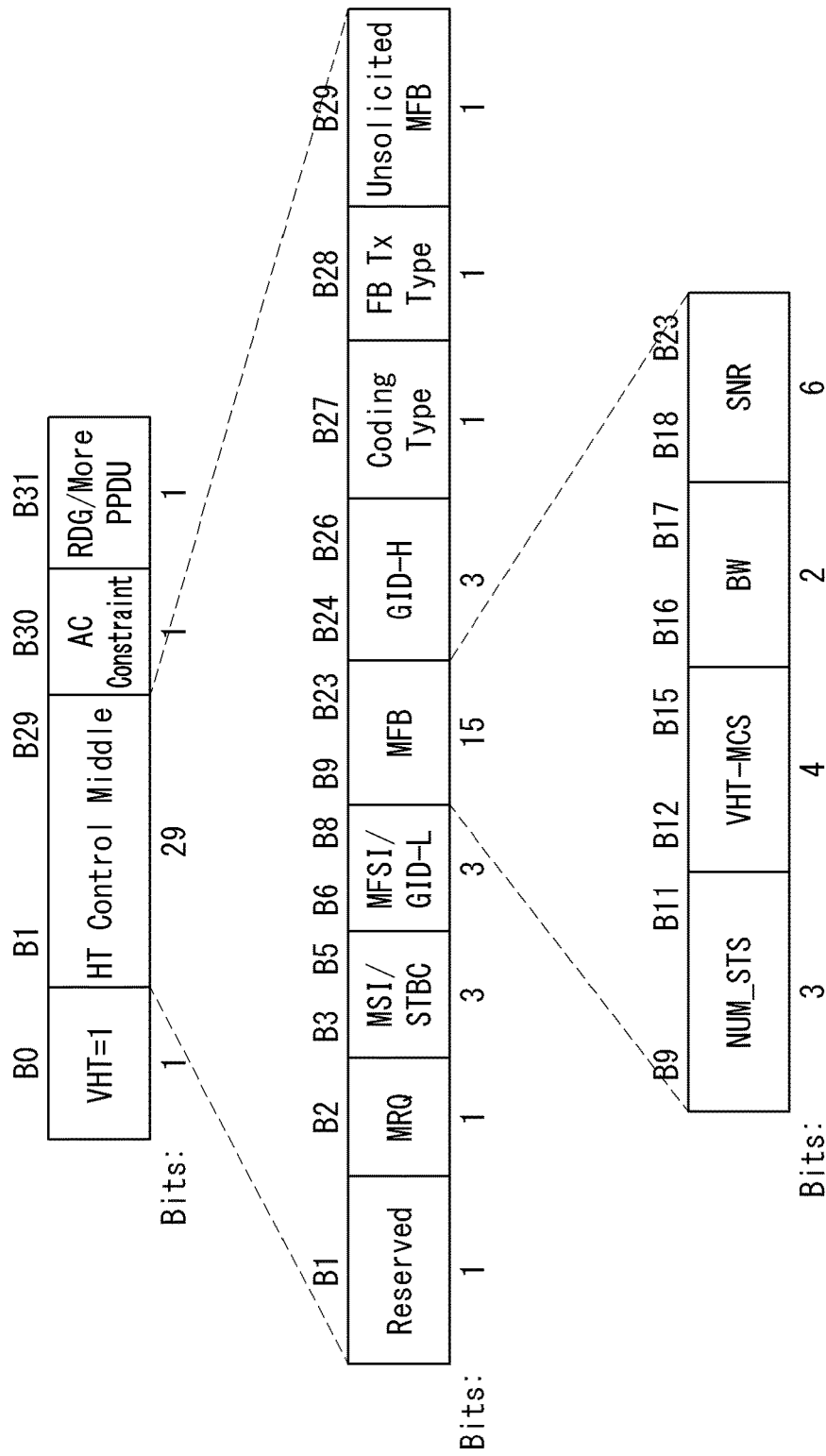
[Fig. 7]

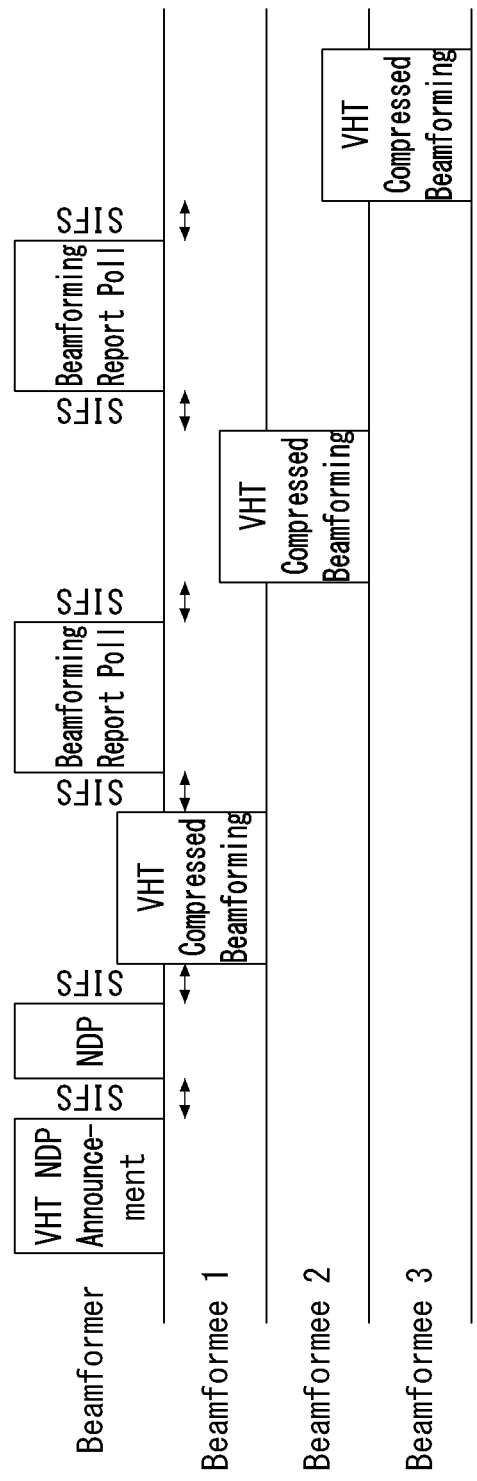
[Fig. 8]

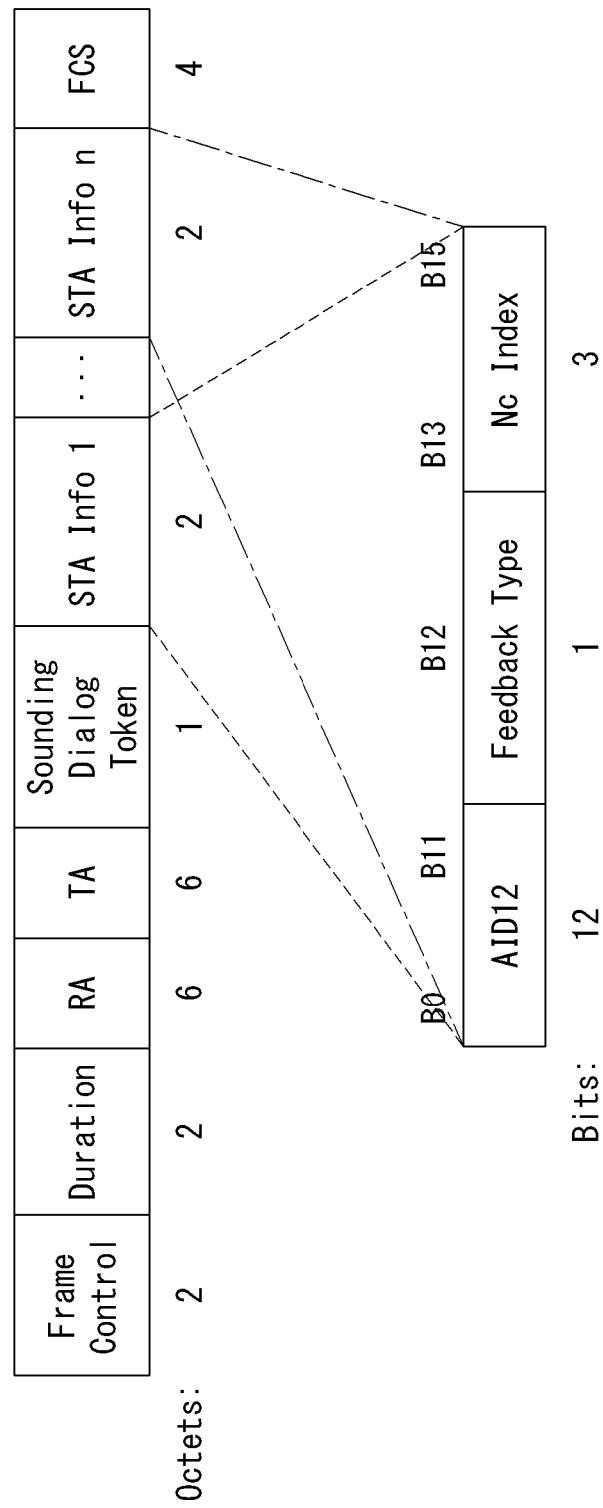
[Fig. 9]

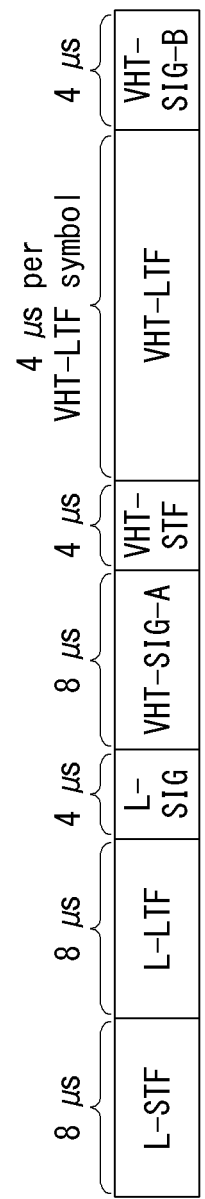
[Fig. 10]

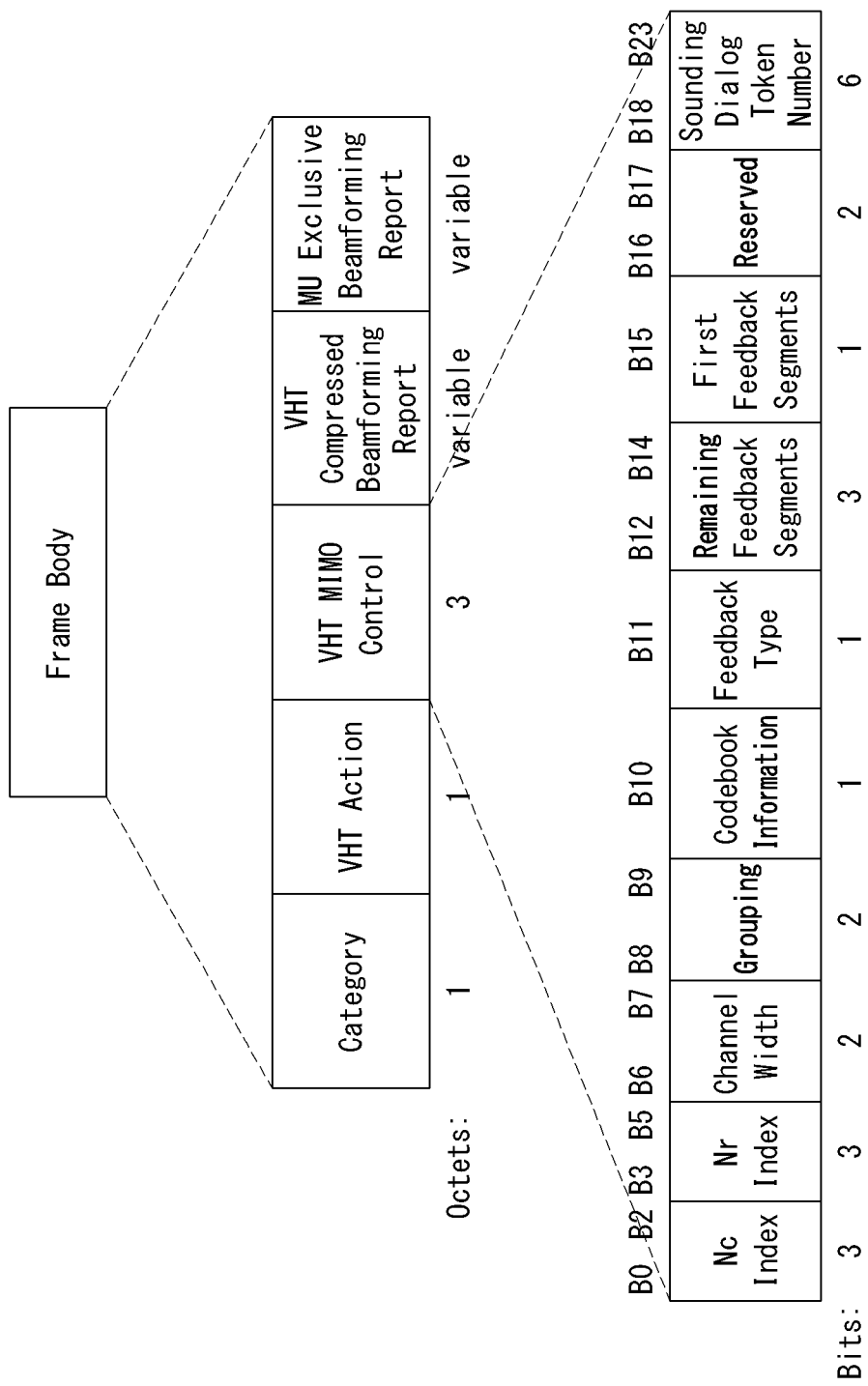
[Fig. 11]

[Fig. 12]

| Frame Control | Duration | RA | TA | Feedback Segment Retransmission Bitmap | FCS |
|---|---|---|---|---|---|
| 2 | 2 | 6 | 6 | 1 | 4 |

Octets:

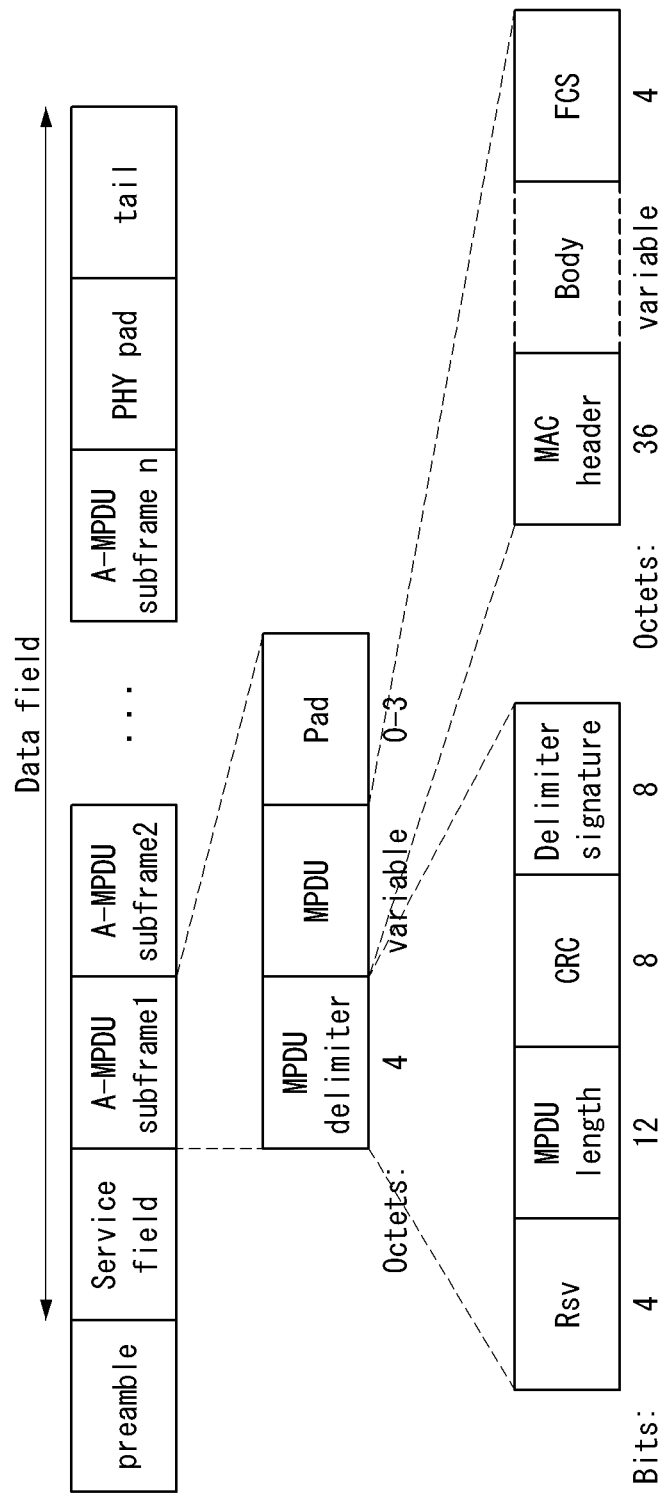
[Fig. 13]

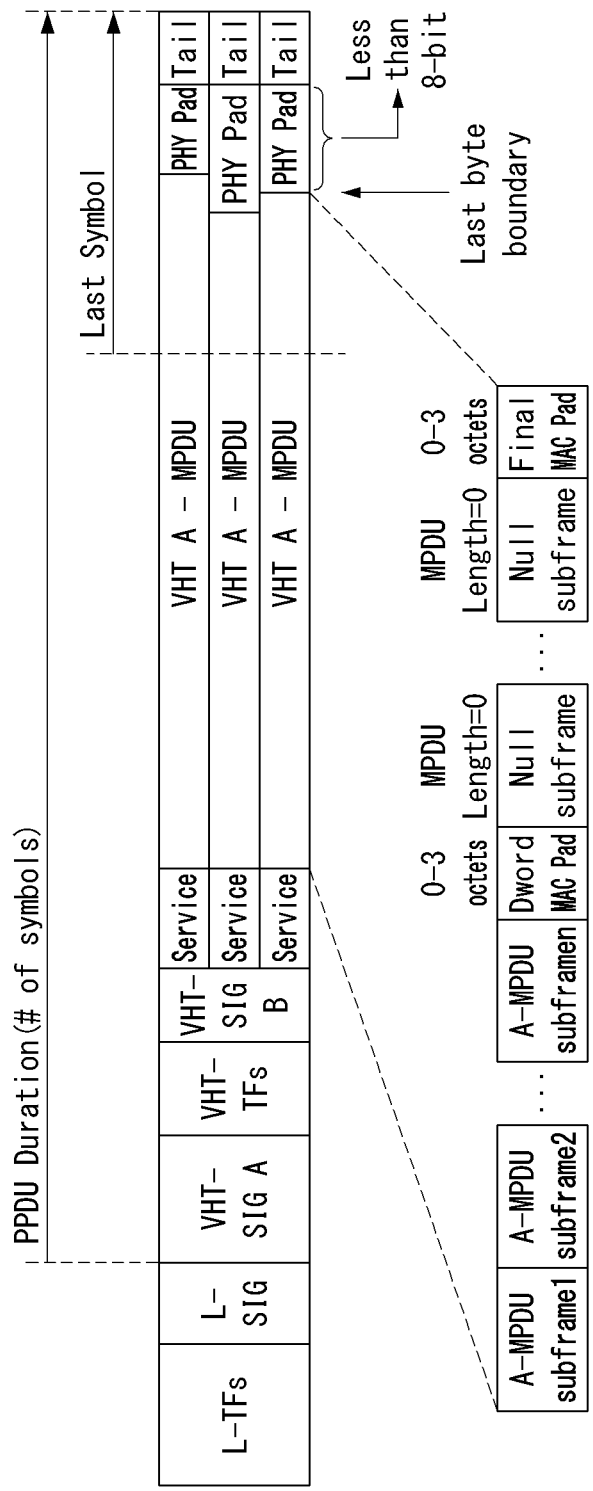
[Fig. 14]

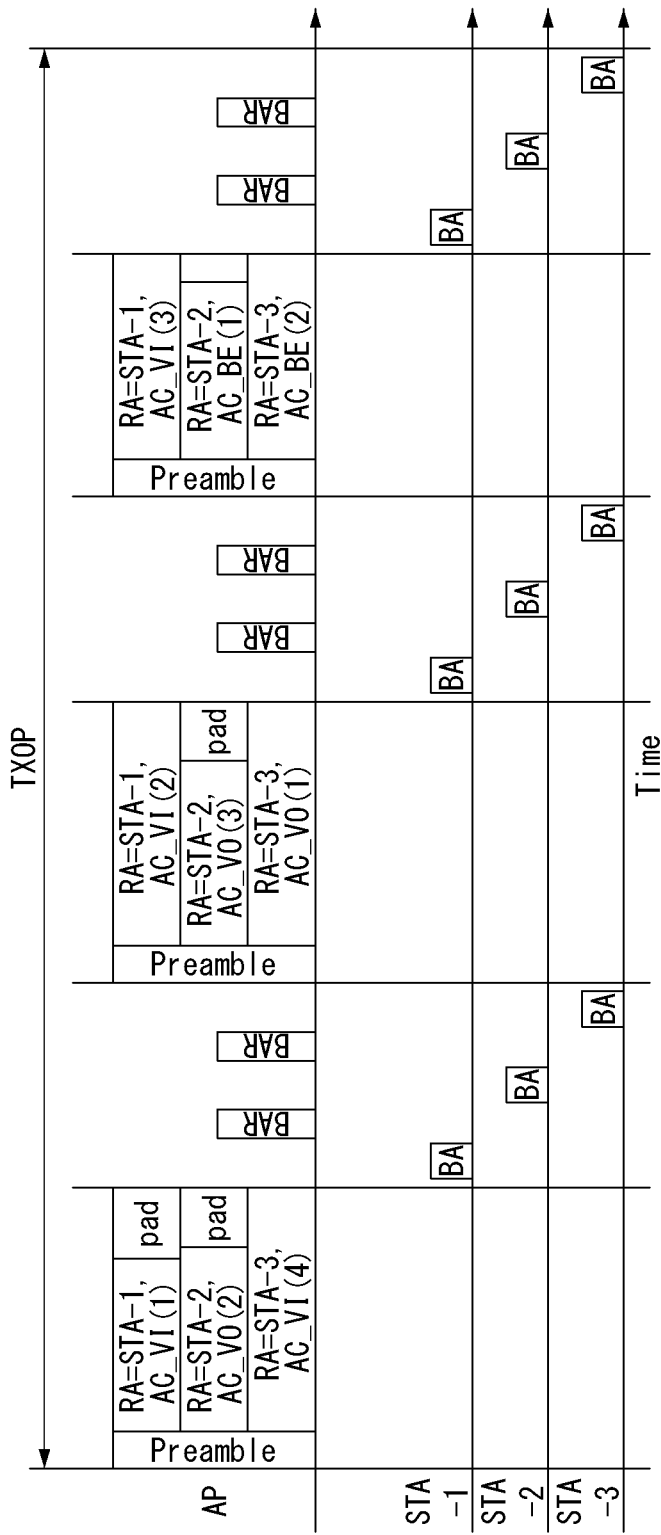
[Fig. 15]

[Fig. 16]
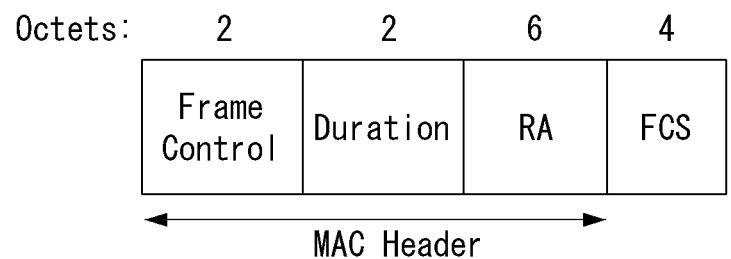

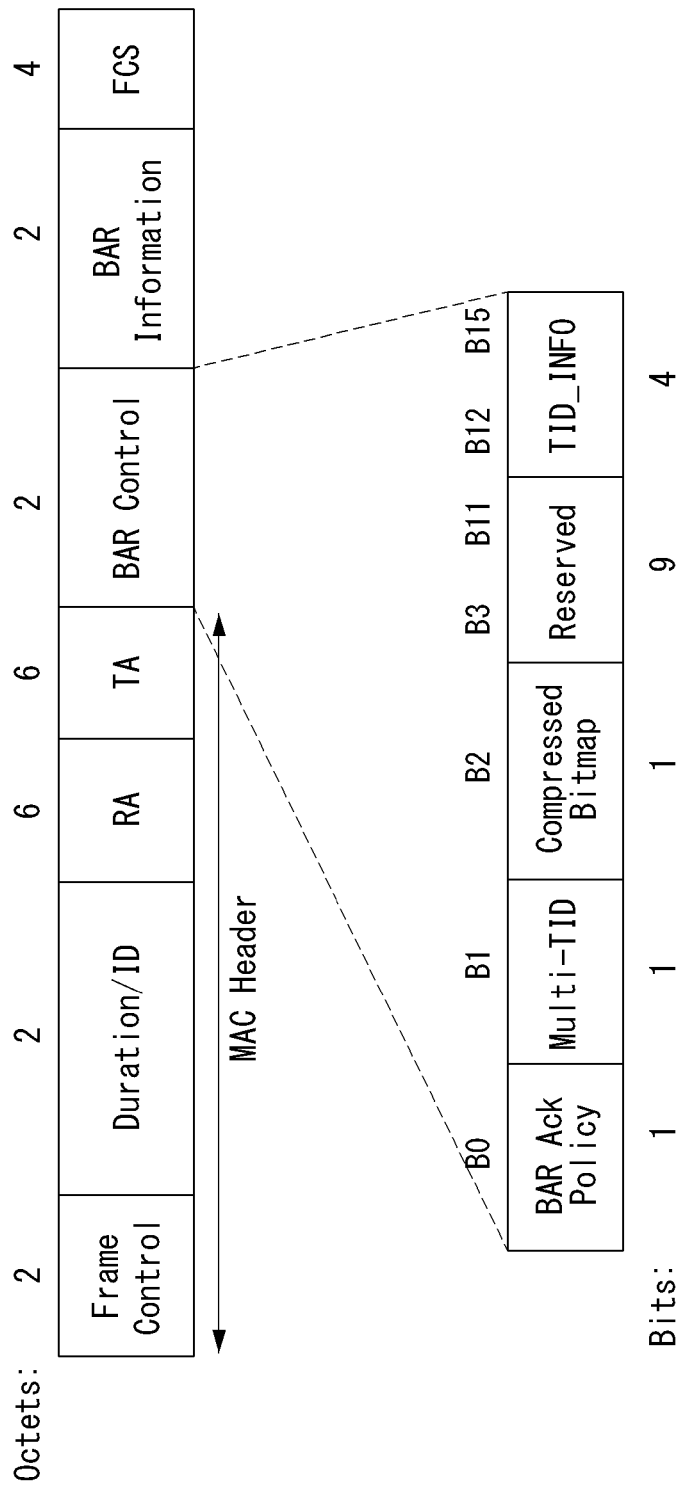
[Fig. 17]

[Fig. 18]
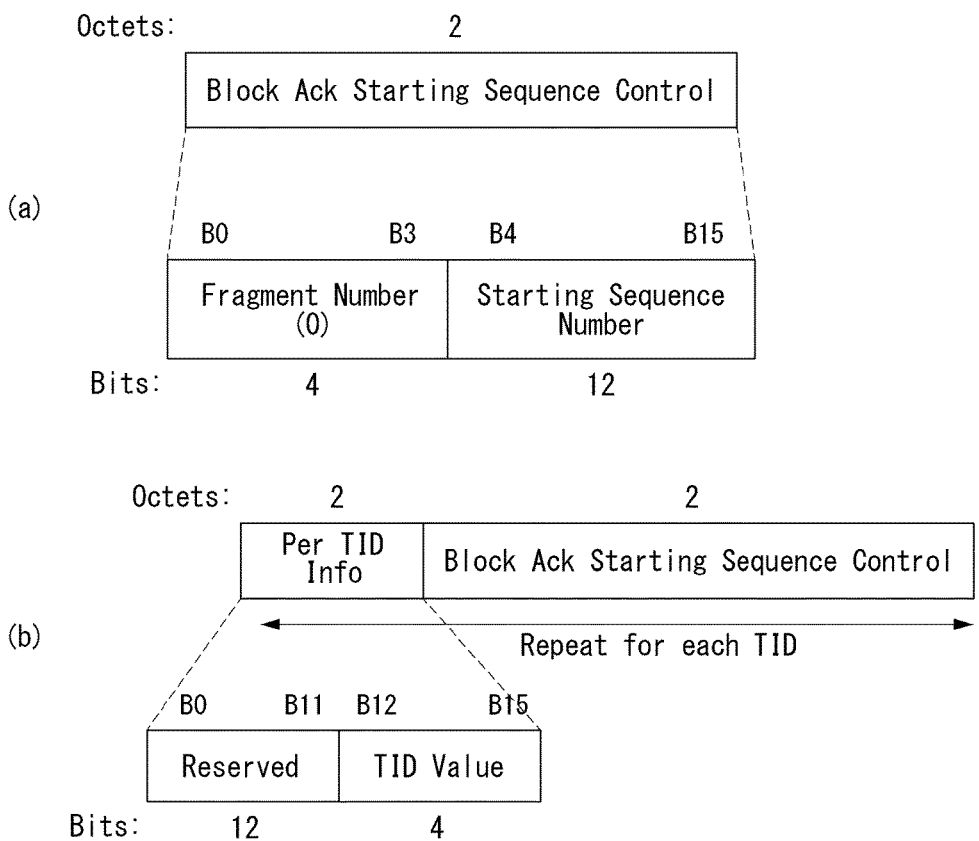

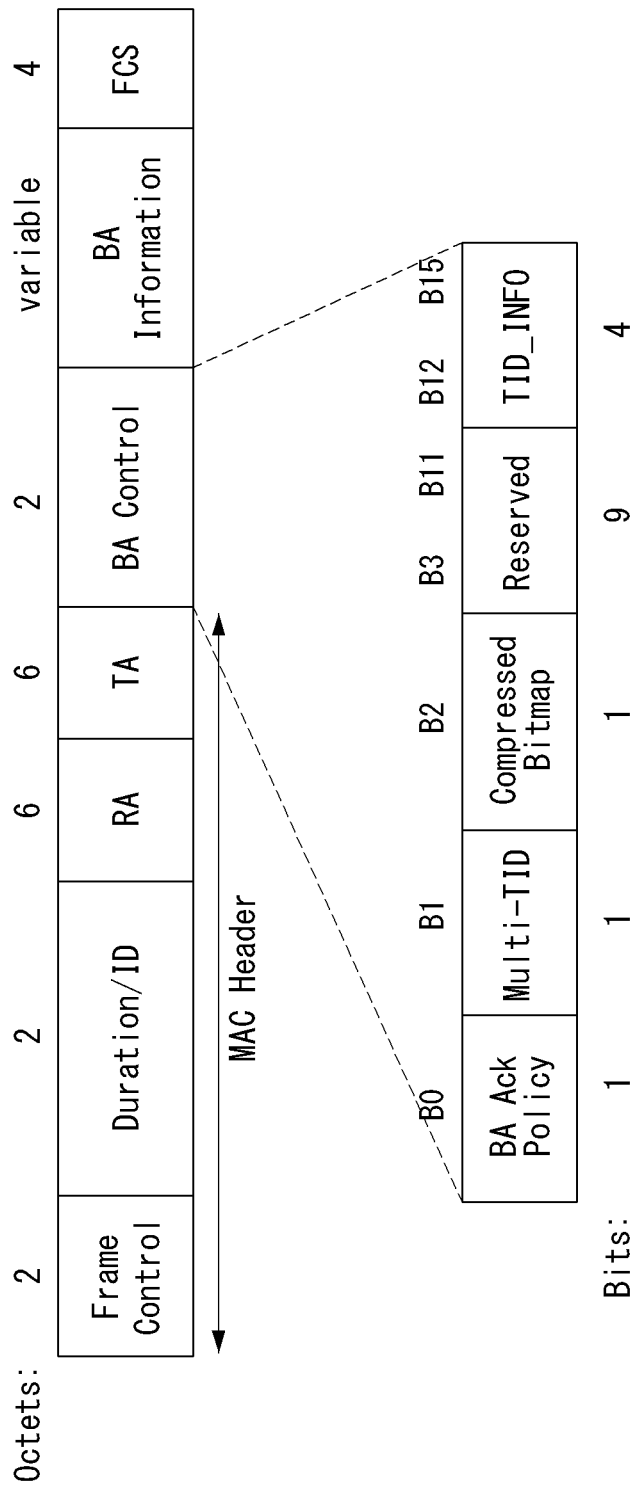
[Fig. 19]

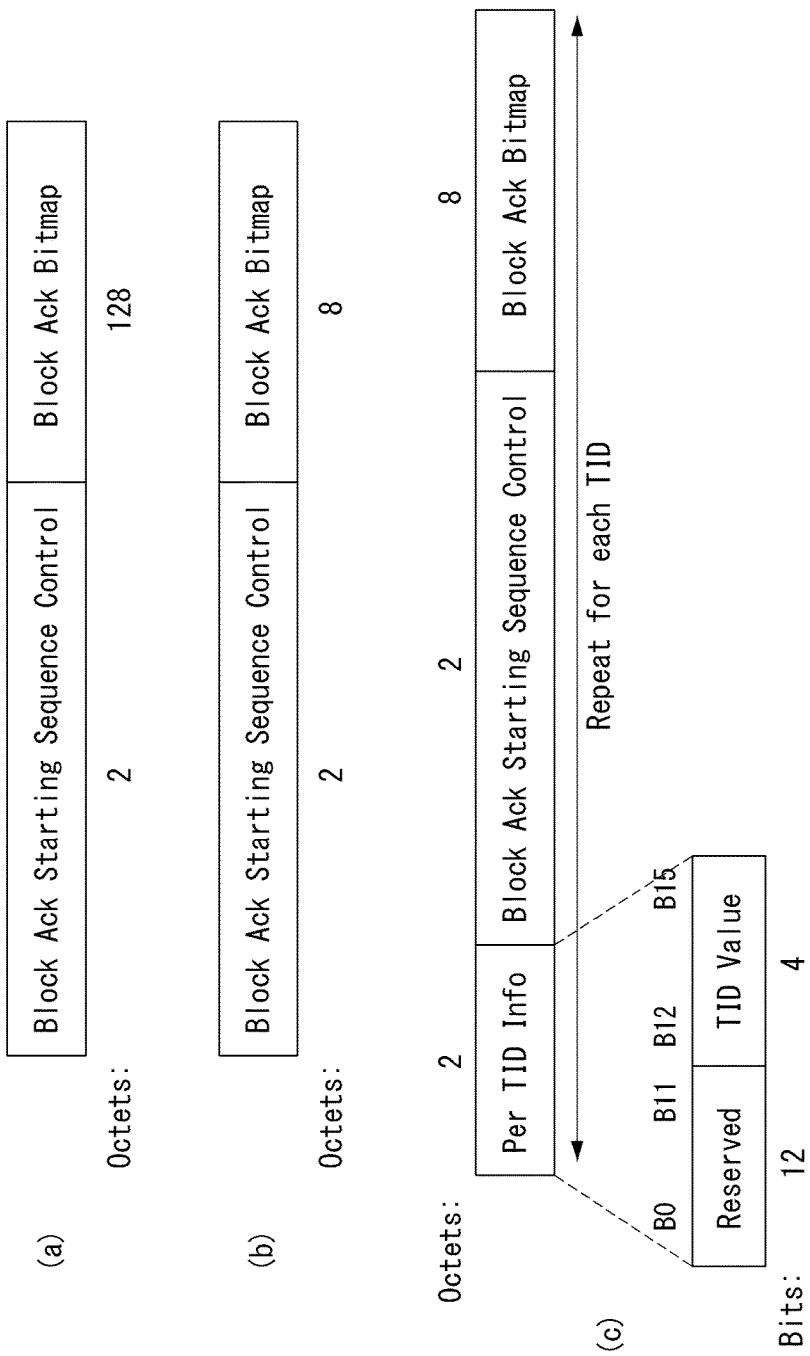
[Fig. 20]

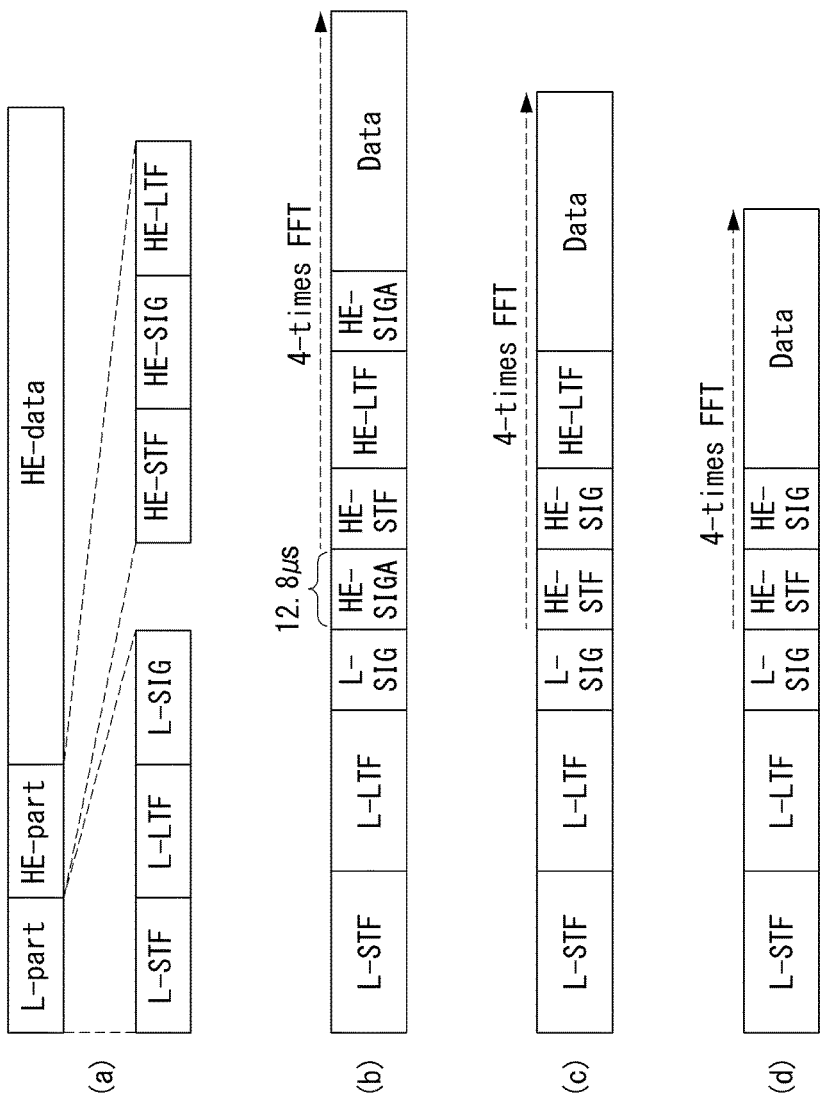
[Fig. 21]

[Fig. 22]

| L-STF | L-LTF | L-SIG | HE-SIG A | | | | |
|-------|-------|-------|----------|----------|-------|-------|------|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |

[Fig. 23]

| L-STF | L-LTF | L-SIG | HE-SIG A | | HE-STF | HE-LTF | Data for STA1 |
|-------|-------|-------|----------|---------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

[Fig. 24]

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

[Fig. 25]
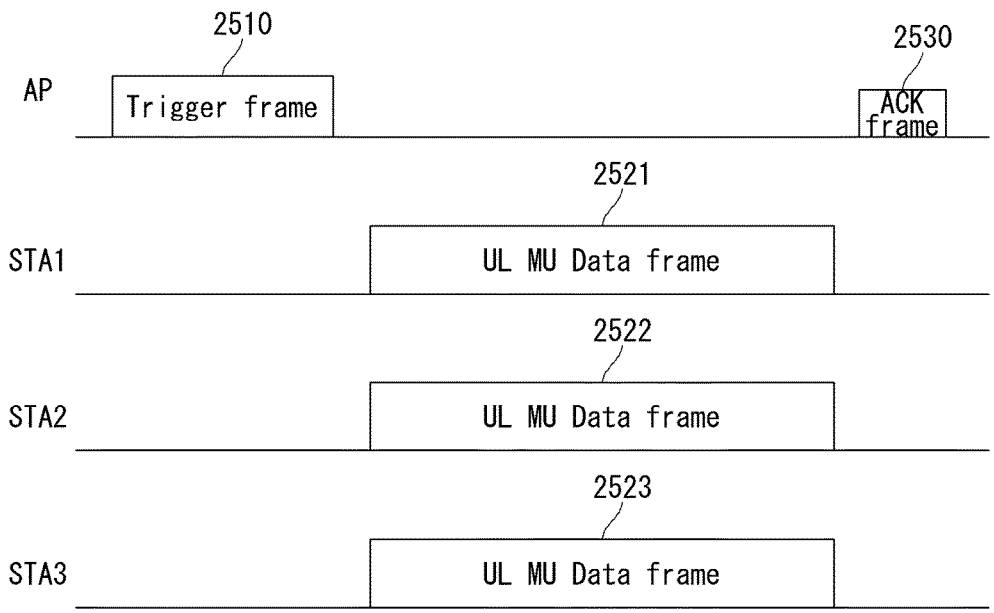
[Fig. 26]
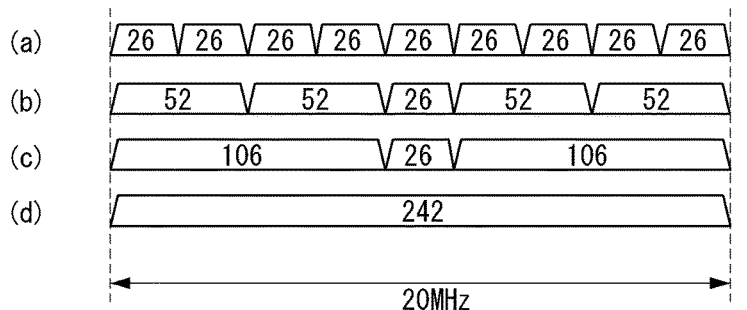

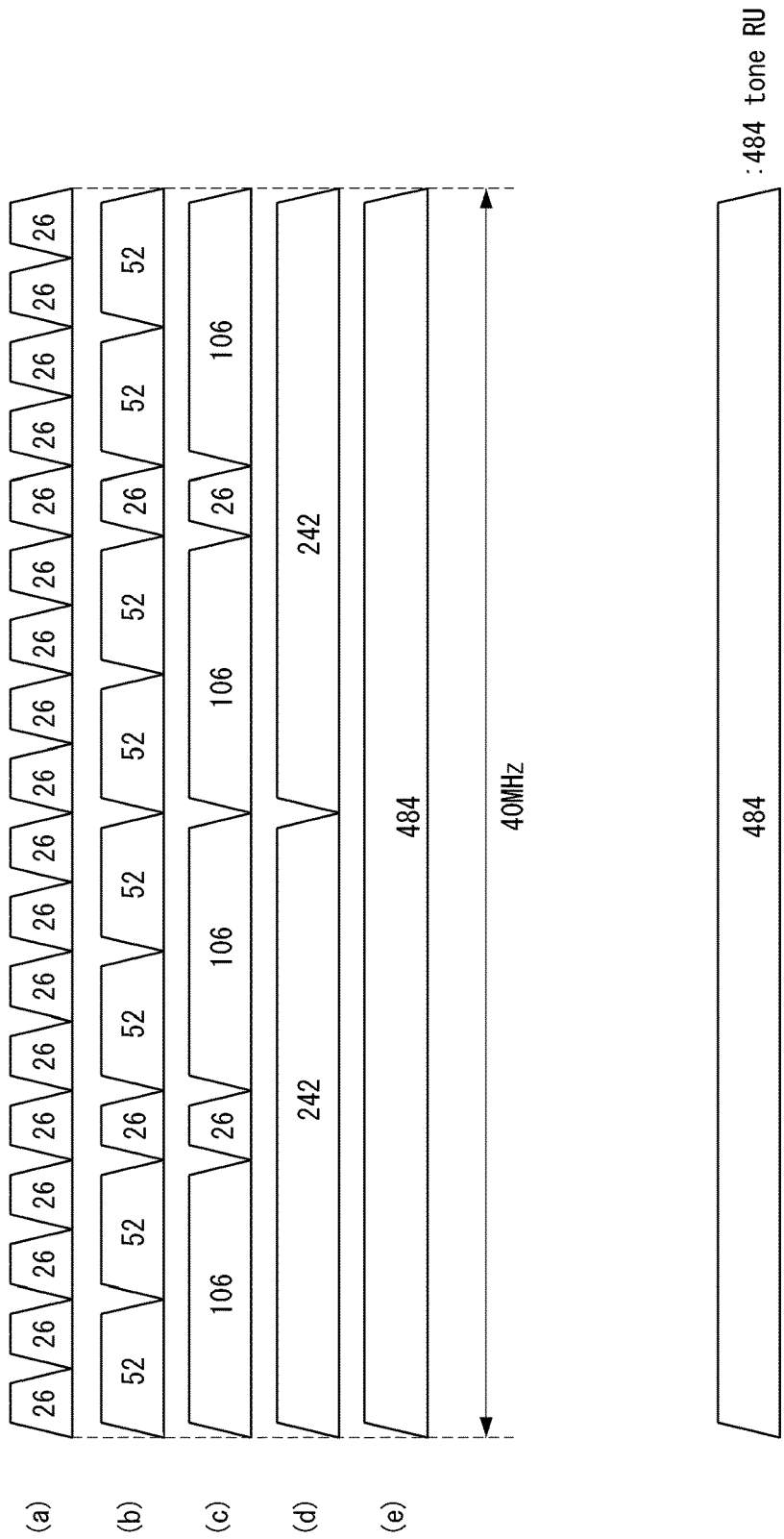
[Fig.27]

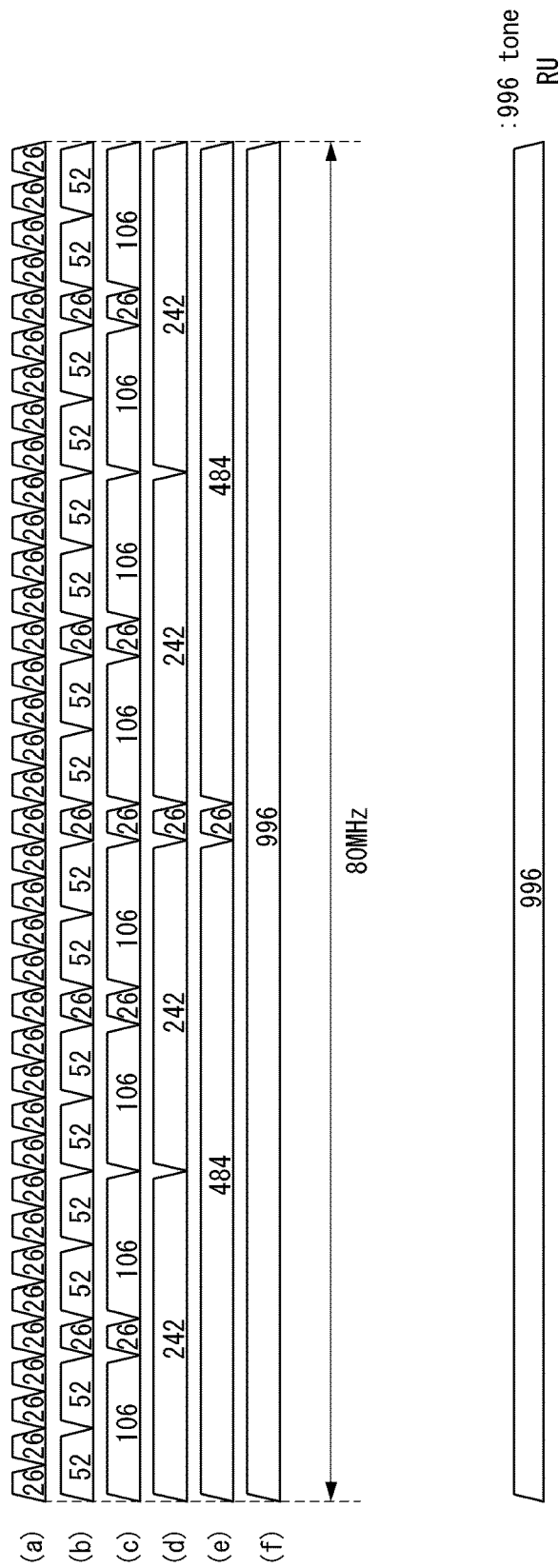
[Fig. 28]

(a)

| B0 B1 B2 B3 | B4 | B5 B6 | B7 B8 | B9 B10 B11 | B12 B13 B14 | B15 B16 B48 |
|---|---|---|---|---|---|---|
| Nc Index | Nr Index | MIMO Control Channel Width | Grouping (Ng) | Coefficient Size | Codebook Information | Remaining Matrix Segment | Reserved | Sounding Timestamp |
| Bits: 2 | 2 | 1 | 2 | 2 | 2 | 3 | 2 | 32 |

(b)

| Antenna Selection Indices |
|---|
| Octets: 1 |

[Fig. 29]

[Fig. 30]
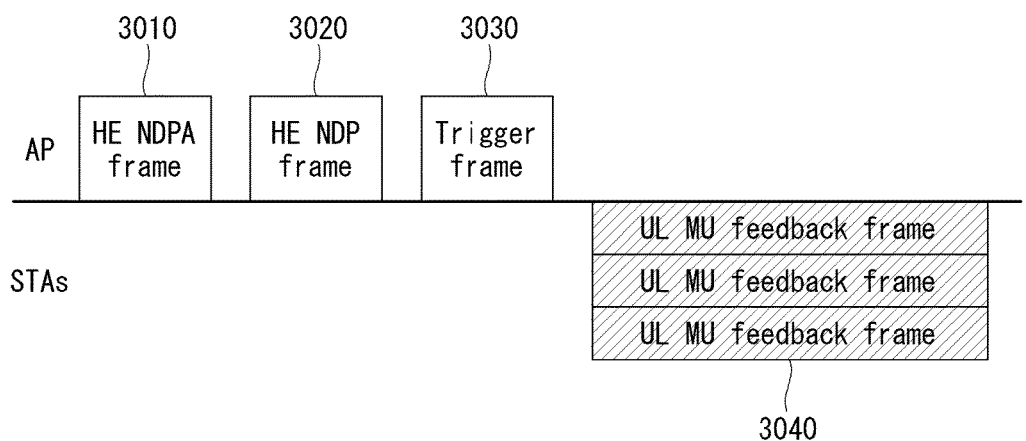

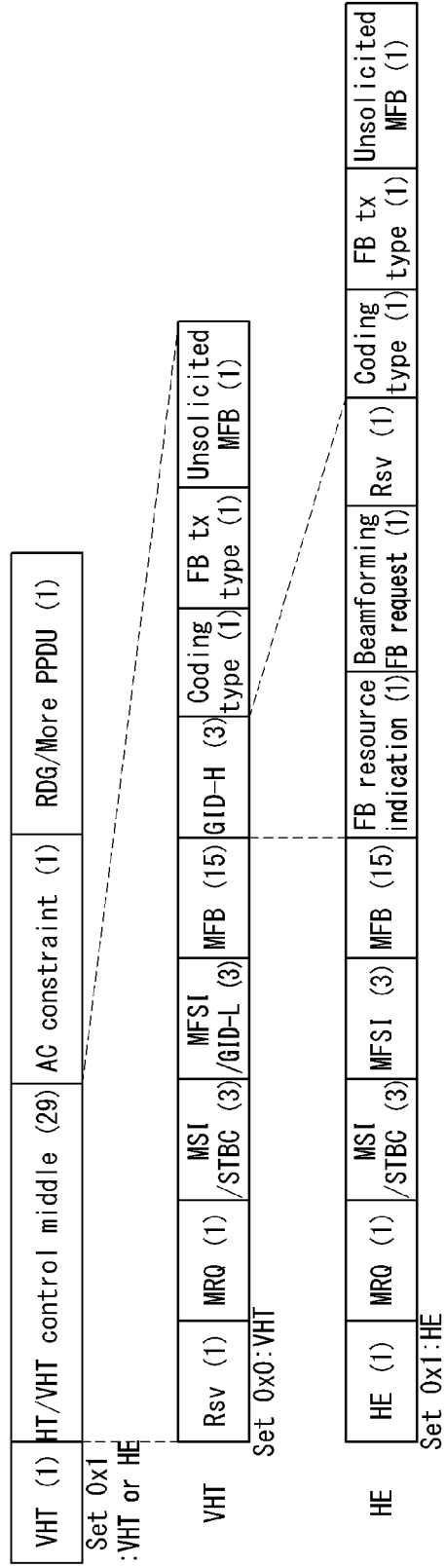
[Fig. 31]

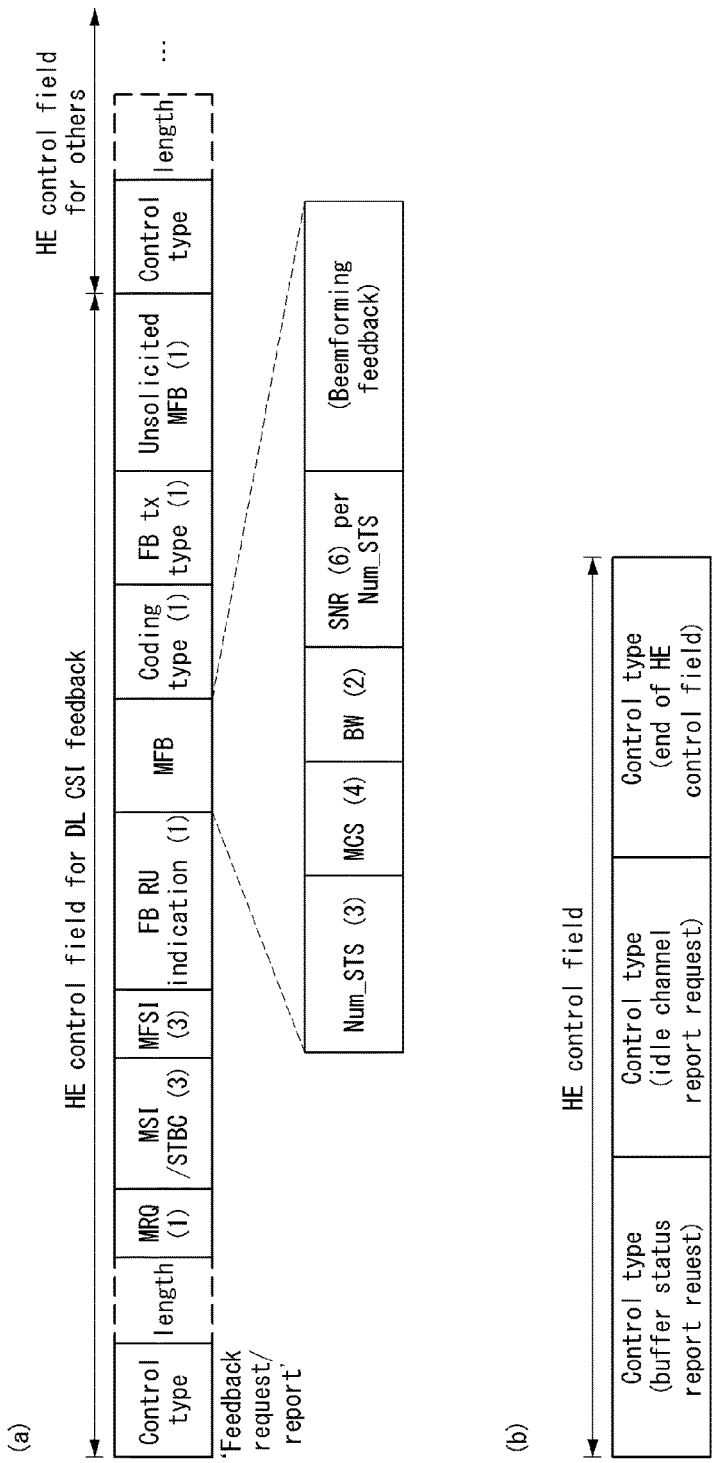
[Fig. 32]

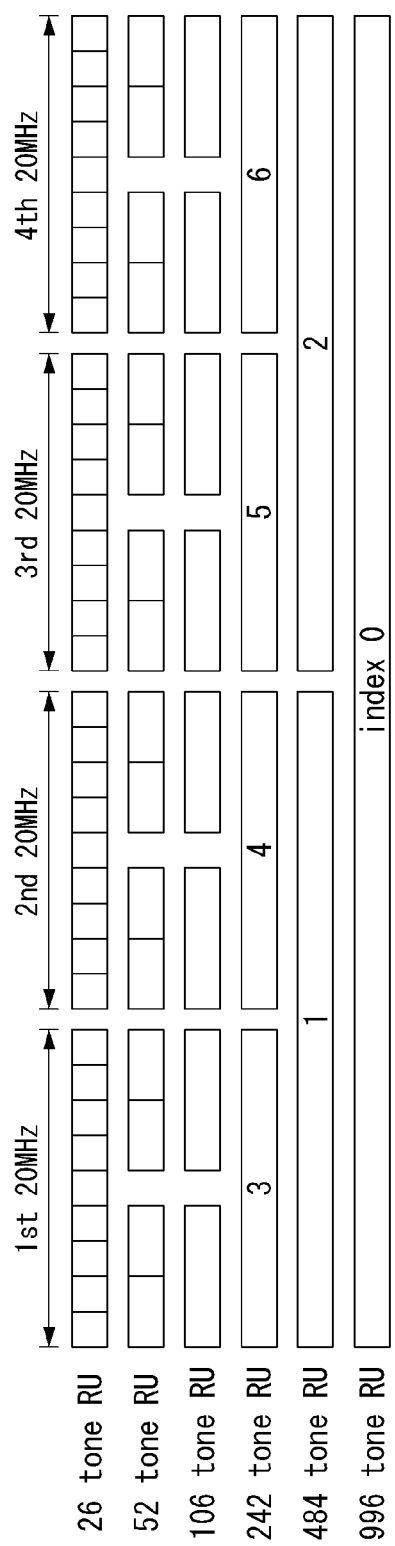
[Fig. 33]

[Fig. 34]
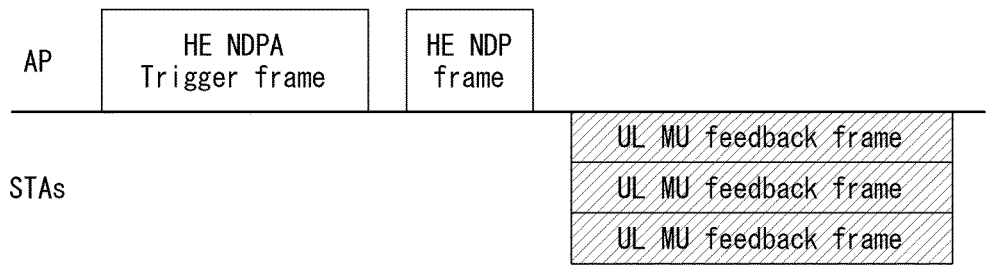

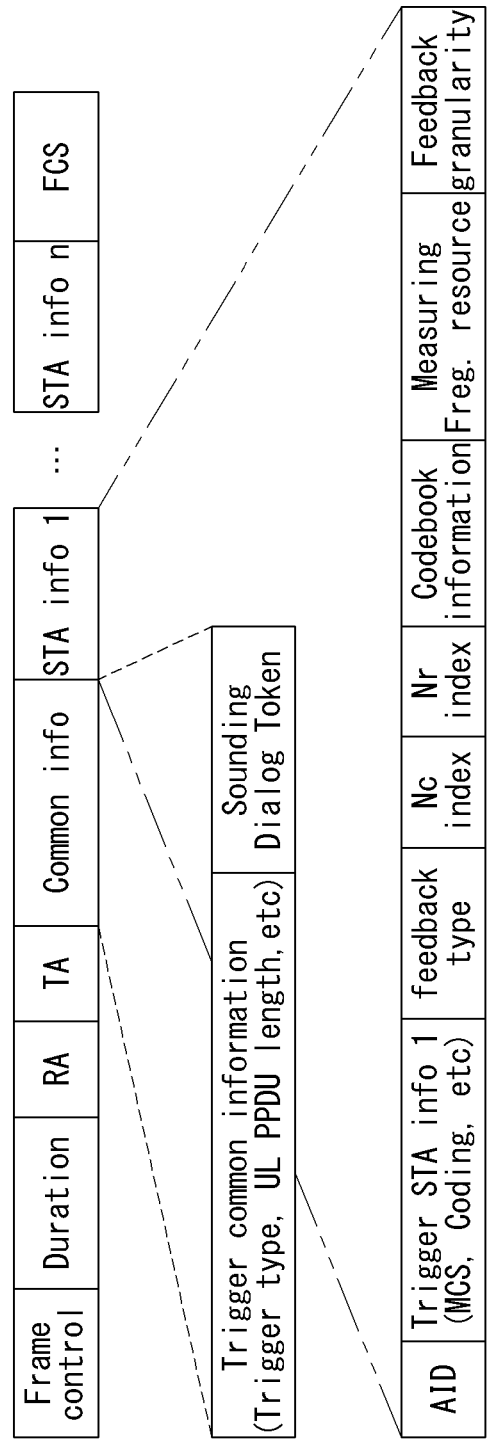
[Fig.35]

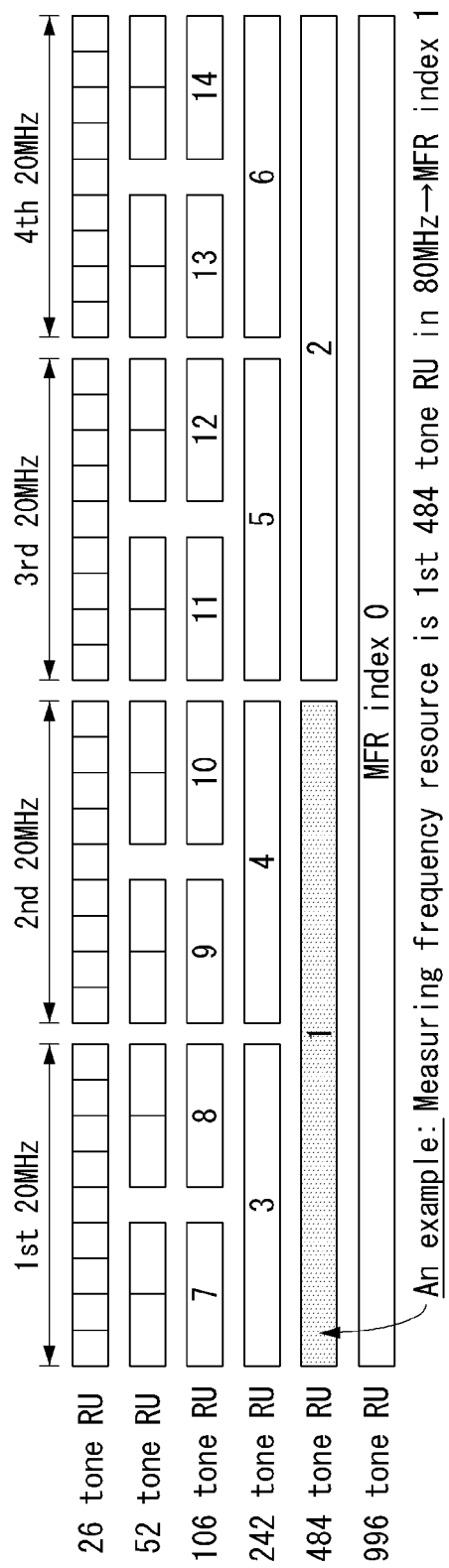
[Fig. 36]

[Fig. 37]
(a) 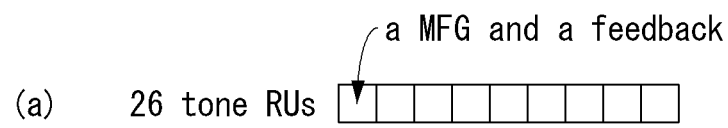
(b) 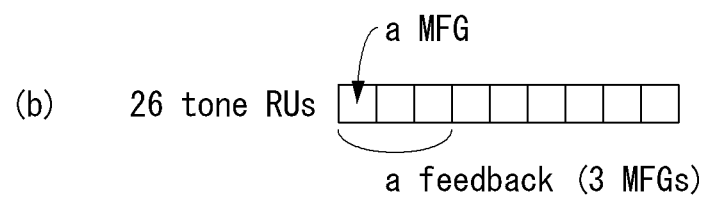
(c) 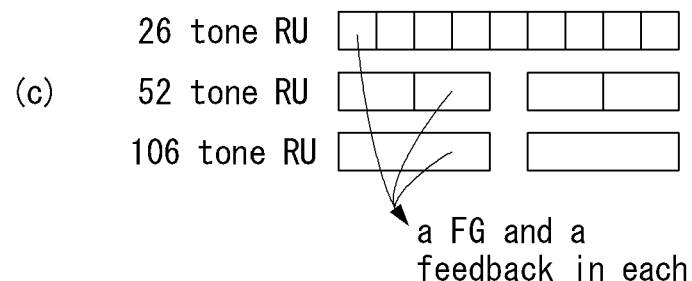

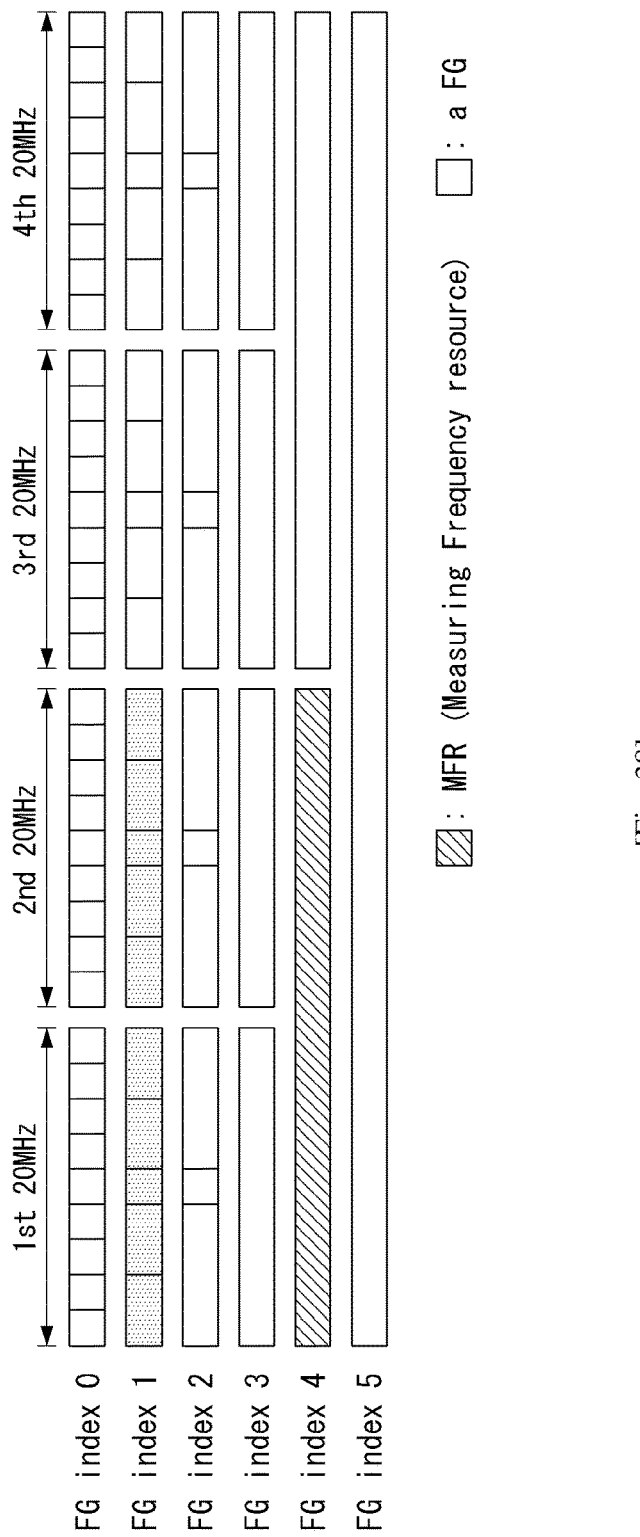
[Fig. 38]

[Fig. 39]
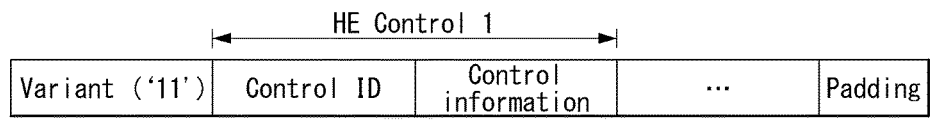
[Fig. 40]
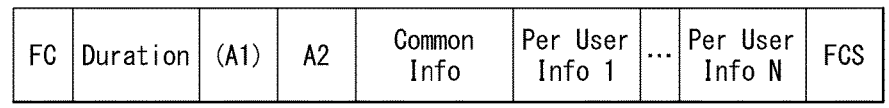
[Fig. 41]
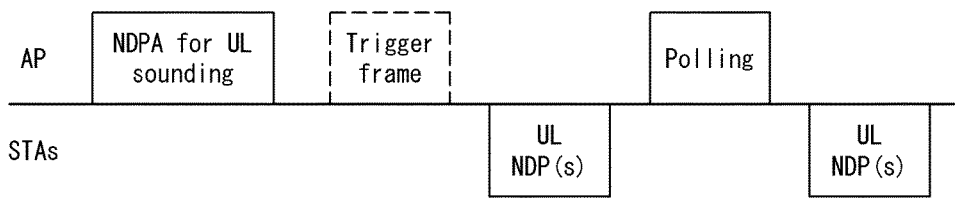

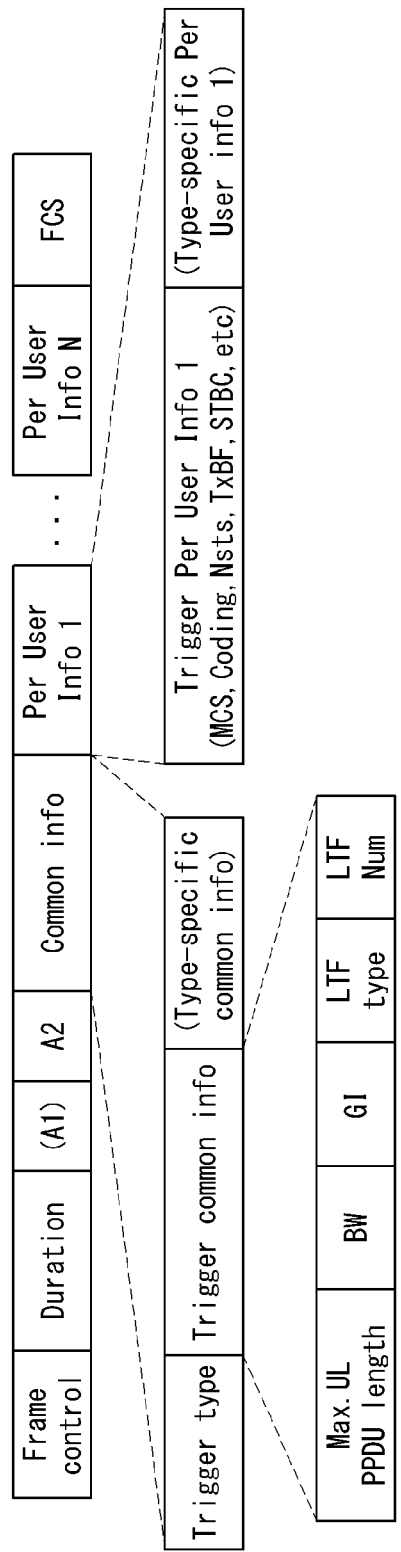
[Fig. 42]

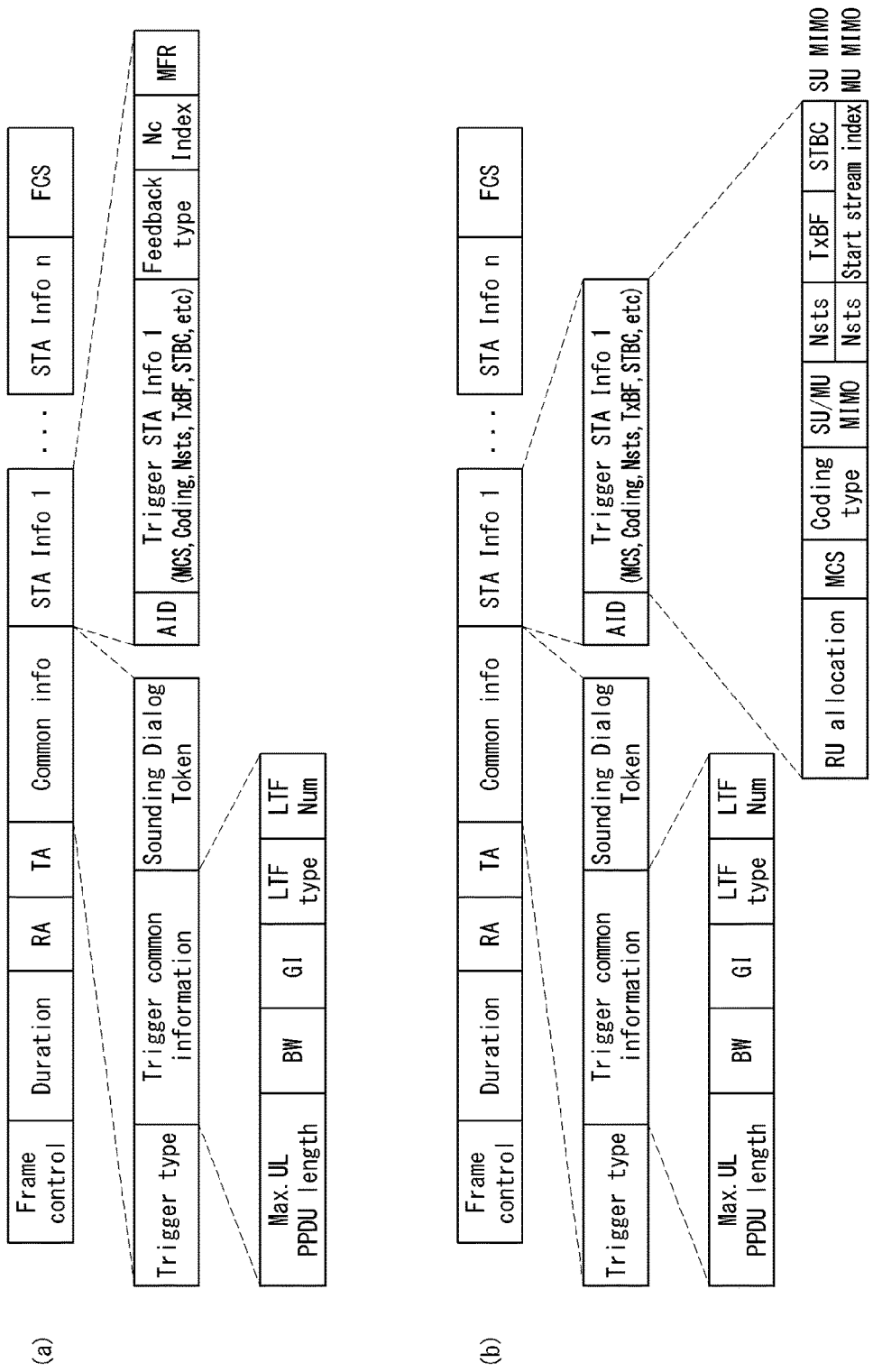
[Fig. 43]

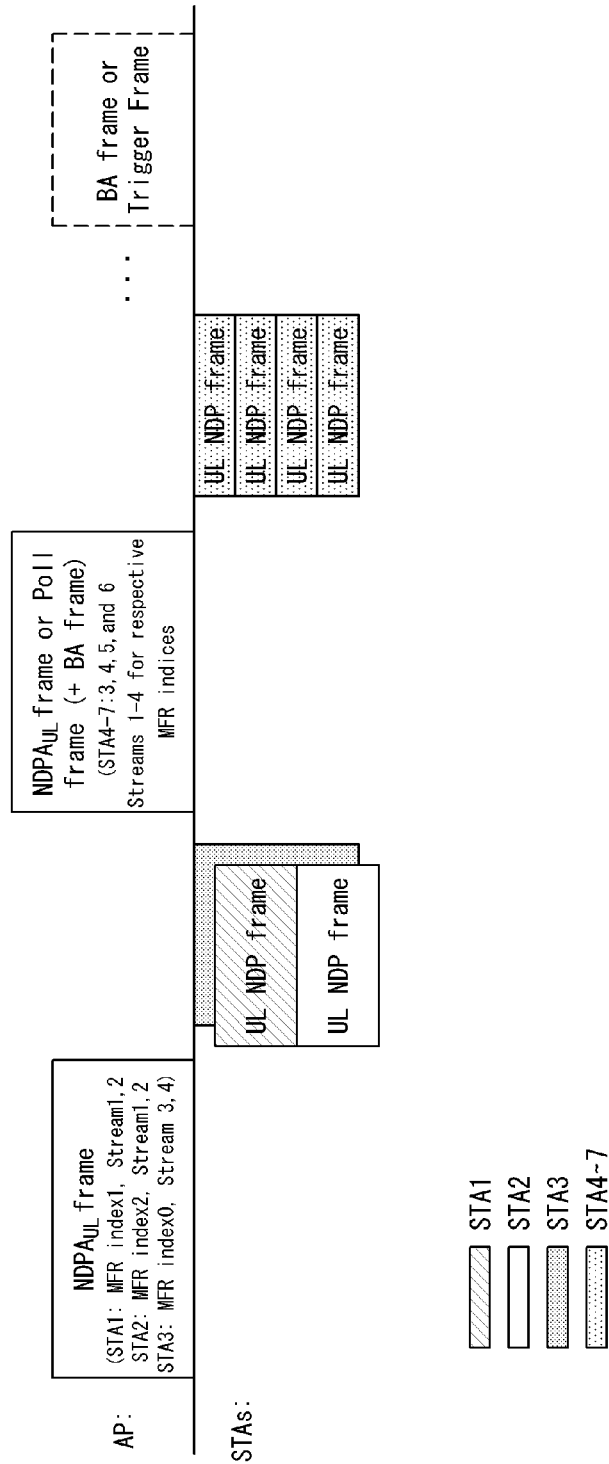
[Fig. 44]

[Fig. 45]
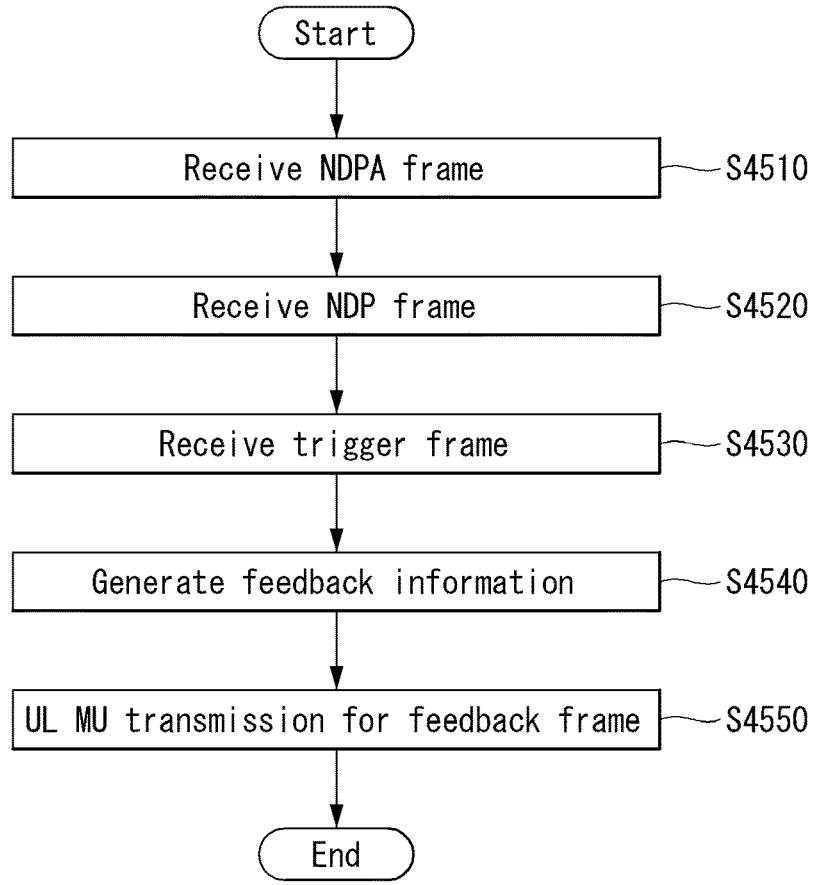
[Fig. 46]
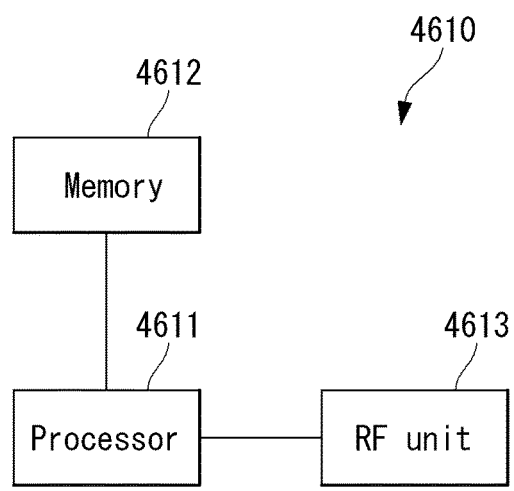

METHOD FOR FEEDING BACK CHANNEL STATE IN WIRELESS COMMUNICATION SYSTEM AND DEVICE THEREFOR

CROSS-REFERENCE TO RELATED APPLICATION

Pursuant to 35 U.S.C. § 119(a), this application claims the benefit of U.S. Provisional Application Nos. 62/206,862, filed on Aug. 19, 2015, 62/209,899, filed on Aug. 26, 2015, and 62/264,836, filed on Dec. 8, 2015, the contents of which are all incorporated by reference herein in their entirety.

BACKGROUND OF THE INVENTION

Field of the Invention

The present invention relates to a wireless communication system and, more particularly, to a method for the uplink multi-user transmission of a channel state measured by an STA and a device supporting the same.

Discussion of the Related Art

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

SUMMARY OF THE INVENTION

An embodiment of the present invention is directed to the proposal of a new sounding protocol which can be applied to a next-generation wireless communication system and to the proposal of the high efficiency (HE) format of frames transmitted and received for a sounding protocol.

Furthermore, an embodiment of the present invention is directed to the proposal of an efficient method for the uplink multi-user transmission of channel state information measured by STAs in a next-generation wireless communication system.

Furthermore, an embodiment of the present invention is directed to the proposal of a preliminary procedure for obtaining channel state information for downlink multi-user transmission in a wireless communication system.

Furthermore, an embodiment of the present invention is directed to a new proposal of the size and feedback unit of a feedback target channel (or bandwidth) so as to reduce feedback overhead.

Technical objects to be achieved by the present invention are not limited to the above-described object, and those skilled in the art to which the present invention pertains may evidently understand other technical objects from the following description.

In an aspect of the present invention, there is provided a sounding method of a station (STA) for sending feedback information about a downlink (DL) channel state in a wireless LAN (WLAN) system. The sounding method includes receiving an NDP announcement (NDPA) frame providing notification of the transmission of a null data packet (NDP) frame, receiving the NDP frame, receiving a trigger frame comprising resource allocation information allocated to the STA, generating feedback information using the NDP frame, and sending a feedback frame comprising feedback information through uplink (UL) multi-user (MU) transmission using a frequency resource indicated by the resource allocation information. The feedback information may be generated in a frequency granularity (FG) unit with respect to a transmission bandwidth having a size smaller than or equal to the size of the transmission bandwidth of the NDP frame.

Furthermore, the FG may be composed of at least one minimum FG (MFG), and the MFG may be set as a 26-tone resource unit Furthermore, the NDPA frame or the trigger frame may include FG indication information about the at least one MFG forming the FG.

Furthermore, if the at least one MFG forming the FG is continuously located in a frequency band, the FG indication information may include indication information about an MFG which belongs to a plurality of MFGs forming the FG and which is located at a start point and indication information about an MFG which belongs to the plurality of MFGs forming the FG and which is located at an end point.

Furthermore, the FG indication information may include information about the number of at least one MFG forming the FG.

Furthermore, the feedback information may correspond to an average value of signal to noise ratio (SRN) values generated in the MFG unit with respect to a measuring frequency region having a size equal to or smaller than the size of the transmission bandwidth of the NDP frame.

Furthermore, the FG may be set as a 4-tone or 16-tone size.

Furthermore, the feedback information may correspond to a beamforming feedback matrix generated in the FG unit with respect to a measuring frequency region having a size smaller than the size of the transmission bandwidth of the NDP frame.

Furthermore, the some transmission bandwidth and the FG having the size smaller than the size of the transmission bandwidth of the NDP frame may be indicated by the NDPA frame.

Furthermore, in an aspect of the present invention, there is provided a station (STA) device in a wireless LAN (WLAN) system, including an RF unit configured to transmit and receive a radio signal and a processor configured to control the RF unit. The processor receives an NDP announcement (NDPA) frame providing notification of the transmission of a null data packet (NDP) frame, receives the NDP frame, receive a trigger frame comprising resource allocation information allocated to the STA, generates feedback information using the NDP frame, and sends a feedback frame comprising feedback information through uplink (UL) multi-user (MU) transmission using a frequency resource indicated by the resource allocation information. The feedback information may be generated in a frequency granularity (FG) unit with respect to a transmission bandwidth having a size smaller than or equal to the size of the transmission bandwidth of the NDP frame.

Furthermore, the FG may be composed of at least one minimum FG (MFG), and the MFG may be set as a 26-tone resource unit.

Furthermore, the NDPA frame or the trigger frame may include FG indication information about the at least one MFG forming the FG.

Furthermore, the feedback information may correspond to an average value of signal to noise ratio (SRN) values generated in the MFG unit with respect to a measuring frequency region having a size equal to or smaller than the size of the transmission bandwidth of the NDP frame.

Furthermore, the FG may be set as a 4-tone or 16-tone size.

Furthermore, the feedback information may correspond to a beamforming feedback matrix generated in the FG unit with respect to a measuring frequency region having a size smaller than the size of the transmission bandwidth of the NDP frame.

Furthermore, the some transmission bandwidth and the FG having the size smaller than the size of the transmission bandwidth of the NDP frame are indicated by the NDPA frame.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 1 is a diagram showing an example of an IEEE 802.11 system to which an embodiment of the present invention may be applied.

FIG. 2 is a diagram illustrating the structure of layer architecture of the IEEE 802.11 system to which an embodiment of the present invention may be applied.

FIG. 3 illustrates a non-HT format PPDU and HT format PPDU of a wireless communication system to which an embodiment of the present invention may be applied.

FIG. 4 illustrates a VHT format PPDU format of a wireless communication system to which an embodiment of the present invention may be applied.

FIG. 5 illustrates an MAC frame format of an IEEE 802.11 system to which an embodiment of the present invention may be applied.

FIG. 6 is a diagram illustrating a frame control field within an MAC frame in a wireless communication system to which an embodiment of the present invention may be applied.

FIG. 7 illustrates the VHT format of an HT control field in a wireless communication system to which an embodiment of the present invention may be applied.

FIG. 8 is a diagram conceptually illustrating a channel sounding method in a wireless communication system to which an embodiment of the present invention may be applied.

FIG. 9 is a diagram illustrating a VHT NDPA frame in a wireless communication system to which an embodiment of the present invention may be applied.

FIG. 10 is a diagram illustrating an NDP PPDU in a wireless communication system to which an embodiment of the present invention may be applied.

FIG. 11 is a diagram illustrating the format of a VHT compressed beamforming frame in a wireless communication system to which an embodiment of the present invention may be applied.

FIG. 12 is a diagram illustrating the format of a beamforming report poll frame in a wireless communication system to which an embodiment of the present invention may be applied.

FIG. 13 is a diagram illustrating a downlink multi-user (DL MU) PPDU format in a wireless communication system to which an embodiment of the present invention may be applied.

FIG. 14 is a diagram illustrating a downlink multi-user PPDU format in a wireless communication system to which an embodiment of the present invention may be applied.

FIG. 15 is a diagram illustrating a DL MU-MIMO transmission process in a wireless communication system to which an embodiment of the present invention may be applied.

FIG. 16 is a diagram illustrating an ACK frame in a wireless communication system to which an embodiment of the present invention may be applied.

FIG. 17 is a diagram illustrating a block ACK request frame in a wireless communication system to which an embodiment of the present invention may be applied.

FIG. 18 is a diagram illustrating the BAR information field of a block ACK request frame in a wireless communication system to which an embodiment of the present invention may be applied 의 를.

FIG. 19 is a diagram illustrating a block ACK frame in a wireless communication system to which an embodiment of the present invention may be applied.

FIG. 20 is a diagram illustrating the BA information field of a block ACK frame in a wireless communication system to which an embodiment of the present invention may be applied.

FIG. 21 is a diagram illustrating a high efficiency (HE) format PPDU according to an embodiment of the present invention.

FIGS. 22 to 24 are diagrams illustrating HE format PPDUs according to embodiments of the present invention.

FIG. 25 is a diagram illustrating an uplink multi-user (UL MU) transmission procedure according to an embodiment of the present invention.

FIGS. 26 to 28 are diagrams illustrating resource allocation units in an OFDMA multi-user transmission method according to an embodiment of the present invention.

FIGS. 29(a) and 29(b) are diagrams illustrating an MIMO control field and an antenna selection index field, respectively, in an 802.11n system.

FIG. 30 is a diagram illustrating a stand-alone unicast feedback method (or a DL sounding protocol).

FIG. 31 is a diagram illustrating an HE control field which is used in a feedback method according to a first embodiment of the present invention.

FIG. 32 is a diagram illustrating an HE control field which is used in a feedback method according to a second embodiment of the present invention.

FIG. 33 is a diagram illustrating a measuring frequency resource (MFR) according to a first embodiment of the present invention.

FIG. 34 is a diagram illustrating a stand-alone broadcast MU feedback method according to an embodiment of the present invention.

FIG. 35 is a diagram illustrating an NDPA trigger frame format according to an embodiment of the present invention.

FIG. 36 is a diagram illustrating an MFR according to a second embodiment of the present invention.

FIG. 37(a) is a diagram illustrating an FR according to a first embodiment of the present invention, FIG. 37(b) is a diagram illustrating an FR according to a second embodiment of the present invention, and FIG. 37(c) is a diagram illustrating an FG according to a third embodiment of the present invention.

FIG. 38 is a diagram illustrating an FR according to a fourth embodiment of the present invention.

FIG. 39 is a diagram illustrating the format of an HE control field according to an embodiment of the present invention.

FIG. 40 is a diagram showing the format of an (HE) trigger frame according to an embodiment of the present invention.

FIG. 41 is a diagram illustrating an UL sounding protocol according to an embodiment of the present invention.

FIG. 42 is a diagram illustrating the HE format of a trigger frame.

FIG. 43 is a diagram illustrating the HE format of a trigger frame according to an embodiment of the present invention.

FIG. 44 is a diagram illustrating an UL sounding protocol according to an embodiment of the present invention.

FIG. 45 is a flowchart illustrating the UL sounding supporting method of an STA device according to an embodiment of the present invention.

FIG. 46 is a block diagram of each STA device according to an embodiment of the present invention.

DETAILED DESCRIPTION OF THE EMBODIMENTS

Terms used in the present invention are common terms now widely used by taking into consideration functions in the present invention, but the terms may be changed depending on intentions or use practices of those skilled in the art or the appearance of a new technology. Furthermore, in a specific case, some terms are randomly selected by the applicant. In this case, the detailed meaning of a corresponding term will be described in the corresponding part of the description of the present invention. Accordingly, the terms used in the present invention should not be understood simply based on their names, but should be understood based on their substantial meanings and contents over this specification.

Furthermore, embodiments of the present invention are described in detail below with reference to the accompanying drawings and contents described in the drawings, but the present invention is not limited or restricted by the embodiments.

Some embodiments of the present invention are described in detail below with reference to the accompanying drawings.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the format of a non-HT PPDU is composed of a legacy format preamble, including a legacy (or non-HT) short training field (L-STF), a legacy (or non-HT) long training field (L-LTF), and a legacy (or non-HT) SIGNAL (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field includes a rate field of 4 bits, a reserved field of 1 bit, a length field of 12 bits, a parity field of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, and L-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

TABLE 1

| FIELD | BIT | DESCRIPTION |
| --- | --- | --- |
| MCS | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 illustrates the VHT-SIG-A1 field.

TABLE 2

| FIELD | BIT | DESCRIPTION |
|---|---|---|
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1 |

TABLE 2-continued

| FIELD | BIT | DESCRIPTION |
|---|---|---|
| | | "1" if a space-time stream is 2 |
| | | "2" if a space-time stream is 3 |
| | | "3" if a space-time stream is 4 |
| | | "4" if a space-time stream is 5 |
| | | "5" if a space-time stream is 6 |
| | | "6" if a space-time stream is 7 |
| | | "7" if a space-time stream is 8 |
| | | Lower 9 bits indicate a partial AID. |
| TXOP_PS_NOT_ALLOWED | 1 | Set to "0" if a VHT AP permits a non-AP VHT STA to switch to power save mode during transmission opportunity (TXOP) Set to "1" if not In the case of a VHT PPDU transmitted by a non-AP VHT STA Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

TABLE 3

| FIELD | BIT | DESCRIPTION |
|---|---|---|
| Short GI | 1 | Set to "0" if a short GI is not used in a data field Set to "1" if a short GI is used in a data field |
| Short GI disambiguation | 1 | Set to "1" if a short GI is used and an extra symbol is required for the payload of a PPDU Set to "0" if an extra symbol is not required |
| SU/MU coding | 1 | In the case of a VHT SU PPDU: Set to "0" in the case of binary convolutional code (BCC) Set to "1" in the case of low-density parity check (LDPC) In the case of a VHT MU PPDU: Indicate coding used if the NSTS field of a user whose user position is "0" is not "0" Set to "0" in the case of BCC Set to "1" in the case of PDPC Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU) Set to "0" if not |
| SU VHT MCS/MU coding | 4 | In the case of a VHT SU PPDU: Indicate a VHT-MCS index In the case of a VHT MU PPDU: Indicate coding for user positions "1" to "3" sequentially from upper bits Indicate coding used if the NSTS field of each user is not "1" Set to "0" in the case of BCC Set to "1" in the case of LDPC Set to "1" as a reserved field if the NSTS field of each user is "0" |
| Beamformed | 1 | In the case of a VHT SU PPDU: Set to "1" if a beamforming steering matrix is applied to SU transmission Set to "0" if not In the case of a VHT MU PPDU: Set to "1" as a reserved field |
| Reserved | 1 | |
| CRC | 8 | Include CRS for detecting an error of a PPDU on the receiver side |
| Tail | 6 | Used to terminate the trellis of a convolutional decoder Set to "0" |

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

More detail is described referring to below figure.

MAC Frame Format

FIG. 5 illustrates the format of an MAC frame for an IEEE 802.11 system to which an embodiment of the present invention may be applied.

Referring to FIG. 5, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field includes information about the characteristics of a corresponding MAC frame.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 6 is a diagram illustrating a frame control field within an MAC frame in a wireless communication system to which an embodiment of the present invention may be applied.

Referring to FIG. 6, the frame control field includes a protocol version subfield, a type subfield, a subtype subfield, a To DS subfield, a From DS subfield, a more fragments subfield, a retry subfield, a power management subfield, a more data subfield, a protected frame subfield, and an order subfield.

The protocol version subfield may indicate the version of a WLAN protocol applied to a corresponding MAC frame.

The type subfield and the subtype subfield may be configured to indicate information to identify the function of a corresponding MAC frame.

The type of an MAC frame may include three frame types: a management frame, a control frame, and a data frame.

Furthermore, each of the frame types may be divided into subtypes.

For example, the control frames may include a request to send (RTS) frame, a clear-to-send (CTS) frame, an acknowledgment (ACK) frame, a PS-poll frame, a contention free (CF)-end frame, a CF-end+CF-ACK frame, a block acknowledgment (ACK) request (BAR) frame, a block acknowledgment (ACK) (BA) frame, a control wrapper (control+HT control) frame, a VHT null data packet announcement (NDPA) frame, and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information required to interpret an Address 1 field to an Address 4 field included in the header of a corresponding MAC frame. In the case of a control frame, both the To DS subfield and the From DS subfield are set to "0." In the case of the management frame, the To DS subfield and the From DS subfield may be sequentially set to "1" and "0" if a corresponding frame is a QoS management frame (QMF), and may be sequentially set to "0" and "0" if a corresponding frame is not a QMF.

The More Fragments subfield may indicate whether a fragment to be transmitted after a corresponding MAC frame is present. The More Fragments subfield may be set to "1" if another fragment of a current MSDU or MMPDU is present, and may be set to "0" if another fragment of a current MSDU or MMPDU is not present.

The retry subfield may indicate whether a corresponding MAC frame is based on the retransmission of a previous MAC frame. The retry subfield may be set to "1" if a corresponding MAC frame is based on the retransmission of a previous MAC frame, and may be set to "0" if a corresponding MAC frame is not based on the retransmission of a previous MAC frame.

The power management subfield may indicate power management mode of an STA. If the value of the power management subfield is "1", it may indicate that an STA should switch to power save mode.

The more data subfield may indicate whether an MAC frame to be additionally transmitted is present. The more data subfield may be set to "1" if an MAC frame to be additionally transmitted is present, and may be set to "0" if an MAC frame to be additionally transmitted is not present.

The protected frame subfield may indicate whether a frame body field has been encrypted. The protected frame subfield may be set to "1" if the frame body field includes information processed by a cryptographic encapsulation algorithm, and may be set to "0" if the frame body field does not include information processed by a cryptographic encapsulation algorithm.

The pieces of information included in each of the aforementioned fields may comply with the definition of the IEEE 802.11 system. Furthermore, each of the aforementioned fields corresponds to an example of fields which may be included in an MAC frame, but the present invention is not limited thereto. That is, each of the aforementioned fields may be substituted with another field or may further include an additional field, and all of the fields may not be essentially included.

FIG. 7 illustrates the VHT format of an HT control field in a wireless communication system to which an embodiment of the present invention may be applied.

Referring to FIG. 7, the HT control field may include a VHT subfield, an HT control middle subfield, an AC constraint subfield, and a reverse direction grant (RDG)/more PPDU subfield.

The VHT subfield indicates whether an HT control field has the format of the HT control field for a VHT (VHT=1) or the format of the HT control field for an HT (VHT=0). In FIG. 8, an HT control field for a VHT (i.e., VHT=1) is assumed and described. An HT control field for a VHT may also be called a VHT control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set to "1" if an RDG is present, and the RDG/more PPDU subfield is set to "0" if an RDG is not present. Assuming that a corresponding field is transmitted by an RD responder, the RDG/more PPDU subfield is set to "1" if a PPDU including the corresponding subfield is the last frame transmitted by the RD responder, and the RDG/more PPDU subfield is set to "0" if another PPDU is transmitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Table 4 illustrates a description of each subfield included in the HT control middle subfield of the VHT format.

TABLE 4

| SUBFIELD | MEANING | DEFINITION |
|---|---|---|
| MRQ | MCS request | Set to "1" if MCS feedback (solicited MFB) is not requested<br>Set to "0" if not |
| MSI | MRQ sequence identifier | An MSI subfield includes a sequence number within a range of 0 to 6 to identify a specific request if an unsolicited MFB subfield is set to "0" and an MRQ subfield is set to "1."<br>Include a compressed MSI subfield (2 bits) and an STBC indication subfield (1 bit) if an unsolicited MFB subfield is "1." |
| MFSI/GID-L | MFB sequence identifier/LSB of group ID | An MFSI/GID-L subfield includes the received value of an MSI included within a frame related to MFB information if an unsolicited MFB subfield is set to "0."<br>An MFSI/GID-L subfield includes the lowest three bits of a group ID of a PPDU estimated by an MFB if an MFB is estimated from an MU PPDU. |
| MFB | VHT N_STS, MCS, BW, SNR feedback | An MFB subfield includes recommended MFB.<br>VHT-MCS = 15, NUM_STS = 7 indicates that feedback is not present. |
| GID-H | MSB of group ID | A GID-H subfield includes the most significant bit 3 bits of a group ID of a PPDU whose solicited MFB has been estimated if an unsolicited MFB field is set to "1" and MFB has been estimated from a VHT MU PPDU.<br>All of GID-H subfields are set to "1" if MFB is estimated from an SU PPDU. |
| Coding Type | Coding type or MFB response | If an unsolicited MFB subfield is set to "1", a coding type subfield includes the coding type (binary convolutional code (BCC) includes 0 and low-density parity check (LDPC) includes 1) of a frame whose solicited MFB has been estimated |
| FB Tx Type | Transmission type of MFB response | An FB Tx Type subfield is set to "0" if an unsolicited MFB subfield is set to "1" and MFB has been estimated from an unbeamformed VHT PPDU.<br>An FB Tx Type subfield is set to "1" if an unsolicited MFB subfield is set to "1" and MFB has been estimated from a beamformed VHT PPDU. |
| Unsolicited MFB | Unsolicited MCS feedback indicator | Set to "1" if MFB is a response to MRQ<br>Set to "0" if MFB is not a response to MRQ |

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Channel State Information (CSI) Feedback Method

An SU-MIMO technology in which a beamformer allocates all of antennas to a single beamformee and performs communication increases a channel capacity through a diversity gain and stream multi-transmission using the space-time. The SU-MIMO technology can contribute to the improvement of performance of the physical layer by extending the degree of space freedom in such a way as to increase the number of antennas compared to a case where an MIMO technology is not applied.

Furthermore, the MU-MIMO technology in which a beamformer allocates an antenna to a plurality of beamformees can improve performance of an MIMO antenna by increasing the transfer rate per beamformee or the reliability of a channel through a link layer protocol for the multi-access of a plurality of beamformees which have accessed a beamformer.

In an MIMO environment, there is a need for a feedback procedure for obtaining channel information because performance may be greatly influenced depending on how accurately is a beamformer aware of channel information.

Two methods may be basically supported for the feedback procedure for obtaining channel information. One method is a method using a control frame, and the other method is a method using a channel sounding procedure not including a data field. Sounding means that a corresponding field is used in order to measure a channel for purposes other than the data demodulation of a PPDU including a preamble training field.

Hereinafter, a channel information feedback method using a control frame and a channel information feedback method using a null data packet (NDP) are described in more detail.

1) A feedback method using a control frame

In an MIMO environment, a beamformer may indicate the feedback of channel state information through an HT control field included in an MAC header, or a beamformee may report channel state information through an HT control field included in an MAC frame header (see FIG. 8). The channel state information included in the HT control field may include signal to noise (SNR) information about all of transfer channels (or the full transmission bandwidth) in which an UL/DL PPDU is transmitted. An MCS feedback (MFR) field included in the HT control field may include a Num_STS field (3 bits), a VHT-MCS field (4 bits), a BW field (2 bits), and an SNR field (6 bits).

The Num_STS field indicates the number of streams recommended by an STA depending on the results of the measurement of a channel state. The VHT-MCS field indicates an MCS level recommended by an STA depending on the results of the measurement of a channel state. The BW field indicates a bandwidth recommended by an STA for an MCS level indicated by a VHT-MCS field if an unsolicited MFB field for an HT control field is "1", and is used as reserved bits if the unsolicited MFB field is "0." The SNR field indicates an average SNR for data tones and time-space streams.

The HT control field may be included in a control wrapper frame or a QoS data frame in which the order subfield of an MAC header has been set to 1 or a management frame.

2) A feedback method using channel sounding

FIG. 8 is a diagram conceptually illustrating a channel sounding method in a wireless communication system to which an embodiment of the present invention may be applied.

FIG. 8 illustrates a method for feeding back channel state information between a beamformer (e.g., an AP) and a beamformee (e.g., a non-AP STA) based on a sounding protocol. The sounding protocol may mean a procedure for receiving information about channel state information through feedback.

A channel state information sounding method between a beamformer and a beamformee based on the sounding protocol may be performed according to the following steps.

(1) A beamformer sends a VHT null data packet announcement (VHT NDPA) frame for providing notification of sounding transmission for the feedback of a beamformee.

The VHT NDPA frame refers to a control frame which is used to provide notification that channel sounding is initiated and a null data packet (NDP) will be transmitted. In other words, by sending the VHT NDPA frame prior to the transmission of the NDP frame, a beamformee may be prepared for the feedback of channel state information before receiving the NDP frame.

The VHT NDPA frame may include association identifier (AID) information, feedback type information, etc. about a beamformee which will send an NDP. The VHT NDPA frame will be described in more detail later.

The VHT NDPA frame may be transmitted using different methods if data is transmitted using MU-MIMO and if data is transmitted using SU-MIMO. For example, if channel sounding for MU-MIMO is performed, the VHT NDPA frame may be transmitted using a broadcast method. In contrast, if channel sounding for SU-MIMO is performed, the VHT NDPA frame may be transmitted to a single target STA using a unicast method.

(2) A beamformer sends an NDP after an SIFS time after sending a VHT NDPA frame. The NDP has a VHT PPDU structure other than a data field.

Beamformees that have received the VHT NDPA frame may check the value of an AID12 subfield included in an STA information field and check whether each of the beamformees is a sounding target STA.

Furthermore, the beamformees may be aware of a feedback sequence through the sequence of an STA Info field included in NDPA. FIG. 8 illustrates a case where a feedback sequence is performed in order of a beamformee 1, a beamformee 2, and a beamformee 3.

(3) The beamformee 1 obtains DL channel state information based on a training field included in an NDP and generates feedback information to be transmitted to a beamformer.

After receiving the NDP frame, the beamformee 1 sends a VHT compressed beamforming frame, including feedback information, to the beamformer after an SIFS.

The VHT compressed beamforming frame may include the SNR value of a space-time stream, information about the compressed beamforming feedback matrix of a subfarrier, etc. The VHT compressed beamforming frame is described in more detail later.

(4) After receiving the VHT compressed beamforming frame from the beamformee 1, the beamformer sends a beamforming report poll frame to the beamformee 2 after an SIFS in order to obtain channel information from the beamformee 2.

The beamforming report poll frame plays the same role as the NDP frame. The beamformee 2 may measure a channel state based on the transmitted beamforming report poll frame.

The beamforming report poll frame is described in more detail later.

(5) The beamformee 2 that has received the beamforming report poll frame sends a VHT compressed beamforming frame, including feedback information, to the beamformer after an SIFS.

(6) After receiving the VHT compressed beamforming frame from the beamformee 2, the beamformer sends a beamforming report poll frame to the beamformee 3 in order to obtain channel information from the beamformee 3 after an SIFS.

(7) The beamformee 3 that has received the beamforming report poll frame sends a VHT compressed beamforming frame, including feedback information, to the beamformer after an SIFS.

A frame used in the above-described channel sounding procedure is described below.

FIG. 9 is a diagram illustrating a VHT NDPA frame in a wireless communication system to which an embodiment of the present invention may be applied.

Referring to FIG. 9, the VHT NDPA frame may include a frame control field, a duration field, a receiving address (RA) field, a transmitting address (TA) field, a sounding dialog token field, an STA information 1 (STA Info 1) field to an STA information n (STA Info n) field, and FCS.

The value of the RA field indicates the address of a recipient or STA which receives a VHT NDPA frame.

If the VHT NDPA frame includes a single STA Info field, the value of the RA field has the address of an STA identified by an AID within the STA Info field. For example, if the VHT NDPA frame is transmitted to a single target STA for SU-MIMO channel sounding, an AP sends the VHT NDPA frame to a target STA in a unicast manner.

In contrast, if the VHT NDPA frame includes one or more STA Info fields, the value of the RA field has a broadcast address. For example, if the VHT NDPA frame is transmitted to one or more target STAs for MU-MIMO channel sounding, an AP broadcasts the VHT NDPA frame.

The value of the TA field indicates the address of a transmitter which sends the VHT NDPA frame, the address of an STA which sends the VHT NDPA frame, or a bandwidth which signalizes TA.

The sounding dialog token field may also be called a sounding sequence field. A sounding dialog token number subfield within the sounding dialog token field includes a value selected by a beamformer in order to identify the VHT NDPA frame.

The VHT NDPA frame includes at least one STA Info field. That is, the VHT NDPA frame includes an STA Info field including information about a sounding target STA. One STA Info field may be included in each sounding target STA.

Each STA Info field may include an AID12 subfield, a feedback type subfield, and an Nc index subfield.

Table 5 shows the subfields of the STA Info field included in the VHT NDPA frame.

TABLE 5

| Subfield | Description |
| --- | --- |
| AID 12 | Include the AID of an STA, that is, the subject of sounding feedback.<br>If a target STA is an AP, a mesh STA or an STA, that is, a member of an IBSS, the value of the AID12 subfield is set to "0". |
| Feedback Type | Indicate a feedback request type for a sounding target STA.<br>"0" in the case of SU-MIMO<br>"1" in the case of MU-MIMO |
| Nc Index | If a feedback type subfield indicates MU-MIMO, indicates a value obtained by subtracting 1 from the column number Nc of a compressed beamforming feedback matrix.<br>"0" if Nc = 1,<br>"1" if Nc = 2,<br>...<br>"7" if Nc = 8,<br>Set as a reserved subfield in the case of SU-MIMO. |

The pieces of information included in each of the above-described fields may comply with the definition of an IEEE 802.11 system. Furthermore, the above-described fields may correspond to an example of fields which may be included in an MAC frame, may be replaced with other fields, or may further include an additional field.

FIG. 10 is a diagram illustrating an NDP PPDU in a wireless communication system to which an embodiment of the present invention may be applied.

Referring to FIG. 10, an NDP may have a format from which a data field has been omitted in the same VHT PPDU format as that of FIG. 4. The NDP may be precoded based on a specific precoding matrix and transmitted to a sounding target STA.

In the L-SIG field of the NDP, a length field indicating the length of a PSDU included in a data field is set to "0."

In the VHT-SIG-A field of the NDP, a Group ID field indicating whether a transmission scheme used for NDP transmission is MU-MIMO or SU-MIMO is set as a value indicating SU-MIMO transmission.

The data bit of the VHT-SIG-B field of the NDP is set in a bit pattern fixed for each bandwidth.

When a sounding target STA receives an NDP, it estimates a channel and obtains channel state information based on the VHT-LTF field of the NDP.

FIG. 11 is a diagram illustrating the format of a VHT compressed beamforming frame in a wireless communication system to which an embodiment of the present invention may be applied.

Referring to FIG. 11, the VHT compressed beamforming frame is a VHT action frame for supporting a VHT function and includes an action field in a frame body. The action field is included in the frame body of an MAC frame, and provides a mechanism for specifying extended management actions.

The action field is composed of a category field, a VHT action field, a VHT MIMO control field, a VHT compressed beamforming report field, and an MU exclusive beamforming report field.

The category field is set as a value indicating a VHT category (i.e., a VHT Action frame). The VHT action field is set as a value indicating a VHT compressed beamforming frame.

The VHT MIMO control field is used to feed back control information related to beamforming feedback. The VHT MIMO control field may be always present in the VHT compressed beamforming frame.

The VHT compressed beamforming report field is used to feed back information about beamforming metric including SNR information about a space-time stream which is used to send data.

The MU exclusive beamforming report field is used to feed back SNR information about a spatial stream if MU-MIMO transmission is performed.

Whether the VHT compressed beamforming report field and the MU exclusive beamforming report field are present or not and the contents thereof may be determined based on the values of the feedback type subfield, remaining feedback segments subfield, and first feedback segment subfield of the VHT MIMO control field.

The VHT MIMO control field, the VHT compressed beamforming report field, and the MU exclusive beamforming report field are described in more detail below.

1) The VHT MIMO control field is composed of an Nc index subfield, an Nr index subfield, a channel width subfield, a grouping subfield, a codebook information subfield, a feedback type subfield, a remaining feedback segments subfield, a first feedback segment subfield, a reserved subfield, and a sounding dialog token number subfield.

Table 6 shows the subfields of the VHT MIMO control field.

TABLE 6

| Subfield | number of bits | description |
| --- | --- | --- |
| Nc Index | 3 | Indicate a value obtained by subtracting 1 from the column number Nc of a compressed beamforming feedback matrix.<br>"0" if Nc = 1, "1" if Nc = 2, ... "7" if Nc = 8 |
| Nr Index | 3 | Indicate a value obtained by subtracting 1 from the row number Nr of a compressed beamforming feedback matrix.<br>"0" if Nr = 1, "1" if Nr = 2, ... "7" if Nr = 8 |
| Channel Width | 2 | Indicate the bandwidth of a channel measured in order to generate a compressed beamforming feedback matrix. "0" in the case of 20 MHz, "1" in the case of 40 MHz, "2" in the case of 80 MHz, and "3" in the case of 160 MHz or 80 + 80 MHz |
| Grouping | 2 | Indicate subcarrier grouping Ng used in a compressed beamforming feedback matrix. "0" if Ng = 1 (no grouping), "1" if Ng = 2, "2" if Ng = 4, and a value "3" is set as a reserved value |

TABLE 6-continued

| Subfield | number of bits | description |
|---|---|---|
| Codebook Information | 1 | Indicate the size of codebook entries.<br>If a feedback type is SU-MIMO,<br>"0" if bψ = 2, bΦ = 4, "1" if bψ = 4, bΦ = 6,<br>If a feedback type is MU-MIMO,<br>"0" if bψ = 5, bΦ = 7, "1" if bψ = 7, bΦ = 9,<br>In this case, bψ and bΦ refer to the number of quantized bits. |
| Feedback Type | 1 | Indicate a feedback type.<br>"0" in the case of SU-MIMO, "1" in the case of MU-MIMO |
| Remaining Feedback Segments | 3 | Indicate the number of remaining feedback segments of a related VHT compressed beamforming frame. Set to "0" in the case of the last feedback segment of a segmented report or a segment of an unsegmented report. Set as a value from "1" to "6" not in the case of the first or last feedback segment of a segmented report. Set as a value from "1" to "6" in the case of a feedback segment other than the last segment of a segmented report.<br>In the case of a retransmission feedback segment, a field is set as the same value as a related segment of the original transmission. |
| First Feedback Segments | 1 | Set to "1" in the case of the first feedback segment of a segmented report or the feedback segment of an unsegmented report.<br>Set to "0" not in the case of the first feedback segment or if a VHT compressed beamforming report field or an MU exclusive beamforming report field is not present in a frame. The field is set as the same value as a related segment of the original transmission |
| Sounding Dialog Token Number | 6 | Set as the value of the sounding dialog token of an NDPA frame |

If the VHT compressed beamforming frame does not transfer some or all of the VHT compressed beamforming report field, the Nc Index subfield, the channel width subfield, the grouping subfield, the codebook information subfield, the feedback type subfield, and the sounding dialog token number subfield are set as reserved fields, the first feedback segment subfield is set to "0", and the remaining feedback segments subfield is set to "7."

The sounding dialog token number subfield may also be called a sounding sequence number subfield.

2) The VHT compressed beamforming report field is used to transfer explicit feedback information that expresses a compressed beamforming feedback matrix "V", used by a transmitting beamformer to determine a steering matrix "Q", in an angle form.

Table 7 shows the subfields of the VHT compressed beamforming report field.

TABLE 7

| subfield | number of bits | description |
|---|---|---|
| Average SNR of space-time stream 1 | 8 | Average SNR on all of subcarriers for a space-time stream 1 in a beamformee |
| ... | ... | ... |
| Average SNR of space-time stream Nc | 8 | Average SNR on all of subcarriers for a space-time stream Nc in a beamformee |
| Compressed beamforming feedback matrix V for subcarrier k = scidx (o) | Na*(bψ + bΦ)/2 | Sequence of the angle of a compressed beamforming feedback matrix for a corresponding subcarrier |
| Compressed beamforming feedback matrix V for subcarrier k = scidx (1) | Na*(bψ + bΦ)/2 | Sequence of the angle of a compressed beamforming feedback matrix for a corresponding subcarrier |
| ... | ... | ... |
| Compressed beamforming feedback matrix V for subcarrier k = scidx (Ns − 1) | Na*(bψ + bΦ)/2 | Sequence of the angle of a compressed beamforming feedback matrix for a corresponding subcarrier |

Referring to Table 7, the VHT compressed beamforming report field may include an average SNR of space-time streams and the compressed beamforming feedback matrix "V" of each subcarrier. The compressed beamforming feedback matrix is a matrix including information about a channel situation, and is used to calculate a channel matrix (i.e., a steering matrix "Q") in a transmission method using MIMO.

scidx( ) means a subcarrier in which a compressed beamforming feedback matrix subfield is transmitted. Na is fixed by an Nr×Nc value (e.g., if Nr×Nc=2×1, Φ11, Ψ21, . . . ).

Ns refers to the number of subcarriers in which a compressed beamforming feedback matrix is transmitted to a beamformer. A beamformee may reduce the number of subcarriers Ns in which a compressed beamforming feedback matrix is transmitted using a grouping method. For example, the number of feedback compressed beamforming feedback matrices can be reduced by grouping a plurality of subcarriers into a single group (or grouping a plurality of subcarriers in an Ng unit) and transmitting compressed beamforming feedback matrices for each corresponding group. Ns may be calculated from a channel width subfield and a grouping subfield included in the VHT MIMO control field.

Table 8 illustrates an average SNR subfield of a space-time stream.

TABLE 8

| Average SNR of Space-Time i subfield | AvgSNR i |
|---|---|
| −128 | ≤−10 dB |
| −127 | −9.75 dB |
| −126 | −9.5 dB |
| ... | ... |
| +126 | 53.5 dB |
| +127 | ≥53.75 dB |

Referring to Table 8, an average SNR of each of space-time streams is calculated by calculating an average SNR value of all of subcarriers included in a channel and mapping the calculated average SNR value in a range of −128~+128.

3) The MU exclusive beamforming report field is used to transfer explicit feedback information expressed in the form of a delta( ) SNR. Information within the VHT compressed beamforming report field and the MU exclusive beamforming report field may be used for an MU beamformer to determine a steering matrix "Q."

Table 9 shows the subfields of the MU exclusive beamforming report field included in the VHT compressed beamforming frame.

TABLE 9

| Subfield | Number of Bits | Description |
|---|---|---|
| A delta SNR for a space-time stream 1 for a subcarrier k = sscidx (0) | 4 | A deviation between the SNR of a corresponding subcarrier and an average SNR of all the subcarriers of a corresponding space-time stream |
| ... | | |
| A delta SNR for a space-time stream Nc for a subcarrier k = sscidx (0) | 4 | A deviation between the SNR of a corresponding subcarrier and an average SNR of all the subcarriers of a corresponding space-time stream |
| A delta SNR for a space-time stream 1 for a subcarrier k = sscidx (1) | 4 | A deviation between the SNR of a corresponding subcarrier and an average SNR of all the subcarriers of a corresponding space-time stream |
| ... | | |
| A delta SNR for a space-time stream Nc for a subcarrier k = sscidx (1) | 4 | A deviation between the SNR of a corresponding subcarrier and an average SNR of all the subcarriers of a corresponding space-time stream |
| ... | | |
| A delta SNR for a space-time stream 1 for a subcarrier k = sscidx (Ns' − 1) | 4 | A deviation between the SNR of a corresponding subcarrier and an average SNR of all the subcarriers of a corresponding space-time stream |
| ... | | |
| A delta SNR for a space-time stream Nc for a subcarrier k = sscidx (Ns' − 1) | 4 | A deviation between the SNR of a corresponding subcarrier and an average SNR of all the subcarriers of a corresponding space-time stream |

Referring to Table 9, the MU exclusive beamforming report field may include an SNR per space-time stream for each subcarrier.

Each delta SNR subfield has a value that increases at an interval of 1 dB between −8 dB and 7 dB.

scidx( ) refers to a subcarrier(s) in which a delta SNR subfield is transmitted, and Ns refers to the number of subcarriers in which a delta SNR subfield is transmitted to a beamformer.

FIG. 12 is a diagram illustrating the format of a beamforming report poll frame in a wireless communication system to which an embodiment of the present invention may be applied.

Referring to FIG. 12, the beamforming report poll frame is composed of a frame control field, a duration field, a receiving address (RA) field, a transmitting address (TA) field, a feedback segment retransmission bitmap field, and an FCS.

The value of the RA field indicates the address of an intended recipient.

The value of the TA field indicates the address of an STA that sends the beamforming report poll frame or a bandwidth which signals a TA.

The feedback segment retransmission bitmap field indicates a feedback segment that is requested in a VHT compressed beamforming report.

In the value of the feedback segment retransmission bitmap field, if the bit of a location n is "1", (n=0 in the case of the LSB and n=7 in the case of the MSB), a feedback segment corresponding to "n" in the remaining feedback segments subfield within the VHT MIMO control field of a VHT compressed beamforming frame is requested. In contrast, if the bit of the location n is "0", a feedback segment corresponding to "n" in the remaining feedback segments subfield within the VHT MIMO control field is not requested.

DL MU-MIMO Frame

FIG. 13 is a diagram illustrating a downlink multi-user (DL MU) PPDU format in a wireless communication system to which an embodiment of the present invention may be applied.

Referring to FIG. 13, the PPDU is configured to include a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the MPDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

FIG. 14 is a diagram illustrating a DL multi-user (MU) PPDU format in a wireless communication system to which an embodiment of the present invention may be applied.

In FIG. 14, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 14, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 10, each VHT A-MPDU may be transmitted in a different stream.

In FIG. 14, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block ACK Procedure

FIG. 15 is a diagram illustrating a DL MU-MIMO transmission process in a wireless communication system to which an embodiment of the present invention may be applied.

In 802.11ac, MU-MIMO is defined in DL from an AP toward a client (i.e., a non-AP STA). In this case, a multi-user is simultaneously transmitted to a multi-recipient, but acknowledgement may be individually transmitted in UL.

All of MPDUs transmitted within a VHT MU PPDU based on 802.11ac are included in an A-MPDU. A response to an A-MPDU within a VHT MU PPDU other than an instant response to a VHT MU PPDU is transmitted as a response to a block ACK request (BAR) frame by an AP.

First, an AP sends a VHT MU PPDU (i.e., a preamble and data) to all of recipients (i.e., an STA 1, an STA 2, and an STA 3). The VHT MU PPDU includes a VHT A-MPDU transmitted to each STA.

The STA 1 that has received the VHT MU PPDU from the AP sends a block ACK (BA) frame to the AP after an SIFS. The BA frame is described in more detail later.

The AP that has received the BA from the STA 1 sends a block acknowledgement request (BAR) frame to the next STA 2 after an SIFS. The STA 2 sends a BA frame to the AP after an SIFS. The AP that has received the BA frame from the STA 2 sends a BAR frame to the STA 3 after an SIFS. The STA 3 sends a BA frame to the AP after an SIFS.

If such a process is performed on all of the STAs, the AP sends a next MU PPDU to all of the STAs.

Acknowledgement (ACK)/Block ACK Frame

In general, an ACK frame is used as a response to an MPDU, and a block ACK frame is used as a response to an A-MPDU.

FIG. 16 is a diagram illustrating an ACK frame in a wireless communication system to which an embodiment of the present invention may be applied.

Referring to FIG. 16, the ACK frame is composed of a frame control field, a duration field, an RA field, and an FCS.

The RA field is set as the value of the second address (Address 2) field of a data frame, a management frame, a block ACK request frame, a block ACK frame or a PS-Poll frame that has been received right before.

When an ACK frame is transmitted by a non-QoS STA, if a more fragments subfield within the frame control field of a data frame or a management frame that has been received right before is "0", a duration value is set to "0."

In an ACK frame not transmitted by a non-QoS STA, a duration value is set as a value (ms) obtained by subtracting the time required to send the ACK frame and an SIFS interval from the duration/ID field of a data frame, a management frame, a block ACK request frame, a block ACK frame or a PS-Poll frame that has been received right before. If the calculated duration value is not an integer value, it is rounded off to the nearest whole number.

Hereinafter, a block ACK (request) frame is described.

FIG. 17 is a diagram illustrating a block ACK request frame in a wireless communication system to which an embodiment of the present invention may be applied.

Referring to FIG. 17, the block ACK request (BAR) frame is composed of a frame control field, a duration/ID field, a reception address (RA) field, a transmission address (TA) field, a BAR control field, a BAR information field, and a frame check sequence (FCS).

The RA field may be set as the address of an STA that receives the BAR frame.

The TA field may be set as the address of an STA that sends the BAR frame.

The BAR control field includes a BAR ACK policy subfield, a multi-TID subfield, a compressed bitmap subfield, a reserved subfield, and a TID information (TID_Info) subfield.

Table 10 illustrates the BAR control field.

TABLE 10

| subfield | bit | description |
| --- | --- | --- |
| BAR ACK policy | 1 | Set to "0" when a sender requests an immediate ACK for data transmission. Set to "1" when a sender does not request an immediate ACK for data transmission. |
| Multi-TID | 1 | Indicate the type of BAR frame depending on the values of a multi-TID subfield and a compressed bitmap subfield. 00: Basic BAR 01: Compressed BAR 10: Reserved value 11: Multi-TID BAR |
| Compressed bitmap | 1 | |
| Reserved | 9 | |
| TID_Info | 4 | The meaning of a TID_Info field is determined by the type of BAR frame. Include TID that requests a BA frame in the case of a basic BAR frame, a compressed BAR frame. Include the number of TIDs in the case of a multi-TID BAR frame |

The BAR Information field includes different information depending on the type of BAR frame. This is described with reference to FIG. 18.

FIG. 18 is a diagram illustrating the BAR information field of a block ACK request frame in a wireless communication system to which an embodiment of the present invention may be applied.

FIG. 18(a) illustrates the BAR Information field of a basic BAR frame and a compressed BAR frame, and FIG. 18(b) illustrates the BAR Information field of a multi-TID BAR frame.

Referring to FIG. 18(a), in the case of the basic BAR frame and the compressed BAR frame, the BAR information field includes a block ACK starting sequence control subfield.

Furthermore, the block ACK starting sequence control subfield includes a fragment number subfield and a starting sequence number subfield.

The fragment number field is set to 0.

In the case of the basic BAR frame, the starting sequence number subfield includes the sequence number of the first MSDU in which a corresponding BAR frame is transmitted. In the case of the compressed BAR frame, the starting sequence control subfield includes the sequence number of the first MSDU or A-MSDU for transmitting a corresponding BAR frame.

Referring to FIG. 18(b), in the case of the multi-TID BAR frame, the BAR Information field is configured in such a manner that a Per TID Info subfield and a block ACK starting sequence control subfield are repeated for one or more TIDs.

The Per TID Info subfield includes a reserved subfield and a TID value subfield. The TID value subfield includes a TID value.

The block ACK starting sequence control subfield, as described above, includes a fragment number and a starting sequence number subfield. The fragment number field is set to 0. The starting sequence control subfield includes the sequence number of the first MSDU or A-MSDU for transmitting a corresponding BAR frame.

FIG. 19 is a diagram illustrating a block ACK frame in a wireless communication system to which an embodiment of the present invention may be applied.

Referring to FIG. 19, the block ACK (BA) frame is composed of a frame control field, a duration/ID field, a reception address (RA) field, a transmission address (TA) field, a BA control field, a BA information field, and a frame check sequence (FCS).

The RA field may be set as the address of an STA that has requested a block ACK.

The TA field may be set as the address of an STA that sends a BA frame.

The BA control field includes a BA ACK policy subfield, a multi-TID subfield, a compressed bitmap subfield, a reserved subfield, and a TID information (TID Info) subfield.

Table 11 illustrates the BA control field.

TABLE 11

| subfield | bit | description |
| --- | --- | --- |
| BA ACK policy | 1 | Set to "0" when a sender requests an immediate ACK for data transmission. Set to "1" when a sender does not request an immediate ACK for data transmission. |
| Multi-TID | 1 | Indicate the type of BA frame depending on the values of a multi-TID subfield and a compressed bitmap subfield. 00: Basic BA 01: Compressed BA 10: Reserved value 11: Multi-TID BA |
| Compressed bitmap | 1 | |
| Reserved | 9 | |
| TID_Info | 4 | The meaning of a TID_Info field is determined by the type of BA frame. Include TID that requests a BA frame in the case of a basic BA frame, a compressed BA frame. Include the number of TIDs in the case of a multi-TID BA frame |

The BA information field includes different information depending on the type of BA frame. This is described below with reference to FIG. 20.

FIG. 20 is a diagram illustrating the BA information field of a block ACK frame in a wireless communication system to which an embodiment of the present invention may be applied.

FIG. 20(a) illustrates the BA information field of a basic BA frame, FIG. 20(b) illustrates the BA information field of a compressed BA frame, and FIG. 20(c) illustrates the BA information field of a multi-TID BA frame.

Referring to FIG. 20(a), in the case of the basic BA frame, the BA information field includes a block ACK starting sequence control subfield and a block ACK bitmap subfield.

The block ACK starting sequence control subfield includes a fragment number field and a starting sequence number subfield as described above.

The fragment number field is set to 0.

The starting sequence number subfield includes the sequence number of the first MSDU for transmitting a corresponding BA frame, and is set as the same value as the basic BAR frame that has been received right before.

The block ACK bitmap subfield has a length of 128 octets and is used to indicate the reception state of a maximum of 64 MSDUs. In the block ACK bitmap subfield, a value "1" indicates that an MPDU corresponding to a corresponding bit location has been successfully received. A value "0" indicates that an MPDU corresponding to a corresponding bit location has not been successfully received.

Referring to FIG. 20(b), in the case of the compressed BA frame, the BA information field includes a block ACK starting sequence control subfield and a block ACK bitmap subfield.

The block ACK starting sequence control subfield includes a fragment number field and a starting sequence number subfield as described above.

The fragment number field is set to 0.

The starting sequence number subfield includes the sequence number of the first MSDU or A-MSDU for transmitting a corresponding BA frame, and is set as the same value as the basic BAR frame that has been received right before.

The block ACK bitmap subfield has a length of 8 octets and is used to indicate the reception state a maximum of 64 MSDUs and A-MSDUs. In the block ACK bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

Referring to FIG. 20(c), in the case of the multi-TID BA frame, the BA information field is configured in such a manner that a Per TID Info subfield, a block ACK starting sequence control subfield, and a block ACK bitmap subfield are repeated for one or more TIDs and is configured in order of an increasing TID.

The Per TID Info subfield includes a reserved subfield and a TID value subfield. The TID value subfield includes a TID value.

The block ACK starting sequence control subfield includes a fragment number and a starting sequence number subfield as described above. The fragment number field is set to 0. The starting sequence control subfield includes the sequence number of the first MSDU or A-MSDU for transmitting a corresponding BA frame.

The block ACK bitmap subfield has a length of 8 octets. In the block ACK bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 21 is a diagram illustrating a high efficiency (HE) format PPDU according to an embodiment of the present invention.

FIG. 21(a) illustrates a schematic configuration of the HE format PPDU, and FIGS. 21(b) to 21(d) illustrate more detailed configurations of the HE format PPDU.

Referring to FIG. 21(a), the HE format PPDU for an HEW may basically include a legacy part (L-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include an HE-STF, an HE-SIG field, and an HE-LTF. In FIG. 25(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble ("preamble").

Furthermore, the L-part and the HE-part (or HE-preamble) may be commonly called a physical (PHY) preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

Referring to FIG. 21 (b), the HE-SIG field may be divided into an HE-SIG-A field and an HE-SIG-B field.

For example, the HE-part of the HE format PPDU may include an HE-SIG-A field having a length of 12.8 μs, an HE-STF of 1 OFDM symbol, one or more HE-LTFs, and an HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 160 MHz, respectively.

In this case, if the HE-SIG field is divided into the HE-SIG-A field and the HE-SIG-B field as in FIG. 21(b), the positions of the HE-SIG-A field and the HE-SIG-B field may be different from those of FIG. 21(a). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 21(c), the HE-SIG field may not be divided into an HE-SIG-A field and an HE-SIG-B field.

For example, the HE-part of the HE format PPDU may include an HE-STF of 1 OFDM symbol, an HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

Referring to FIG. 21(d), the HE-SIG field is not divided into an HE-SIG-A field and an HE-SIG-B field, and the HE-LTF may be omitted.

For example, the HE-part of the HE format PPDU may include an HE-STF of 1 OFDM symbol and an HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for a WLAN system according to an embodiment of the present invention may be transmitted through at least one 20 MHz channel. For example, the HE format PPDU may be transmitted in a 40 MHz, 80 MHz or 160 MHz frequency band through a total of four 20 MHz channels. This is described in more detail.

FIG. 22 is a diagram illustrating HE format PPDUs according to embodiment of the present invention.

FIG. 22 illustrates a PPDU format if 80 MHz has been allocated to a single STA (or if an OFDMA resource unit has been allocated to a plurality of STAs within 80 MHz) or if different streams of 80 MHz have been allocated to a plurality of STAs, respectively.

Referring to FIG. 22, an L-STF, an L-LTF, and an L-SIG field may be transmitted in an OFDM symbol generated based on 64 FFT points (or 64 subcarriers) in each 20 MHz channel.

Furthermore, an HE-SIG B field may be located after an HE-SIG A field. In this case, an FFT size per unit frequency may be further increased after the HE-STF (or HE-SIG B field). For example, from the HE-STF (or HE-SIG B field), 256 FFT may be used in a 20 MHz channel, 512 FFT may be used in a 40 MHz channel, and 1024 FFT may be used in a 80 MHz channel.

The HE-SIG A field may include common control information, transmitted to STAs which receive a PPDU, in common. The HE-SIG A field may be transmitted in 1 to 3 OFDM symbols. The HE-SIG A field is duplicated in a 20 MHz unit and includes the same information. Furthermore, the HE-SIG A field provides notification of information about the entire bandwidth of a system.

Table 12 illustrates information included in the HE-SIG A field.

TABLE 12

| field | bit | description |
|---|---|---|
| Bandwidth | 2 | Indicate a bandwidth in which a PPDU is transmitted. For example, 20 MHz, 40 MHz, 80 MHz or 160 MHz |
| Group_ID | 6 | Indicate an STA or a group of STAs which will receive a PPDU |
| Stream information | 12 | Indicate the location or number of a spatial stream for each STA or indicate the location or number of a spatial stream for a group of STAs |
| UL indication | 1 | Indicate whether a PPDU is directed toward an AP (uplink) or is directed toward an STA (downlink) |
| MU indication | 1 | Indicate whether a PPDU is an SU-MIMO PPDU or an MU-MIMO PPDU |
| GI indication | 1 | Indicate whether a short GI is used or a long GI is used |

TABLE 12-continued

| field | bit | description |
|---|---|---|
| Allocation information | 12 | Indicate a band or channel (a subchannel index or a subband index) allocated to each STA in a band in which a PPDU is transmitted |
| Transmission power | 12 | Indicate transmission power for each channel or each STA |

The information included in each of the fields illustrated in Table 12 may comply with the definition of an IEEE 802.11 system. Furthermore, the above-described fields correspond to an example of fields which may be included in a PPDU, but are not limited thereto. That is, the fields may be replaced with other fields and may further include an additional field. All of the fields may not be essentially included. Another embodiment of information included in the HE-SIG A field is described later with reference to FIG. 23.

The HE-STF is used to improve performance of AGC estimation in MIMO transmission.

The HE-SIG B field may include user-specific information that is necessary for each STA to its own data (e.g., a PSDU). The HE-SIG B field may be transmitted in one or two OFDM symbols. For example, the HE-SIG B field may include information about the modulation and coding scheme (MCS) of a corresponding PSDU and the length of the corresponding PSDU.

The L-STF, the L-LTF, the L-SIG field, and the HE-SIG A field may be repeated and transmitted in a 20 MHz channel. For example, when a PPDU is transmitted through four 20 MHz channels (i.e., an 80 MHz band), the L-STF, the L-LTF, the L-SIG field, and the HE-SIG A field may be repeated and transmitted every 20 MHz channel.

If an FFT size increases, a legacy STA supporting the existing IEEE 802.11a/g/n/ac may not decode a corresponding HE PPDU. For the coexistence of a legacy STA and an HE STA, the L-STF, the L-LTF, and the L-SIG field are transmitted through a 64 FFT in a 20 MHz channel so that the legacy STA can receive them. For example, the L-SIG field may occupy a single OFDM symbol, a single OFDM symbol time may be 4 µs, and a GI may be 0.8 µs.

An FFT size for each frequency unit may be further increased from the HE-STF (or the HE-SIG A field). For example, 256 FFT may be used in a 20 MHz channel, 512 FFT may be used in a 40 MHz channel, and 1024 FFT may be used in a 80 MHz channel. If an FFT size increases, the number of OFDM subcarriers per a unit frequency is increased because an interval between the OFDM subcarriers is reduced, but the OFDM symbol time is increased. In order to improve efficiency of a system, the length of a GI after the HE-STF may be set to be the same as that of the GI of the HE-SIG A field.

The HE-SIG A field may include information that is necessary for an HE STA to decode an HE PPDU. However, the HE-SIG A field may be transmitted through 64 FFT in a 20 MHz channel so that both a legacy STA and an HE STA can receive the HE-SIG A field. The reason for this is that the HE STA can receive the existing HT/VHT format PPDU in addition to an HE format PPDU and the legacy STA and the HE STA have to distinguish the HT/VHT format PPDUs and the HE format PPDU from each other.

FIG. 23 is a diagram illustrating an HE format PPDU according to an embodiment of the present invention.

In FIG. 23, it is assumed that 20 MHz channels are respectively allocated to different STAs (e.g., an STA 1, an STA 2, an STA 3, and an STA 4).

Referring to FIG. 23, an FFT size per unit frequency may be further increased from an HE-STF (or an HE-SIG B field). For example, from the HE-STF (or the HE-SIG B field), 256 FFT may be used in a 20 MHz channel, 512 FFT may be used in a 40 MHz channel, and 1024 FFT may be used in a 80 MHz channel.

Information transmitted in each field included in a PPDU is the same as that of the example of FIG. 26, and thus a description thereof is omitted.

The HE-SIG B field may include information specific to each STA, but may be encoded in the full band (i.e., indicated in an HE-SIG A field). That is, the HE-SIG B field includes information about all of STAs, and all of the STAs receive the HE-SIG B field.

The HE-SIG B field may provide notification of information about a frequency bandwidth allocated to each STA and/or information about a stream in a corresponding frequency band. For example, in FIG. 27, in the HE-SIG B field, 20 MHz may be allocated to the STA 1, next 20 MHz may be allocated to the STA 2, next 20 MHz may be allocated to the STA 3, and next 20 MHz may be allocated to the STA 4. Furthermore, 40 MHz may be allocated to the STA 1 and the STA 2, and next 40 MHz may be allocated to the STA 3 and the STA 4. In this case, different streams may be allocated to the STA 1 and the STA 2, and different streams may be allocated to the STA 3 and the STA 4.

Furthermore, an HE-SIG-C field may be defined and added to the example of FIG. 27. In this case, in the HE-SIG B field, information about all of STAs may be transmitted over the full band, and control information specific to each STA may be transmitted through the HE-SIG-C field in a 20 MHz unit.

Furthermore, unlike in the examples of FIGS. 22 and 23, the HE-SIG B field is not transmitted over the full band, but may be transmitted in a 20 MHz unit like the HE-SIG A field. This is described with reference to FIG. 24.

FIG. 24 is a diagram illustrating an HE format PPDU according to an embodiment of the present invention.

In FIG. 24, it is assumed that 20 MHz channels are respectively allocated to different STAs (e.g., an STA 1, an STA 2, an STA 3, and an STA 4).

Referring to FIG. 24, an HE-SIG B field is not transmitted over a full band, but is transmitted in a 20 MHz unit like an HE-SIG A field. In this case, however, the HE-SIG B field is encoded and transmitted in a 20 MHz unit unlike in the HE-SIG A field, but may not be duplicated in a 20 MHz unit and transmitted.

In this case, an FFT size per unit frequency may be further increased from an HE-STF (or the HE-SIG B field). For example, from the HE-STF (or the HE-SIG B field), 256 FFT may be used in a 20 MHz channel, 512 FFT may be used in a 40 MHz channel, and 1024 FFT may be used in a 80 MHz channel.

Information transmitted in each field included in a PPDU is the same as that of the example of FIG. 26, and thus a description thereof is omitted.

The HE-SIG A field is duplicated in a 20 MHz unit and transmitted.

The HE-SIG B field may provide notification of information about a frequency bandwidth allocated to each STA and/or information about a stream in a corresponding frequency band. The HE-SIG B field may include information about each STA for each HE-SIG B field of a 20 MHz unit because it includes information about each STA. In this case, the example of FIG. 23 illustrates a case where 20 MHz is allocated to each STA. For example, if 40 MHz is allocated to an STA, the HE-SIG B field may be duplicated in a 20 MHz unit and transmitted.

In a situation in which a different bandwidth is supported for each BSS, if some bandwidths having a small interference level from a neighbor BSS is allocated to an STA, the HE-SIG B field may not be transmitted over a full band as described above.

For example, the HE format PPDU of FIG. 23 is described as a basis, for convenience of description.

In FIGS. 22 to 24, a data field is payload and may include a service field, a scrambled PSDU, tail bits, and padding bits.

An HE format PPDU, such as that of FIGS. 22 to 24, may be determined through a repeated L-SIG (RL-SIG) field, that is, the repeated symbol of an L-SIG field. The RL-SIG field is inserted in front of the HE SIG-A field, and each STA may determine the format of a received PPDU to be an HE format PPDU using the RL-SIG field.

A multi-user UL transmission method in a WLAN system is described below.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

FIG. 25 is a diagram illustrating an UL multi-user (UL MU) transmission procedure according to an embodiment of the present invention.

Referring to FIG. 25, an AP commands STAs participating in UL MU transmission to prepare UL MU transmission, receives UL MU data frames from the corresponding STAs, and transmits an ACK frame (or a block ACK (BA) frame) as a response to the UL MU data frames.

First, the AP instructs STAS which will send UL MU data to prepare UL MU transmission by sending an UL MU trigger frame 2510. In this case, the UL MU trigger frame may also be called an "UL MU scheduling frame."

In this case, the UL MU trigger frame 2510 may include information about an STA identifier (ID)/address, information about the allocation of resources to be used by each STA, and control information, such as duration information.

The STA ID/address information means information about an identifier or address for specifying each STA which transmits UL data.

The resource allocation information means information about UL transmission resource (e.g., information about a frequency/subcarrier allocated to each STA in the case of UL MU OFDMA transmission and the index of a stream allocated to each STA in the case of UL MU MIMO transmission) allocated to each STA.

The duration information means information for determining time resources for transmitting an UL data frame transmitted by each of a plurality of STAs.

For example, the duration information may include information about the interval of a transmit opportunity (TXOP) allocated for the UL transmission of each STA or information (e.g., a bit or symbol) about the length of an UL frame.

Furthermore, the UL MU trigger frame 2510 may further include control information, such as MCS information and coding information to be used when an UL MU data frame is transmitted to each STA.

Such control information may be transmitted in the HE-part (e.g., the HE-SIG A field or the HE-SIG B field) of a PPDU in which the UL MU trigger frame 2510 is transmitted or in the control field (e.g., the frame control field of an MAC frame) of the UL MU trigger frame 2510.

The UL MU trigger frame 2510 is delivered has a structure that starts from an L-part (e.g., an L-STF, an L-LTF, and an L-SIG field). Accordingly, legacy STAs may perform network allocation vector (NAV) setting through L-SIG protection from the L-SIG field. For example, the legacy STAs may calculate an interval for the NAV setting (hereinafter referred to as an "L-SIG guard interval") based on a data length and data rate information in the L-SIG field. Furthermore, the legacy STAs may determine that there is no data to be transmitted thereto during the calculated L-SIG guard interval.

For example, the L-SIG guard period may be determined to be the sum of the value of the MAC duration field of the UL MU trigger frame 2510 and the remaining interval after the L-SIG field of a PPDU in which the UL MU trigger frame 2510 is carried. Accordingly, the L-SIG guard period may be set as a value up to the interval in which an ACK frame 2530 (or an BA frame) transmitted to each STA is transmitted based on the value of MAC duration of the UL MU trigger frame 2510.

Hereinafter, a method for allocating resources for UL MU transmission to each STA is described in more detail. Fields including control information are divided and described, for convenience of description, but the present invention is not limited thereto.

A first field may divide transmission into UL MU OFDMA transmission and UL MU MIMO transmission and indicate them. For example, if the first field is "0", it may indicate UL MU OFDMA transmission. If the first field is "1", it may indicate UL MU MIMO transmission. The size of the first field may include 1 bit.

A second field (e.g., an STA ID/address field) provides notification of the IDs or addresses of STAs which will participate in UL MU transmission. The size of the second field may be composed of the number of bits for providing notification of the ID of an STA×the number of STAs which will participate in UL MU. For example, if the second field is composed of 12 bits, it may indicate the ID/address of each STA every4 bits.

A third field (e.g., a resource allocation field) indicates a resource region allocated to each STA for UL MU transmission. In this case, the resource regions allocated to respective STAs may be sequentially indicated in the sequence of the second field.

If the value of the first field is "0", it indicates frequency information (e.g., a frequency index and a subcarrier index) for UL MU transmission in the sequence of the IDs/addresses of STAs included in the second field. If the value of the first field is "1", it indicates MIMO information (e.g., a stream index, etc.) for UL MU transmission in the sequence of the IDs/addresses of STAs included in the second field.

In this case, since a single STA may be notified of several indices (i.e., a frequency/subcarrier index or stream index), the size of the third field may have a plurality of bits (or may have a bitmap format)×the number of STAs which will participate in UL MU transmission.

For example, it is assumed that the second field is configured in the sequence of an "STA 1" and an "STA 2" and the third field is configured in the sequence of "2" and "2."

In this case, if the first field is "0", frequency resources may be allocated to the STA 1 from a higher (or lower) frequency domain, and next frequency resources may be sequentially allocated to the STA 2. For example, if OFDMA of a 20 MHz unit is supported in an 80 MHz band, the STA 1 may use a higher (or lower) 40 MHz band, and the STA 2 may use a next 40 MHz band.

In contrast, if the first field is "1", a higher (or lower) stream may be allocated to the STA 1, and next streams may be sequentially allocated to the STA 2. In this case, a beamforming method according to each stream may have been previously designated, or the third field or the fourth field may include more detailed information about a beamforming method according to streams.

The STAs transmit respective UL MU data frames 2521, 2522, and 2523 to the AP based on the UL MU trigger frame 2510 transmitted by the AP. In this case, the STAs may receive the UL MU trigger frame 2510 from the AP and then transmit the UL MU data frames 2521, 2522, and 2523 to the AP after an SIFS.

Each of the STAs may determine a specific frequency resource for UL MU OFDMA transmission or a spatial stream for UL MU MIMO transmission based on the resource allocation information of the UL MU trigger frame 2510.

More specifically, in the case of UL MU OFDMA transmission, each STA may transmit the UL MU data frame on the same time resource through a different frequency resource.

In this case, different frequency resources for the UL data frame transmission may be allocated to the STA 1 to the STA 3 based on the STA ID/address information and resource allocation information included in the UL MU trigger frame 2510. For example, the STA ID/address information may sequentially indicate the STA 1 to the STA 3, and the resource allocation information may sequentially indicate a frequency resource 1, a frequency resource 2, and a frequency resource 3. In this case, the frequency resource 1, the frequency resource 2, and the frequency resource 3 sequentially indicated based on the resource allocation information may be allocated to the STA 1 to the STA 3 sequentially indicated based on the STA ID/address information. That is, the STA 1, the STA 2, and the STA 3 may transmit the respective UL data frames 2521, 2522, and 2523 to the AP through the frequency resource 1, the frequency resource 2, and the frequency resource 3, respectively.

Furthermore, in the case of UL MU MIMO transmission, each STA may transmit the UL data frame on the same time resource through at least one different of a plurality of spatial streams.

In this case, a spatial stream for the UL data frame transmission may be allocated to each of the STA 1 to the STA 3 based on the STA ID/address information and resource allocation information included in the UL MU trigger frame 2510. For example, the STA ID/address information may sequentially indicate the STA 1 to the STA 3, and the resource allocation information may sequentially indicate a spatial stream 1, a spatial stream 2, and a spatial stream 3. In this case, the spatial stream 1, the spatial stream 2, and the spatial stream 3 sequentially indicated based on the resource allocation information may be respectively allocated to the STA 1 to the STA 3 sequentially indicated based on the STA ID/address information. That is, the STA 1, the STA 2, and the STA 3 may transmit the respective UL data frames, 2521, 2522, and 2523 to the AP through the spatial stream 1, the spatial stream 2, and the spatial stream 3, respectively.

The PPDU in which the UL data frames 2521, 2522, and 2523 are delivered may be configured to have a new structure even without an L-part.

Furthermore, in the case of UL MU MIMO transmission or UL MU OFDMA transmission having a subband form of less than 20 MHz, the L-part of the PPDU in which the UL data frames 2521, 2522, and 2523 are delivered may be transmitted in an SFN form (i.e., all of STAs transmit the same L-part configuration and contents at the same time). In contrast, in the case of UL MU OFDMA transmission having a subband form of 20 MHz or more, the L-part of the PPDU in which the UL data frames 2521, 2522, and 2523 are delivered may be transmitted in a 20 MHz unit in a band allocated to each STA.

If the UL data frame can be sufficiently configured based on the information of the UL MU trigger frame 2510, there may be no need for an HE-SIG field (i.e., an area in which control information for a method for configuring a data frame is transmitted) within the PPDU in which the UL data frames 2521, 2522, and 2523 are delivered. For example, the HE-SIG-A field and/or the HE-SIG-B may not be transmitted. Furthermore, the HE-SIG-A field and the HE-SIG-C field may be transmitted, but the HE-SIG-B field may not be transmitted.

The AP may transmit the ACK frame 2530 (or the BA frame) as a response to the UL data frames 2521, 2522, and 2523 received from the respective STAs. In this case, the AP may receive the UL data frames 2521, 2522, and 2523 from the respective STAs and then transmit the ACK frame 2530 to each of the STAs after an SIFS.

If the structure of the existing ACK frame is identically used, the existing ACK frame may be configured to include the AIDs (or part AIDs) of STAs participating in UL MU transmission in an RA field having a size of 6 octets.

Alternatively, if an ACK frame of a new structure is configured, the ACK frame may be configured in a form for DL SU transmission or DL MU transmission.

The AP may transmit only the ACK frame 2530 for an UL MU data frame that has been successfully received to a corresponding STA. Furthermore, the AP may provide notification of whether an UL MU data frame has been successfully received through the ACK frame 2530 using ACK or NACK. If the ACK frame 2530 includes NACK information, the ACK frame may include a reason of NACK or information for a subsequent procedure (e.g., UL MU scheduling information).

Alternatively, the PPDU in which the ACK frame 2530 is delivered may be configured to have a new structure without the L-part.

The ACK frame 2530 may include STA ID or address information, but STA ID or address information may be omitted if the sequence of STAs indicated in the UL MU trigger frame 2510 is identically applied.

Furthermore, the TXOP (i.e., the L-SIG guard interval) of the ACK frame 2530 may be extended so that a frame for next UL MU scheduling or a control frame including adjustment information for next UL MU transmission can be included in the TXOP.

For the UL MU transmission, an adjustment process for synchronizing the STAs may be added.

FIGS. 26 to 28 are diagrams illustrating resource allocation units in an OFDMA multi-user transmission method according to an embodiment of the present invention.

When a DL/UL OFDMA transmission method is used, a plurality of resource units may be defined in an n-tone (or subfarrier) unit within a PPDU bandwidth.

The resource unit refers to the allocation unit of a frequency resource for DL/UL OFDMA transmission.

One or more resource units may be allocated to a single STA as DL/UL frequency resources, and different resource units may be allocated to a plurality of STA, respectively.

FIG. 26 illustrates a case where a PPDU bandwidth is 20 MHz.

7 DC tones may be located in the center frequency domain of the 20 MHz PPDU bandwidth. Furthermore, 6 left guard tones and 5 right guard tones may be located on both sides of the 20 MHz PPDU bandwidth, respectively.

In accordance with a resource unit configuration method, such as that of FIG. 26(*a*), a single resource unit may be composed of 26 tones.

Furthermore, in accordance with a resource unit configuration method, such as that of FIG. 26(*b*), a single resource unit may be composed of 52 tones or 26 tones. Furthermore, in accordance with a resource unit configuration method, such as that of FIG. 26(*c*), a single resource unit may be composed of 106 tones or 26 tones. Furthermore, in accordance with a resource unit configuration method, such as that of FIG. 26(*d*), a single resource unit may be composed of 242 tones.

The resource unit composed of 26 tones may include 2 pilot tones. The resource unit composed of 52 tones may include 4 pilot tones. The resource unit composed of 106 tones may include 4 pilot tones.

If a resource unit is composed as in FIG. 26(*a*), a 20 MH band may support a maximum of 9 STAs for DL/UL OFDMA transmission. Furthermore, if a resource unit is composed as in FIG. 26(*b*), a 20 MH band may support a maximum of 5 STAs for DL/UL OFDMA transmission. Furthermore, if a resource unit is composed as in FIG. 26(*c*), a 20 MH band may support a maximum of 3 STAs for DL/UL OFDMA transmission. Furthermore, if a resource unit is composed as in FIG. 26(*d*), a 20 MHz band may be allocated to a single STA.

Any one of the resource unit configuration methods of FIGS. 26(*a*) to 26(*d*) may be applied or a resource unit configuration method of a combination of FIGS. 26(*a*) to 26(*d*) may be alternatively applied based on the number of STAs participating in DL/UL OFDMA transmission and/or the amount of data transmitted or received by a corresponding STA.

FIG. 27 illustrates a case where a PPDU bandwidth is 40 MHz.

5 DC tones may be located in the center frequency domain of the 40 MHz PPDU bandwidth. Furthermore, 12 left guard tones and 11 right guard tones may be located on both sides of the 40 MHz PPDU bandwidth, respectively.

In accordance with a resource unit configuration method, such as that of FIG. 27(*a*), a single resource unit may be composed of 26 tones. Furthermore, in accordance with a resource unit configuration method, such as that of FIG. 27(*b*), a single resource unit may be composed of 52 tones or 26 tones. Furthermore, in accordance with a resource unit configuration method, such as that of FIG. 27(*c*), a single resource unit may be composed of 106 tones or 26 tones. Furthermore, in accordance with a resource unit configuration method, such as that of FIG. 27(*d*), a single resource unit may be composed of 242 tones. Furthermore, in accordance with a resource unit configuration method, such as that of FIG. 27(*e*), a single resource unit may be composed of 484 tones.

The resource unit composed of 26 tones may include 2 pilot tones. The resource unit composed of 52 tones may include 4 pilot tones. The resource unit composed of 106 tones may include 4 pilot tones. The resource unit composed of 242 tones may include 8 pilot tones. The resource unit composed of 484 tones may include 16 pilot tones.

If a resource unit is configured as in FIG. 27(*a*), a 40 MHz band may support a maximum of 18 STAs for DL/UL OFDMA transmission. Furthermore, if a resource unit is configured as in FIG. 27(*b*), a 40 MHz band may support a maximum of 10 STAs for DL/UL OFDMA transmission. Furthermore, if a resource unit is configured as in FIG. 27(*c*), a 40 MHz band may support a maximum of 6 STAs for DL/UL OFDMA transmission. Furthermore, if a resource unit is configured as in FIG. 27(*d*), a 40 MHz band may support a maximum of 2 STAs for DL/UL OFDMA transmission. Furthermore, if a resource unit is configured as in FIG. 27(*e*), a corresponding resource unit may be allocated to a single STA for SU DL/UL transmission in a 40 MHz band.

Any one of the resource unit configuration methods of FIGS. 27(*a*) to 27(*e*) may be applied or a resource unit configuration method of a combination of FIGS. 27(*a*) to 27(*e*) may be alternatively applied based on the number of STAs participating in DL/UL OFDMA transmission and/or the amount of data transmitted or received by a corresponding STA.

FIG. 28 illustrates a case where a PPDU bandwidth is 80 MHz. 7 DC tones may be located in the center frequency domain of the 80 MHz PPDU bandwidth. In this case, if the 80 MHz PPDU bandwidth is allocated to a single STA (i.e., if a resource unit composed of 996 tones is allocated to a single STA), 5 DC tones may be located in the center frequency domain. Furthermore, 12 left guard tones and 11 right guard tones may be located on both sides of the 80 MHz PPDU bandwidth, respectively.

In accordance with a resource unit configuration method, such as that of FIG. 28(a), a single resource unit may be composed of 26 tones. Furthermore, in accordance with a resource unit configuration method, such as that of FIG. 28(b), a single resource unit may be composed of 52 tones or 26 tones. Furthermore, in accordance with a resource unit configuration method, such as that of FIG. 28(c), a single resource unit may be composed of 106 tones or 26 tones. Furthermore, in accordance with a resource unit configuration method, such as that of FIG. 28(d), a single resource unit may be composed of 242 tones or 26 tones. In accordance with a resource unit configuration method, such as that of FIG. 28(e), a single resource unit may be composed of 484 tones or 26 tones. In accordance with a resource unit configuration method, such as that of FIG. 28(f), a single resource unit may be composed of 996 tones.

The resource unit composed of 26 tones may include 2 pilot tones. The resource unit composed of 52 tones may include 4 pilot tones. The resource unit composed of 106 tones may include 4 pilot tones. The resource unit composed of 242 tones may include 8 pilot tones. The resource unit composed of 484 tones may include 16 pilot tones. The resource unit composed of 996 tones may include 16 pilot tones.

If a resource unit is configured as in FIG. 28(a), an 80 MHz band may support a maximum of 37 STAs for DL/UL OFDMA transmission. Furthermore, if a resource unit is configured as in FIG. 28(b), an 80 MHz band may support a maximum of 21 STAs for DL/UL OFDMA transmission. Furthermore, if a resource unit is configured as in FIG. 28(c), an 80 MHz band may support a maximum of 13 STAs for DL/UL OFDMA transmission. Furthermore, if a resource unit is configured as in FIG. 28(d), an 80 MHz band may support a maximum of 5 STAs for DL/UL OFDMA transmission. Furthermore, if a resource unit is configured as in FIG. 28(e), an 80 MHz band may support a maximum of 3 STAs for DL/UL OFDMA transmission. Furthermore, if a resource unit is configured as in FIG. 28(f), a corresponding resource unit may be allocated to a single STA for SU DL/UL transmission in an 80 MHz band.

Any one of the resource unit configuration methods of FIGS. 28(a) to 28(f) may be applied or a resource unit configuration method of a combination of FIGS. 28(a) to 28(f) may be alternatively applied based on the number of STAs participating in DL/UL OFDMA transmission and/or the amount of data transmitted or received by a corresponding STA.

Although not shown, a method for configuring a resource unit if a PPDU bandwidth is 160 MHz may also be proposed. In this case, a 160 MHz PPDU bandwidth may have a structure in which the 80 MHz PPDU bandwidth described with reference to FIG. 32 has been repeated twice.

Only some resource units that belong to all of the resource units determined according to the above-described resource unit configuration methods and that are used for DL/UL OFDMA transmission may be used. For example, if a resource unit is configured as in FIG. 26(a) in 20 MHz, one resource unit may be allocated to each of less than 9 STAs, and the remaining resource units may not be allocated to any STA.

In the case of DL OFDMA transmission, the data field of a PPDU may be multiplexed and transmitted in a frequency domain in a unit of a resource unit allocated to each STA.

In contrast, in the case of UL OFDMA transmission, STAs may configure the respective data fields of PPDUs in a unit of a resource unit allocated thereto and may simultaneously the PPDUs to an AP. As described above, since STAs send PPDUs simultaneously, an AP, that is, a receiving stage, may recognize that the data fields of the PPDUs transmitted by the respective STAs are multiplexed and transmitted in a frequency domain.

Furthermore, if DL/UL OFDMA transmission and DL/UL MU-MIMO transmission are simultaneously supported, a single resource unit may be composed of a plurality of streams in a spatial domain. Furthermore, one or more streams may be allocated to a single STA as DL/UL spatial resource, and different streams may be allocated to a plurality of STAs.

For example, a resource unit composed of 106 tones in FIG. 25(c) may be composed of a plurality of streams in a spatial domain and can support DL/UL OFDMA and DL/UL MU-MIMO at the same time.

DL CSI Feedback Method of Next-Generation System

The UL OFMDA transmission of an STA has become possible in a next-generation WLAN system because the OFDMA technology has been introduced. As a result, even in a sounding protocol (or sequence) for reporting (or feeding back) channel state information (or feedback information) about a DL channel, a plurality of STAs has become able to send channel state information to an AP at the same time through UL OFDMA transmission. In this case, an UL MU transmission resource needs to be allocated to each STA in order to prevent a collision between the pieces of channel state information transmitted by the plurality of STAs. Accordingly, in a next-generation system, a new sounding protocol including a procedure for transmitting and receiving a trigger frame including information (or trigger information) about the allocation of UL MU transmission resources to each STA needs to be defined.

Furthermore, since UL OFMDA transmission is possible in a next-generation system, only the channel state of a resource unit allocated to each STA has only to be measured without a need to measure the channel state of all of transfer channels (i.e., all of transfer channels/full band of an UL/DL PPDU) as in a legacy system. Accordingly, in a next-generation system, a sounding protocol for measuring the channel state of only some transfer channels (in particular, channels corresponding to a resource unit to be allocated to an STA by an AP) not all of transfer channels needs to be newly defined.

A DL sounding procedure newly defined in this specification is defined based on the sounding procedure of an existing legacy system, and thus the sounding protocol in the existing system is first described in brief. A sounding protocol in 802.11ac is the same as that described above with reference to FIGS. 8 to 12.

Hereinafter, sounding information (or feedback information/channel state information (CSI)) may include an MCS level, the signal to noise ratio (SNR) of a predetermined feedback unit for a space stream and/or a beamforming feedback matrix (or a beamforming feedback vector). If a beamforming method is changed, the sounding information may include all of beamforming feedback values for the changed beamforming method.

* A sounding feedback method in an 802.11n system

In 802.11n, sounding information (or feedback information/CSI) may be transmitted through the following feedback frame in addition to a method for piggybacking the sounding information to an HT control field and transmitting it.

1. Include a channel state information (CSI) frame-MIMO control field and a CSI report field
2. Include a non-compressed/compressed beamforming frame-MIMO control field and non-compressed/compressed beamforming report field
3. Include antenna selection indices feedback frame-antenna selection index field Fields included in each of the frames are introduced below.

FIGS. 29(a) and 29(b) are diagrams illustrating an MIMO control field and an antenna selection index field, respectively, in an 802.11n system.

Referring to FIG. 29(a), the MIMO control field includes an Nc index subfield, an Nr index subfield, an MIMO control channel width subfield, a grouping (Ng) subfield, a codebook information subfield, a remaining matrix segment subfield, a reserved subfield, and a sounding timestamp subfield. A description of the subfields is given in Table 13 below.

TABLE 13

| Subfield | Description |
| --- | --- |
| Nc Index | Indicate a value obtained by subtracting 1 from the number Nc of columns of a matrix<br>"0" if Nc = 1<br>"1" if Nc = 2<br>"2" if Nc = 3<br>"3" if Nc = 4 |
| Nr Index | Indicate a value obtained by subtracting 1 from the number Nr of rows of a matrix<br>"0" if Nr = 1<br>"1" if Nr = 2<br>"2" if Nr = 3<br>"3" if Nr = 4 |
| MIMO control channel width | Indicate the bandwidth of a channel to be measured<br>"0" in the case of 20 MHz<br>"1" in the case of 40 MHz |
| Grouping (Ng) | Indicate the number Ng of carries grouped into one<br>"0" (No grouping) if Ng = 1<br>"1" if Ng = 2<br>"2" if Ng = 4<br>"3" is a reserved bit |
| Coefficient size | Indicate the number of representative bits of a real part and imaginary part of each element of a matrix<br>In the case of CSI feedback<br>"0" if Nb = 4<br>"1" if Nb = 5<br>"2" if Nb = 6<br>"3" if Nb = 8<br>In the case of non-compressed beamforming feedback<br>"0" if Nb = 4<br>"1" if Nb = 2<br>"2" if Nb = 6<br>"3" if Nb = 8 |
| Codebook information | Indicate the size of codebook entries<br>"0" if 1 bit is in Ψ, 3 bits in Φ<br>"1" if 2 bits is in Ψ, 4 bits in Φ<br>"2" if 3 bits is in Ψ, 5 bits in Φ<br>"3" if 4 bits is in Ψ, 6 bits in Φ |
| Remaining matrix segment | Include the remaining segment number for an associated measurement report.<br>A valid range: 0~7<br>"0" if only the last segment of a segmented report or a segment of an unsegmented report is indicated |
| Sounding timestamp | Include the lowest 4 octets of a TSF timer value sampled when MAC receives a PHY-CCA.indication (IDLE) primitive corresponding to the end of the |

TABLE 13-continued

| Subfield | Description |
| --- | --- |
| | reception of a sounding packet used to generate feedback information included in a frame. |

Furthermore, an example of a CSI report field (in the case of 20 MHz) is shown in Table 14.

TABLE 14

| Field | Size (bits) | Meaning |
| --- | --- | --- |
| SNR in receive chain 1 | 8 | An SNR in the first receive chain of an STA which sends a report |
| ... | | |
| SNR in receive chain Nr | 8 | An SNR in the Nr-th receive chain of an STA which sends a report |
| CSI Matrix for carrier-28 | 3 + 2☐Nb☐Nc☐Nr | CSI matrix (CSI matrix coding) |
| ... | | |
| CSI Matrix for carrier-1 | 3 + 2☐Nb☐Nc☐Nr | CSI matrix |
| CSI Matrix for carrier 1 | 3 + 2☐Nb☐Nc☐Nr | CSI matrix |
| ... | | |
| CSI Matrix for carrier 28 | 3 + 2☐Nb☐Nc☐Nr | CSI matrix |

Furthermore, an example of a non-compressed beamforming report field for a 20 MHz channel is shown in Table 15.

TABLE 15

| Field | Size (bits) | Meaning |
| --- | --- | --- |
| An SNR for a space-time stream 1 | 8 | An average SNR of an STA which sends a report on a first space-time stream |
| ... | | |
| An SNR for a space-time stream Nc | 8 | An average SNR of an STA which sends a report on an Nc space-time stream |
| A beamforming feedback matrix for a carrier-28 | 2☐Nb☐Nc☐Nr | A beamforming feedback matrix V (V matrix coding (non-compressed beamforming)) |
| ... | | |
| A beamforming feedback matrix for a carrier-1 | 2☐Nb☐Nc☐Nr | A beamforming feedback matrix V |
| A beamforming feedback matrix for a carrier 1 | 2☐Nb☐Nc☐Nr | A beamforming feedback matrix V |
| ... | | |
| A beamforming feedback matrix for a carrier 28 | 2☐Nb☐Nc☐Nr | A beamforming feedback matrix V |

Furthermore, an example of a compressed beamforming report field for a 20 MHz channel is shown in Table 16.

TABLE 16

| Field | Size (bits) | Meaning |
| --- | --- | --- |
| An SNR in a space-time stream 1 | 8 | An average SNR of an STA which sends a report on a first space-time stream |
| ... | | |
| An SNR in a space-time stream Nc | 8 | An average SNR of an STA which sends a report on an Nc space-time stream |

TABLE 16-continued

| Field | Size (bits) | Meaning |
| --- | --- | --- |
| A beamforming feedback matrix V for a carrier-28 | Na□ (b_Ψ + b_Φ)/2 | A beamforming feedback matrix V |
| ... | | |
| A beamforming feedback matrix V for a carrier-1 | Na□ (b_Ψ + b_Φ)/2 | A beamforming feedback matrix V |
| A beamforming feedback matrix V for a carrier 1 | Na□ (b_Ψ + b_Φ)/2 | A beamforming feedback matrix V |
| ... | | |
| A beamforming feedback matrix V for a carrier 28 | Na□ (b_Ψ + b_Φ)/2 | A beamforming feedback matrix V |

Referring to FIG. 29(b), the antenna selection index field includes information about the index of a selected antenna.

As described above, in the 802.11n system, a beamformer receives channel state information from a beamformee through various methods (or various frames). The feedback frame formats in the 802.11n system have been described in brief.

As described above with reference to FIGS. 8 to 12, two methods for a feedback procedure for obtaining channel information in the 802.11ac system may be basically supported. One method is a method using a control frame (i.e., a piggybacked unicast feedback method), and the other method is a method using a channel sounding procedure not including a data field (i.e., a stand-alone unicast/broadcast feedback method).

In a next-generation system, a DL sounding protocol (or sounding procedure/sequence) may be defined based on such a sounding protocol in the 802.11ac system.

In an embodiment, if a DL sounding protocol of a next-generation system is defined based on the stand-alone unicast feedback method, an AP may instruct each STA to measure a channel state and to feed back detailed information, such as the number of preferred (or recommended) streams as a result of the measurement, an MCS level, information about the SNR of a measured channel, and beamforming feedback (or a beamforming feedback vector/matrix). To this end, in the DL sounding protocol, as in the 802.11ac system, an NDPA frame, an NDP frame, and a feedback frame (or a compressed beamforming frame) may be used, which are described in detail below with reference to FIG. 30.

FIG. 30 is a diagram illustrating a stand-alone unicast feedback method (or a DL sounding protocol). The description of FIGS. 8 to 12 may be identically/similarly applied to FIG. 30, and differences between FIG. 30 and FIGS. 8 to 12 are chiefly described below.

Referring to FIG. 30, in order to obtain channel state information for a DL channel, an AP may send an (HE) NDPA frame (or NDPA function/information) 3010, providing notification of the transmission of an (HE) NDP frame 3020 (or initiating a sounding protocol) to STAs. Control information regarding the sounding protocol may have been included in the NDPA frame 3010. For example, feedback indication information (or sounding indication information) regarding that which STA will measure which DL channel using what method may have been included in the NDPA frame 3010.

Furthermore, the AP may send the NDP frame (or NDP function/information) 3020, indicating information about a target DL channel to be measured by the STAs, to the STAs. An HE-STF/LTF indicating information about a target DL channel to be measured (or an HE-STF/LTF for the sounding (or DL channel state information (CSI)) of a DL channel) may have been included in the NDP frame 3020. HE-LTFs having a number equal to or greater than the number of space streams through which an STA will report a channel state may have been included in the NDP frame 3020. A DL PPDU (or an HE NDP PPDU) carrying the NDP frame (or including the NDP frame) may have an SU PPDU format defined in an 802.11ax system.

Furthermore, the AP may send a trigger frame (or trigger function/information) 3030 that triggers UL MU transmission to the STAs. Resource allocation information regarding an UL MU resource (UL frequency/spatial resource) allocated to each STA for the UL MU transmission of channel state information about a DL channel may have been included in the trigger frame 3030. In this case, the transmitted trigger frame may be configured as in FIG. 41, which is described later with reference to FIG. 41. A description of a frequency resource allocation unit which may be allocated to each STA is the same as that described above with reference to FIGS. 25 to 27.

The STAs that have received the trigger frame 3030 may obtain channel state information by measuring target DL channels indicated in the NDPA frame 3010 and the trigger frame 3030. The STAs may generate feedback frames (or beamforming frame/beamforming feedback frames) 3040 including the obtained channel state information, and may perform UL MU transmission on the generated feedback frames 3040 using UL MU resources allocated to them.

Compared to the sounding protocol in the legacy system shown in FIG. 8, the present sounding protocol has an advantage in that overhead is small in terms of time because STAs simultaneously send feedback frames including channel state information through UL MU transmission.

In the sounding protocol of a next-generation system, the NDPA frame 3010, the NDP frame 3020 and/or the trigger frame 3030 may be transmitted through different DL PPDUs or may be transmitted through a single DL PPDU according to embodiments. In particular, the NDPA frame 3010 and the trigger frame 3030 may be combined and transmitted through a single DL PPDU. That is, NDPA information included in the NDAP frame and trigger information included in the trigger frame may be included in a single frame and transmitted. This is described in detail later with reference to FIG. 34.

Furthermore, in another embodiment, if a DL sounding protocol of a next-generation system is defined based on the piggybacked unicast feedback method, each STA may measure a channel state in response to a request from an AP or without a request, may include the number of preferred (or recommended) streams (Nsts) as a result of the measurement, an MCS level and/or information about the SNR of a measured channel in an HT control field, and may feed them back. In this case, the transmitted HT control field may reuse the HT control field of the legacy format or may be defined as a new format (i.e., an HE control field). Such a feedback method is described in more detail below with reference to related drawings.

In a procedure for feeding a channel state back, the HT control field (hereinafter referred to as an "HE control field") of an HE format (or HE variant) may be used. More specifically, an AP may instruct an STA to feed channel state information back thereto using the HE control field. The STA may feed measured channel state information back to the AP using the HE control field. The HE format of the HT control field may be indicated by a reserved bit (1 bit) of a VHT format HT control field (hereinafter referred to as a "VHT control field"). For example, if a reserved bit within a VHT control field is set to "1", it indicates that a corresponding HT control field has an HE format. If the reserved bit within a VHT control field is set to "0", it indicates that the corresponding HT control field has a VHT format. That is, if the first bit B0 of an HT control field is set to "1" indicating a VHT format and a second bit B1 located in a reserved bit of a VHT format HT control field is set to "1" indicating an HE format, the corresponding HT control field may indicate an HE control field.

(1) Option 1

In accordance with an embodiment of the present invention, an HE control field (in particular, an HE control middle field) used to request/indicate feedback may be configured by reusing at least some of fields forming a VHT control field.

FIG. 31 is a diagram illustrating an HE control field which is used in a feedback method according to a first embodiment of the present invention.

Referring to FIG. 31, the HE control field may be composed of a VHT field, an HT/VHT control middle field (hereinafter referred to as an "HE control middle field"), an AC constraint field, and a reverse direction grant (RDG)/more PPDU field. The HE control middle field may include an MRQ field, an MSI/STBC field, an MFB subfield, a coding type field, an FB tx type field, and an unsolicited MFB field like the VHT control field. A description of the fields is the same as that described above with reference to FIG. 7 and Table 4.

If a GID is not used in MU MIMO, a GID-related field in a VHT control field may be reconfigured using a field for indicating channel state feedback or feeding a channel state back (or for indicating a target frequency channel whose state will be measured). For example, the MFSI/GID-L field of a VHT control field may be replaced with the MFSI field of the HE control field (i.e., other than GID-L information). The GID-H field (3 bits) of the VHT control field may include an FB resource indication field (1 bit), a beamforming FB request field (1 bit), and a reserved bit (1 bit).

The FB resource indication field may indicate a frequency channel region to be measured by an STA (which will report a channel state or feed the channel state back). For example, if the FB resource indication field is set to "0", a corresponding field may indicate that all of transfer channels (a full bandwidth) of an UL/DL PPDU should be measured. Furthermore, if the FB resource indication field is set to "1", a corresponding field may indicate that some transfer channels (partial bandwidth) other than all of the transfer channels of an UL/DL PPDU should be measured. In this case, some transfer channels may be a DL resource unit (or a resource unit that belongs to a DL PPDU received by each STA and that is used to send a data field) allocated to each STA or may be a channel region indicated by a BW field within an MFB field.

The FB resource indication field may be composed of 1 bit as described above, but may include a bit size of a total of 2 bits including a reserved bit (1 bit). In this case, an indication option indicating that feedback has the same format as previous feedback may be added to the FB resource indication field.

The beamforming FB request field may indicate whether a beamformer has requested beamforming feedback or not. For example, if a beamformer instructs a beamformee to report a beamforming feedback matrix (or a beamforming vector/beamforming value), the value of the beamforming FB request field may be set to "1" (or "0"), and the beamforming FB request field may be transmitted. In this case, the beamformee may generate a beamforming feedback matrix based on the results of the measurement of the channel state of a DL PPDU including the beamforming FB request field, and may send (or feed back/report) a compressed beamforming frame, including the generated beamforming feedback matrix, to the beamformer.

(2) Option 2

In accordance with an embodiment of the present invention, an HE control field defined as a new protocol version (e.g., PV1) may be used as an HE control field (in particular, an HE control middle field) used to request/indicate feedback. That is, unlike in Option 1, an HE control field defined as a new format in a next-generation system may be used as an HE control field of Option 2. In this case, if a GID is not used, information (or content) included in the HE control field may be the same as/similar to that of Option 1.

Unlike in Option 1, however, the HE control field of Option 2 may include an MFB field having an extended bit size in order to indicate information (or a feedback value) about a beamforming feedback matrix (or vector) or may include an FB resource indication field extended to a size greater than 1 bit in order to indicate a more detailed measuring region.

In this case, the FB resource indication field may indicate all of the transfer channels (or a full BW) of a DL PPDU received by an STA or some transfer channels (or a partial BW) corresponding to a DL MU resource unit allocated to each STA in a feedback region or may indicate other region. For example, the FB resource indication field may indicate a measuring frequency resource (MFR) index to be described with reference to FIG. 33. In this case, an STA obtains feedback values, such as a single preferred (or recommended) SNR, MCS, and beamforming matrix for a frequency domain corresponding to the indicated MFR index, by measuring the feedback values, and sends them to an AP.

Furthermore, the STA may additionally send a beamforming feedback matrix through an HE control field (in particular, an MFB field having an extended size) (see FIG. 32(a)). In a compressed beamforming method or codebook method, a method for feeding a beamforming matrix back may be different. In this specification, a beamforming feedback matrix may be used to collectively refer to a beamforming feedback matrix fed back in such feedback methods.

To this end, an HE control field may further include a beamforming matrix report indication field (1 bit) indicating the report of a beamforming feedback matrix. If an AP instructs the transmission of a beamforming feedback matrix for a region whose feedback has been indicated, a corresponding field value may be set to "1" and subjected to DL transmission. In this case, as described above, an STA may send an HE control field, including the beamforming feedback matrix, in UL. Alternatively, the STA may configure a separate MDPU including the beamforming feedback matrix and send it through an SU stand-alone frame (as in a compressed BF report frame), or may include the beamforming feedback matrix in one MDPU of an A-MPDU included in an UL PPDU and send it using a piggyback method.

In this case, a feedback transmission unit in which each STA performs feedback (or measurement) may be determined in various sizes.

For example, if the FB resource indication field indicates a full BW, a feedback transmission unit may be determined to be a full BW or a resource unit. In this case, each STA may send a single feedback value for the full BW or may send a feedback value in a unit of a resource unit. In this case, the resource unit may indicate a 26-tone resource unit, that is, a resource unit of a minimum unit, or may indicate a resource unit forming the transfer channel of a DL PPDU according to a predetermined tone plan (see FIGS. 26 to 28). For example, if the FB resource indication field indicates a 20 MHz channel, that is, all of the transfer channels of a DL MU PPDU, each STA may send a single feedback value for the 20 MHz channel or may send a total of 3 feedback values for respective 106-tone/26-tone/106-tone resource units forming 20 MHz.

For another example, if the FB resource indication field indicates the frequency resource region of a DL MU PPDU allocated to each STA, each STA may send a single feedback value for a corresponding frequency domain. If such a value is included, however, the size of an HE control field including the feedback value may be determined variably.

The above-described feedback transmission unit is a concept which substantially corresponds to the Ng of an 802.11ac system. In this specification, the feedback transmission unit is called a frequency granularity (FG). The FG is described in detail later with reference to FIGS. 37 and 38.

If the method proposed by Option 2 is used, an HE control field may be configured by aggregating other control information with CSI feedback request/response information as in FIG. 32(a). In other words, the HE control field may include an "aggregated HE control subfield" in which an HE control subfield including CSI feedback request/response information and an HE control subfield including other control information are mutually combined (or aggregated).

FIG. 32 is a diagram illustrating an HE control field which is used in a feedback method according to a second embodiment of the present invention.

The above-described description may be identically applied to a description of each of fields shown in FIG. 32.

Referring to FIG. 32(a), the HE control field may include an aggregation of a plurality of HE control subfields having different pieces of control information (or different control types). In this case, the plurality of aggregated HE control subfields may include respective control type (or control ID) fields having different values depending on the respective pieces of control information. The HE control subfields may be distinguished from each other by the control type fields.

For example, it may be assumed that an HE control subfield including the above-described DL CSI feedback request/response information, an HE control subfield including buffer status request/response information, and an HE control subfield including idle channel request/response information have been aggregated. In this case, each of the aggregated HE control subfields may include a control type field having a different value depending on the type of information included therein (i.e., a control type) (e.g., DL CSI feedback request/response information, buffer status request/response information, or idle channel request/response information). The HE control subfields may be distinguished from each other by the values of the control type fields.

If the HE control subfields of different control types are aggregated as described above, it is necessary to notify an STA that which one of aggregated HE control subfields is the last. To this end, the following embodiments may be proposed.

In an embodiment, the last HE control subfield may be indicated in a bitmap format. To this end, the control types of aggregated HE control subfields may be indicated in a bitmap format. For example, as in the above-described example, if all of HE control subfields corresponding to six control types have been aggregated, the control types of aggregated HE control fields may be indicated in a bitmap format using a total of 6 bits, respectively. In this case, the corresponding 6 bits may sequentially correspond to a control type for a DL CSI feedback request, a control type for a DL CSI feedback response, a control type for a buffer status request (a request is necessary if data to be transmitted is present), a buffer status response type, a control type for an idle channel request (e.g., a report is necessary regarding that which 20 MHz subchannel state is idle in an 80 MHz channel), and a control type for an idle channel response. In this case, a bit set to "1" indicates that a control type corresponding to the bit is one of the aggregated HE control subfields. Accordingly, an STA may be aware of the control type and number of each of HE control subfields aggregated through bits set to "1."

In the present embodiment, unlike in the embodiment of FIG. 32(a), a single control type field having a bitmap format may be located ahead of an aggregated HE control subfield. If the length of an HE control subfield is changed every control type, it is not necessary to provide notification of such a length. Information about the length may also be included in the HE control subfield and transmitted.

In another embodiment, a 1-bit indicator may be included in each control type for each aggregated HE control subfield, and whether a corresponding HE control subfield is the last HE control subfield may be indicated through the indicator. For example, an indicator included in an HE control subfield may be set to "0x" if an HE control subfield of another control type follows the corresponding HE control subfield, and may be set to "0x" if an HE control subfield of another control type does not follow the corresponding HE control subfield (i.e., if the corresponding HE control subfield is the last HE control subfield).

In another embodiment, one (e.g. "0x1111" in the case of 4 bits) of control types may be designated (or defined) as the last HE control subfield. In this case, when an STA recognizes a corresponding control type, it may be aware that an HE control subfield following the corresponding control type is no longer present (or the STA may be aware that the HE control subfield of the corresponding control type is the last subfield and the HE control field has been terminated).

A feedback request and feedback response for the same information may be differently performed.

More specifically, a feedback request for specific information may be included in a single MPDU (e.g., a unicast trigger frame), but may be included in an HE control field because information (or content) included in the HE control field is simple (e.g., only a feedback request (or indication) bit may be included). For example, as shown in FIG. 32(b), a buffer status report request or an idle channel report request may be simply indicated by a control type for a corresponding request. That is, an STA simply receives a feedback request for specific information by reading a control type field corresponding to the feedback request of the specific information.

In this case, an HE control subfield indicating the feedback request may further include feedback index information similar to a sounding token. Such feedback index information may be used to specify (or indicate) that a feedback response transmitted by an STA is a response to "which feedback request." In other words, when an STA sends a feedback response for a specific feedback request, it may notify an AP whether it performs the feedback response to which feedback request by sending feedback index information, corresponding (or specifying) to the specific feedback request, along with the feedback response.

Furthermore, a feedback response to specific information may be included in a stand-alone SU frame, a single MDPU piggybacked to an SU/MU frame (A-MPDU) and/or an HE control field and transmitted. In this case, feedback response information (or content) transmitted as the feedback response may be as follows.

- In the case of a DL CSI feedback response (or report): the feedback response information (or content) may include information about whether a feedback request has been received (unsolicited or solicited), information (the above-described frame index information, sounding token, etc.) about a response to which feedback request if a feedback request has been received and/or the field/information described in connection with FIG. 32(a).
- In the case of a buffer status response (or report): the feedback response information (or content) may include information about whether a feedback request has been received (unsolicited or solicited), information (the above-described frame index information, sounding token, etc.) about a response to which feedback request if a feedback request has been received, a queue size, a traffic category (TC) and/or a traffic identifier (TID)
- In the case of an idle channel response (or report): the feedback response information (or content) may include information about whether a feedback request has been received (unsolicited or solicited), information (the above-described frame index information, sounding token, etc.) about a response to which feedback request if a feedback request has been received, and idle channel information (e.g., which 20 MHz/40 MHz subchannels of all of transfer channels of 80 MHz are idle or which resource unit (e.g., 26/52/106/242/448/996-tone resource unit) is idle)

As described above, an HE control field for DL CSI feedback may include an FB resource indication field indicating a feedback region, and a corresponding field may be configured to include a bit size of 1 bit or more. In the case of Option 1, an FB resource indication field may have a 2-bit size and may indicate the measurement of the same frequency domain as that in previous feedback. Alternatively, in Option 1, the FB resource indication field may have a total of 3 bits using up to the beamforming FB request field (1 bit). Even in the case of Option 2, the FB resource indication field may have a size of 3 bits or more. If the FB resource indication field has a size of 3 bits or more as described above, it may include MFR index information to be described later, and may further include up to FG information. In this case, the MFR is an abbreviation of a measuring frequency resource, and indicates a specific frequency domain in which an AP instructs an STA to perform measurement/feedback. The frequency granularity (FG) indicates a feedback transmission unit. Accordingly, an STA feeds an MFR, instructed by an AP, back in an FG unit.

FIG. 33 is a diagram illustrating a measuring frequency resource (MFR) according to a first embodiment of the present invention.

Referring to FIG. 33, the MFR may include at least one resource unit. In this case, a different index may be allocated to each MFR including at least one resource unit. An AP may indicate a frequency domain to be measured (or to be fed back/reported) by an STA by sending information about an index allocated to each MFR to the STA.

For example, the 996-tone resource unit of an 80 MHz channel may be defined as a single MFR. An index 0 may be allocated to the corresponding MFR. Furthermore, in the 80 MHz channel, an MFR may be defined in a unit of a 484-tone resource unit. An MFR index 1 may be allocated to the first 484-tone resource unit of the 80 MHz channel, and an MFR index 2 may be allocated to the second 484-tone resource unit thereof. Furthermore, in the 80 MHz channel, an MFR may be defined in a unit of a 242-tone resource unit. An MFR index 3 may be allocated to the first 242-tone resource unit of the 80 MHz channel, an MFR index 4 may be allocated to the second 242-tone resource unit thereof, an MFR index 5 may be allocated to the third 242-tone resource unit thereof, and an MFR index 6 may be allocated to the fourth 242-tone resource unit thereof. Likewise, an MFR may be determined (or defined) in a unit of a specific resource unit (also in a unit of a 106-tone or less resource unit), and an MFR index may be allocated to each MFR.

If an MFR index is configured as in FIG. 33, an FB resource indication field having a 3-bit size may be configured as in Table 17 below.

TABLE 17

| index | Description |
|---|---|
| 0 | Indicate a bandwidth indicated in an MFB field or a full BW of a DL PPDU |
| 1 | Indicate the bandwidth of its own DL MU PPDU transmitted or a bandwidth used in previous feedback |
| 2 | An MFR index 1 |
| 3 | An MFR index 2 |
| 4 | MFR index 3 |
| 5 | MFR index 4 |
| 6 | MFR index 5 |
| 7 | MFR index 6 |

The configuration of the FB resource indication field is not limited to Table 16. The number of indicated MFRs may be increased or decreased depending on a bit size, and included information may be newly added or some information may be deleted.

Alternatively, an MFR index may be set to "0" or "1." If an MFR index is fixed to "0" or "1", separate signaling for the MFR index is not necessary, but 1-bit signaling for indicating a selected MFR index is necessary if one of the two MFR indices is selected. In this case, an AP may additionally signal only an FG unit. In this case, the FG unit may be determined to be any one of 26/52/106/242/484/996-tone resource units. If an FG unit is fixed to a specific unit (e.g., a 26-tone resource unit), signaling for the specific unit may be unnecessary.

Accordingly, in the present embodiment, the amount of information fed back by an STA may be determined based on an FG size. That is, an STA may send a piece of feedback information (e.g., a single average SNR or an MCS level) about some (or all of) MFRs or may send a plurality of pieces of feedback information about some (or all of) MFRs depending on an FG size. For example, if an MFR is an 20 MHz channel and an FG is a 26-tone resource unit, an STA may send a total of 9 pieces of feedback information in UL. That is, the amount of feedback information may be determined to be "MFR/FG." Accordingly, in order to reduce such an amount of feedback information, the following methods may be taken into consideration.

1. Send feedback information including an average feedback value of all of MFRs and a feedback differential value included in an FG unit with respect to the average feedback value 2. Obtain a channel state in an FG unit, indicate the location of N (N=1 or more) FGs having the best channel state, and send feedback information about the corresponding N FGs In the present embodiment, MFR and/or FG indication information has been illustrated as being signaled in an HE control field, but the present invention is not limited thereto. The MFR and/or FG indication information may be signaled even in an NDPA frame (or NDPA trigger frame) which is transmitted and received in the DL sounding protocols of FIGS. 30 and 33. Furthermore, the above-described embodiments (in particular, the DL CSI feedback using an HE control field) may be identically/similarly applied to UL CSI feedback in addition to DL CSI feedback. For example, an STA may request/indicate (UL) CSI feedback for an AP using an HE control field. The AP also may report/respond (UL) CSI feedback for the STA using an HE control field. In this case, the format of the transmitted and received HE control field may comply with Option 1 and/or 2.

The configurations of a DL sounding protocol and an HE control field newly proposed in this specification in order to request/respond channel state information have been described in detail above. A modified example of the DL sounding protocol proposed with reference to FIG. 30 is described in detail below. In the modified example, an NDPA trigger frame is transmitted through DL broadcast in a form in which an NDPA frame and a trigger frame have been combined into a single frame (i.e., a single DL PPDU).

FIG. 34 is a diagram illustrating a stand-alone broadcast MU feedback method according to an embodiment of the present invention. FIG. 35 is a diagram illustrating an NDPA trigger frame format according to an embodiment of the present invention. The description given with reference to FIG. 30 may be identically/similarly applied to FIGS. 34 and 35, and differences between FIGS. 34 and 35 and FIG. 30 are chiefly described below.

Referring to FIG. 34, an AP may send an NDPA trigger frame having an NDPA frame and a trigger frame combined in DL using a broadcast method. In this case, the NDPA trigger frame may refer to a frame including both NDPA information (e.g., feedback request (or indication) information (or sounding indication information), etc. regarding that which STA may measure which DL channel using which method) included in the NDPA frame described with reference to FIG. 30 and trigger information (e.g., trigger information, etc. regarding that how STA may perform transmission using which UL MU frequency/spatial resource) included in the trigger frame.

The NDPA trigger frame may include resource allocation information (i.e., UL PPDU resource allocation information) and/or MCS information about an UL MU resource allocated to each STA in order to perform UL MU transmission on channel state information about an UL PPDU length and DL channel, that is, trigger information. Furthermore, the NDPA trigger frame may include sounding dialog token information, information about the AID of an STA, a feedback type and/or Nc index information, that is, NDPA information. The NDPA trigger frame may also include parameters, such as an Nr index and codebook information. In the legacy system (802.11ac), a beamformee has adopted a parameter. In a next-generation system (802.11ax), however, an AP may determine parameters in order to estimate the amount of feedback of MU STAs, and may set the length of an UL MU PPDU.

An embodiment in which an NDPA trigger frame is configured based on the structure of the trigger frame defined in the next-generation system is described below.

Referring to FIG. 35, the NDPA trigger frame may include a frame control field, a duration field, an RA field, a TA field, a common information (Info) field, a Per user Info N field (or a user-specific field, STA info 1~n), and an FCS.

The RA field indicates the address of a receiving STA that receives an NDPA trigger frame. The RA field may be included in or excluded from an NDPA trigger frame according to embodiments.

The TA field indicates the address of an STA that sends an NDPA trigger frame.

The common Info field indicates a field including information in common received by STAs that receives an NDPA trigger frame. The common Info field may include trigger type information, UL PPDU length information, BW information, GI information, LTF type information, LTF Num information and/or sounding dialog token information. In this case, the UL PPDU length information indicates an UL MU PPDU (maximum) length triggered by an NDPA trigger frame. The BW information indicates the transmission bandwidth of a corresponding UL MU PPDU. The GI information indicates a guard interval applied to a corresponding UL MU PPDU or indicates a guard interval which is used to generate a corresponding UL MU PPDU. The LTF type information indicates the LTF type of a corresponding UL MU PPDU. The LTF Num information indicates the number of HE-LTFs included in a corresponding UL MU PPDU. The sounding dialog token information indicates a sounding dialog token number. In this case, the GI information and the LTF type information may be indicated by a single field in an aggregated combination form. In addition to the listed fields, at least one field including pieces of information for receiving an UL MU PPDU may be additionally included in the common Info field and transmitted.

The Per user Info N field indicates a field including information that is individually received by each STA. Accordingly, the Per user Info N field may include an NDPA trigger frame corresponding to the number of STAs. The Per user Info N field may have included information about the AID of an STA that receives a corresponding field, information about an MCS which is used by an STA to generate/send an UL MU frame, coding information, feedback type information, Nc index information, Nr index information, codebook information, measuring frequency resource (MFR) information, and frequency granularity (FG) information. In this case, the MFR information indicates information about a frequency domain to be measured (to be fed back/reported) by an STA. The FG information indicates information about the frequency measurement (or feedback/report) unit of an STA as described above. In the legacy system, Nr index information, FG (i.e., Ng) information, codebook information and so on are generated, signaled, and transmitted in UL by an STA without a separate indication from an AP. In accordance with the present embodiment, however, there is an advantage in that an AP can directly indicate pieces of corresponding information for an STA by sending an NDPA trigger frame. The embodiment described with reference to FIG. 33 may be applied to a method for signaling such MFR information and FG information, but embodiments of FIGS. 36 to 38 may be applied to the method.

A stand-alone broadcast MU feedback method, that is, a modified example of the DL sounding protocol proposed with reference to FIG. 30, has been described above. As described above, the NDPA frame and the trigger frame may be transmitted at an interval of an SIFS through different PPDUs as in the embodiment of FIG. 30 or may be aggregated into one NDPA trigger frame and together transmitted through one PPDU. An example in which an NDPA frame and a trigger frame are transmitted is described based on the embodiment of FIG. 30 in which they are separately transmitted, for convenience of description, but the present invention is not limited thereto. The following description may be identically applied to the embodiment of FIG. 34 in which an NDPA trigger frame is transmitted.

FIG. 36 is a diagram illustrating an MFR according to a second embodiment of the present invention. The description given in connection with FIG. 33 may be identically applied to the present embodiment, and differences between the embodiment of FIG. 36 and the first embodiment of FIG. 33 are chiefly described below.

Referring to FIG. 36, as described above with reference to FIG. 33, the MFR may be composed of at least one resource unit. A different index may be allocated to each MFR. In this case, different MFR indices may be allocated to all of resource units which are present in an 80 MHz channel, respectively. Accordingly, a total of 65 MFR indices allocated to respective MFRs may be present (65=9*4+4*4+2*4+1*4+1). If MFR information included in an NDPA frame (or an NDPA trigger frame or an HE control field) indicates such MFR indices, it may have a size of a total of 6 bits. If a minimum unit of an MFR is limited to a 52-tone resource unit, MFR information may have a total of 5 bits. If a minimum unit of an MFR is limited to a 106-tone resource unit, MFR information may have a total of 4 bits.

As described above, MFR information (or field) may indicate one MFR using an MFR index, but may indicate a combination of a plurality of MFRs. The combined MFRs may be located in a frequency domain contiguously or discontiguously. A method for indicating a plurality of MFRs may include a method for indicating all the indices of a plurality of MFRs using MFR information and a method for indicating a corresponding MFR index using MFR information if a separate MFR index has been allocated to a combination of a plurality of MFRs. The following is an embodiment of the latter. In particular, if a minimum unit of an MFR is limited to a 106-tone resource unit, the embodiment illustrates MFR indices allocated to a combination of a plurality of MFRs discontiguously located in a frequency domain.

MFR indices 15~16: MFR indices 7&9&11&13/8&10&12&14
MFR indices 17~24: MFR indices 7&9/11&13/8&10/12&14/7&11/8&12/9&13/10&14
MFR indices 25~26: MFR indices 3&5/index 4&6

If MFR indices are only allocated to some or all of a combination of a plurality of MFRs, MFR information may be signaled using a size of about 4~5 bits.

Such MFR information may be included in an NDPA frame, an NDPA trigger frame and/or an HE control field and transmitted in DL according to embodiments.

In the 802.11ax system to which the OFDMA technology has been applied, DL CSI feedback may be performed to obtain a channel state in advance for the transmission of the data of an AP and also to obtain the channel state of each frequency resource unit in order for an AP to efficiently allocate (or schedule) frequency resource units to a plurality of STAs.

If DL CSI feedback is performed as a preliminary procedure for scheduling frequency/spatial resources, there is no problem although the DL CSI feedback is determined to be the same size (e.g., 26/52/106/242/448/996 tones) as a resource unit (i.e., a resource unit defined according to the tone plans defined in FIGS. 26 to 28). However, if DL CSI feedback is performed as a preliminary procedure for data transmission (in particular, if an STA feeds a DL beamforming feedback matrix/vector back), an FG may be determined not to be a too large size. Furthermore, if the same feedback (or measurement) unit (Ng=1, 2 or 4 tones) as that in the legacy system is used as the FG of a next-generation system having an FFT size increased to a maximum of 4 times compare to the legacy system, overhead may be excessively increased because the amount of feedback information is increased. Accordingly, an FG may be determined to be greater than Ng.

Accordingly, a proper size of an FG capable of satisfying all of the above-described conditions is proposed below. In this case, an FG may not be set to less than 26 tones because a minimum unit of a frequency allocated to each STA for UL OFDMA transmission is a 26-tone resource unit. Furthermore, an FG may be set in a size smaller than 20 MHz and is not set in a 1-tone size or less by taking into consideration feedback overhead.

FIG. 37 is a diagram illustrating embodiments of an FG. In the present embodiments, the size of an FG may be determined based on a resource unit (or the size of a resource unit) defined in a tone plan for each transfer channel of an MU PPDU.

(1) Option 1

FIG. 37(*a*) is a diagram illustrating an FR according to a first embodiment of the present invention.

Referring to FIG. 37(*a*), the FG may be composed of one minimum FG (MFG) (i.e., the FG may have the same size as the MFG) (FG=MFG). In this case, the MFG may be set in a 26-tone resource unit (FIG. 37(*a*)) in the case of feedback for OFDMA transmission and may be set (not shown) as a 106-tone resource unit in the case of feedback for MU-MIMO transmission. Accordingly, an AP does not need to separately signal information about an FG size to an STA upon a feedback request. Instead, in order to indirectly indicate the size of an MFG, the AP may notify the STA of the signal information about the FG size by signaling whether the feedback request is a feedback request for OFDMA transmission or a feedback request for MU-MIMO transmission.

For example, an AP may send an NDPA frame (or an NDPA trigger frame), including feedback type information (1 bit) indicating whether a feedback request is a feedback request for MU-MIMO transmission, to an STA in DL. If received feedback type information indicates a feedback type for MU-MIMO transmission, the STA may determine an MFG to be a 106-tone resource unit. If the feedback type information does not indicate a feedback type for MU-MIMO transmission, the STA may determine the MFG to be a 26-tone resource unit. In the present embodiment, since an FG is composed of one MFG, an STA may generate feedback information (e.g., an average SNR, an MCS and/or beamforming feedback) in a determined MFG unit and send it in UL (or feed it back).

In the present embodiment, more accurate feedback information can be obtained because the size of an FG is set to be smaller than that in the second and the third embodiments. Accordingly, there is an advantage in that feedback performance is excellent. In particular, feedback performance and feedback results may be excellent in the transmission of a DL MU PPDU based on the allocation of a 26-tone resource unit. However, there is a disadvantage in that feedback overhead is greater than that in the second and the third embodiments because the FG size is small. In order to reduce such overhead, feedback information may be transmitted as a differential value for an average feedback value.

For example, if an MFR is 20 MHz and an FG is set in a 26-tone resource unit, an STA may obtain an average feedback value of nine 26-tone resource units, and may signal a differential value between the average feedback value and the feedback value of each of the nine 26-tone resource units as feedback information (e.g., an average SNR and an 9*differential SNR is signaled as feedback information) without generating and sending the 9 feedback values in a unit of a 26-tone resource unit. In this case, there is an advantage in that overhead can be reduced compared to a case where all of 9 feedback values are signaled.

(2) Option 2

FIG. 37(b) is a diagram illustrating an FR according to a second embodiment of the present invention.

Referring to FIG. 37(b), the FG may be composed of at least one MFG (the FG=N*MFG, wherein N is a natural number). Accordingly, in the case of the present embodiment, FG indication information for indicating the number of MFGs forming the FG may be separately signaled. For example, if FG indication information is signaled with a size of 3 bits, the FG indication information may indicate 1, 2, 3, 4, 9 or 18 in the number (N) of MFGs forming an FG (or included in the FG). Alternatively, if a plurality of MFGs forming an FG is continuously located in a frequency band, FG indication information may indicate the MFGs forming the FG by indicating the start (or located at the start point) MFG information (e.g., MFG index information) and the last (or located at the end point) MFG information (e.g., MFG index information) of the plurality of MFGs forming the FG. Such FG indication information may be signaled in an NDPA frame, an NDPA trigger frame and/or an HE control field according to embodiments.

In accordance with the present embodiment, however, the size of an FG indicated by FG indication information may not be suitable for a predetermined tone plan (or may not be matched with the predetermined tone plan). For example, if MFR=20 MHz, MFG=26-tone resource unit, and FG=4*MFG, an MFG corresponding a single 26-tone resource unit may not be indicated by an FG. In this case, an STA may not separately feed the not-indicated MFG back (i.e., the STA performs transmission other than a feedback value for the not-indicated MFG) or may measure the remaining MFGs although they are not indicated and feed them back (i.e., may send a feedback value for the remaining MFGs) upon a feedback response.

As in the first embodiment, the size of an MFG may be set in a 26-tone resource unit (FIG. 37(b)) in feedback for OFDMA transmission and may be set (not shown) as 106-tone resource unit in feedback for MU-MIMO transmission. As in the first embodiment, such a size of an MFG may be indirectly indicated to an STA through feedback type information indicating whether a feedback request is a feedback request for MU-MIMO transmission.

In the case of the present embodiment, there is an advantage in that feedback overhead is small because the FG size is greater than that in the first embodiment. In the case of the present embodiment, however, an FG indicated by FG indication information may not be matched with a predetermined tone plan.

FIGS. 37(a) and 37(b) show examples in which an MFG has been set in a 26-tone resource unit (i.e., feedback for OFDMA transmission). In the case of feedback for MU-MIMO transmission, however, an MFG may be set in a 106-tone resource unit as described above. If the sizes of the bits of FG indication information are different in the case of feedback for OFDMA transmission and feedback for MU-MIMO transmission, a content size may be variable. Accordingly, in both cases, the FG indication information may be configured to have the same bit size.

(3) Option 3

FIG. 37(c) is a diagram illustrating an FG according to a third embodiment of the present invention.

Referring to FIG. 37(c), an FG may be determined to be resource units of various sizes. Accordingly, in the case of the present embodiment, FG indication information for indicating a resource unit (i.e., the size of an FG, the location, etc.) forming an FG may be separately signaled. For example, if FG indication information is signaled in a size of 3 bits, it may indicate a 26-tone resource unit, a 52-tone resource unit, a 106-tone resource unit, a 242-tone resource unit, a 484-tone resource unit or a 996-tone resource unit as an FG. An STA that has received the FG indication information may generate feedback information based on the indicated FG size unit based on a predetermined tone plan, and may send it in UL. Such FG indication information may be signaled in an NDPA frame, an NDPA trigger frame and/or an HE control field according to embodiments.

Tone plans for respective channels may be configured in resource units having the same size (e.g., a 26-tone resource unit), but may be configured in resource units of different sizes (see FIGS. 26 to 28). Accordingly, if an FG is indicated in a resource unit of a size exceeding 26 tones, as in the second embodiment, there may be a 26-tone resource unit not indicated by an FG. For example, if an FG size is a 52 tone, a 26-tone resource unit located at the center of a 20 MHz channel may not be indicated by an FG. In this case, feedback information about the 26-tone resource unit not indicated by the FG may be separately fed back or may not be fed back by an STA according to an embodiment.

In the case of the present embodiment, there is an advantage in that feedback overhead is small because an FG size is greater than that in the first embodiment.

(4) Option 4

FIG. 38 is a diagram illustrating an FR according to a fourth embodiment of the present invention. The fourth embodiment is an embodiment extended from the third embodiment, and the description of the third embodiment may be identically/similarly applied to the fourth embodiment. Differences between the third embodiment and the fourth embodiment are chiefly described.

As in the third embodiment, an FG may be determined to be resource units of various sizes, and FG indication information for indicating the resource units may be separately signaled. In the present embodiment, however, unlike in the third embodiment, FG indication information may be signaled in a form indicating a combination (or tone plan) of a plurality of resource units. As described above, a tone plan for each channel may be composed of resource units having the same or different sizes. Accordingly, in order to determine an FG unit according to such a tone plan, an FG index may be allocated to each tone plan, and FG indication information may indicate an FG unit to be fed back by an STA, location, etc. by including such FG index information.

For example, referring to FIG. 38, on the basis of an 80 MHz channel, an FG index "0" may be allocated to a tone plan composed of a 26-tone resource unit, an FG index "1" may be allocated to a tone plan composed of a 26 tone/52-tone resource unit, an FG index "2" may be allocated to a tone plan composed of a 26 tones/106-tone resource unit, an FG index "3" may be allocated to a tone plan composed of a 242-tone resource unit, an FG index "4" may be allocated to a tone plan composed of a 448-tone resource unit, and an FG index "5" may be allocated to a tone plan composed of a 996-tone resource unit. FG indices allocated to respective tone places as described above may be indicated by an AP as FG indication information. In order to indicate FG indices 0~5, FG indication information may have a bit size of 3 bits.

In accordance with the above-described example, if an MFR is the first 40 MHz channel (or the first~second 20 MHz channels, the first 484-tone resource unit) of an 80 MHz channel (if an MFR index "1" is indicated according to the embodiment of FIG. 36) and FG indication information indicates an FG index "1", an STA may generate feedback information about each of 52/52/26/52/52/52/52/26/52/52-tone resource units and send it in UL.

The following method may be applied to all of the above-described first to fourth embodiments.

An STA may report all pieces of feedback information, generated in an FG unit, to an AP, but may notify the AP of an FG that belongs to several FGs and that has the best SNR performance (or has the best SNR) and report only a single piece of feedback information (or a feedback value) about the corresponding FG. On the contrary, the STA may notify the AP of an FG that belongs to several FGs and that has the worst SNR performance (or has the worst SNR) and report only a single piece of feedback information (or a feedback value) about the corresponding FG. Alternatively, the STA may report an M (=1 or more) FG having good SNR performance and feedback information (or a feedback value) about the corresponding FG. On the contrary, the STA may report an M (=1 or more) FG having poor SNR performance and feedback information (or a feedback value) about the corresponding FG.

An AP may send an indication bit for the feedback report (or response) method of an STA, such as that instructing the STA to report an M FG having the best SNR and/or an M FG having the worst SNR, to the STA by signaling the indication bit. In this case, the indication bit may be included in an NDPA frame (or an NDPA trigger frame) or an HE control field and transmitted to the STA.

As described above, in DL CSI feedback for obtaining information required to obtain frequency/spatial scheduling, an MFG may be composed of a 26-tone resource unit. However, DL CSI feedback for data transmission not for scheduling (e.g., DL CSI feedback for obtaining a beamforming feedback matrix/vector) may require feedback information of a smaller (or finer) unit. Accordingly, in DL CSI feedback for data transmission, the FGs proposed in the above-described embodiments may be applied without any change, but a newly configured FG may be applied.

For example, an FG may be determined to be 1, 2 or 4 tones as in the Ng of an existing legacy system or may be designated as 4, 8 or 16 tones, that is, four times the Ng because an FFT size has been increased four times in a next-generation system. Alternatively, in order for an FG to be matched with a 26 tone/52-tone resource unit, that is, a frequency resource allocation unit, the FG may be configured as 1, 2 or 13 tones, that is, a measure of 26 or 52.

As described above, a different FG may be applied depending on a purpose that DL CSI feedback is performed. An FG used in DL CSI feedback for obtaining information for frequency/spatial scheduling is hereinafter referred to as "FG_sch" and an FG used in DL CSI feedback for data transmission (e.g., DL CSI feedback for obtaining a beamforming feedback matrix/vector) is hereinafter referred to as "FG_dat", for convenience of description.

An AP may perform a feedback request for scheduling and a feedback request for data transmission using different methods. To this end, a feedback request field indicating a feedback request purpose may be added to an NDPA frame (or an NDPA trigger frame or an HE control field) as follows.

A case 1. If the feedback request field indicates a request for feedback information for scheduling (i.e., indicate FG=FG_sch (directly/indirectly))

the feedback request field is set "0" (or "1").

In this case, an MFR and FG may be determined by the above-proposed embodiments. Alternatively, the MFR may be fixed to the full bandwidth of a PPDU, and the FG may be determined to be a resource unit of 26 tones or more.

A case 2. If the feedback request field indicates a feedback information request for data transmission (i.e., indicate FG=FG_dat (directly/indirectly))

the feedback request field is set to "1" (or "0").

In this case, an MFR and FG may be determined by the above-proposed embodiments. Alternatively, an AP that has received feedback information for scheduling through the case 1 may have already determined a frequency/spatial resource to be allocated to an STA using the corresponding information. In this case, the MFR may be determined to be a frequency domain to be allocated to the STA by the AP, and the FG may be determined in a unit smaller than a 26-tone resource unit.

The cases 1 and 2 may be separately requested through separate frames or may be requested together (or simultaneously) through a single frame. A frame that requests feedback may be composed of a broadcast/unicast frame (including a unicast frame including an HE control field configured for a feedback request) including NDPA information (or feedback request information or feedback initiation information). That is, a frame that requests feedback may include an NDPA frame, an NDPA trigger frame or a unicast frame including an HE control field configured for a feedback request. Alternatively, a feedback frame transmitted as a response to a feedback request may be composed of a unicast frame (including a unicast frame including an HE control field configured for a feedback request).

If the cases 1 and 2 are requested simultaneously through a single frame, a feedback request field is not separately located, but a field indicating a feedback information request for scheduling and a field indicating a feedback information request for data transmission (or fields indicating FG_sch and FG_dat independently and respectively) may be independently defined within one frame. In this case, two types of feedback requests through one frame are made possible because they are respectively indicated through respective fields that have been independently defined. In this case, if one of the two fields is set as a specific value (e.g., "0"), the type of feedback request indicated by the corresponding field may be construed as having not been indicated. Accordingly, in this case, an AP may indicate only one type of feedback request through one frame.

Furthermore, feedback frames (or report frames) transmitted as responses to the two types of feedback requests may have different formats depending on the type of feedback request. For example, if the feedback frame format of the 802.11n system is applied, a feedback frame transmitted as a response for the case 1 may be transmitted in a CSI frame format, and a feedback frame format transmitted as a response for the case 2 may be transmitted in a compressed beamforming frame format. In this case, as in the above-described embodiments, information about an Ng size, a CB size, and a CSI/beamforming feedback method within each feedback frame may be different depending on the type of feedback request, a feedback method and so on. Furthermore, information about some or all of an MIMO control field included in a feedback frame may be indicated by an NDPA frame (or an NDPA trigger frame or an HE control field). Accordingly, a field including information that overlaps information indicated by the NDPA frame (or the NDPA trigger frame or the HE control field) may be excluded from each feedback frame.

If a feedback frame (or report frame) format (or type) is indicated in an NDPA frame, an STA may determine an FG (an existing Ng) based on the indicated feedback frame format. In the above-described example, if a CSI frame format is indicated as a feedback frame format, an STA may determine an FG to be FG_sch because the CSI frame format corresponds to the indication of a response request for the case 1. Furthermore, if a compressed beamforming frame format is indicated as a feedback frame format, an STA may determine an FG to be FG_dat because the compressed beamforming frame format corresponds to the indication of a response request for the case 2.

Examples of a DL CSI feedback procedure configured using such a method may be as follows.

1) An AP sends a frame including NDPA information (or feedback request information) in DL: the frame includes all of MFR information indicating the full band of a PPDU, FG_sch indication information (if FG_sch is fixed to a 26-tone resource unit, this information may be excluded), and FG_dat indication information.

2) The feedback of STAs: each STA sends (or reports) feedback information, such as an SNR and MCS generated/obtained in the FG_sch unit with respect to an indicated MFR (or sends (or reports) only feedback information about N FG_sch having a good channel state as in the above-described embodiment) and sends (or reports) feedback information including a beamforming matrix generated in an FG_dat unit with respect to the indicated MFR (in this case, a differential value between an SNR generated in the FG_dat unit and the SNR of the FG_sch unit may be additionally transmitted).

3) The AP allocates frequency/spatial resources to each STA based on the feedback information received from the STAs. Furthermore, the AP fixes an MFR to a resource allocated to each STA, that is, FG_sch, so that it indicates the MFR (or set to a value "0" in order to indicate that this field is meaningless or not include this field in an HE control field) through an HE control field, sets FG_dat, and makes a feedback request from each STA.

4) Each STA may feed only one MPDU of the feedback frame or a beamforming matrix for a resource region allocated to the HE control field back. Alternatively, in addition, each STA may feed a differential SNR between an average SNR of all of allocated resource regions and/or an SNR generated in the FG_dat unit and an average SNR back.

In some embodiments, the following example is possible.

1) An STA sends feedback information (or a feedback value) about a full bandwidth through one MPDU of an UL frame or an HE control field at the request of an AP or autonomously. In this case, the STA sends feedback information of the FG_sch (if FG_sch is fixed to a 26-tone resource unit, FG_sch indication information may be excluded from the frame) with respect to an MFR configured in a full band.

2) The AP allocates frequency/spatial resources to each STA based on the feedback information received from the STA, indicates a resource region allocated to each STA through a broadcast frame including NDPA information, and requests feedback information measured in an FG unit with respect to the allocated resource region. That is, the corresponding broadcast frame may include all of MFR information indicating the resource region allocated to each STA, FG_sch indication information (if FG_sch is fixed to a 26-tone resource unit, the FG_sch indication information may be excluded from the frame), and FG_dat indication information.

3) Each STA sends (or reports) feedback information, such as an SNR and MCS generated/obtained in the FG_sch unit with respect to the indicated MFR (or sends (or reports) only feedback information about N FG_sch having a good channel state as in the above-described embodiment) and sends (or reports) feedback information including a beamforming matrix generated in the FG_dat unit with respect to the indicated MFR (in this case, a differential value between an SNR generated in the FG_dat unit and the SNR of the FG_sch unit may also be additionally transmitted).

Three Feedback Methods in Next-Generation System

In the 802.11ac legacy system to which the OFDM technology has been applied, feedback information is only generated with respect to all of the transfer channels of a PPDU (or a full bandwidth). However, in an 802.11ax next-generation system into which the OFDMA technology has been introduced, a frequency resource is allocated to an STA in a unit of a resource unit (i.e., some transfer channels of a PPDU may be allocated to each STA). Accordingly, for the purpose of efficient OFDMA resource scheduling of an AP and in order to prevent overhead attributable to the generation of unnecessary feedback information, feedback information may be generated with respect to some transfer channels of a PPDU (i.e., corresponding to at least one resource unit).

Furthermore, if a resource unit is allocated to each STA, an AP may take into consideration both SNR information about the resource unit and a beamforming value that is formed in the Ng (FG in the case of the next-generation system) unit. In this case, if NG is applied in the same size (Ng=1, 2 or 4 tones) in the 802.11ac legacy system, there is a problem in that feedback overhead is very great.

For example, in the 802.11ac system, parameters may be determined as follows in a feedback procedure for a 20 MHz channel.

Min: Ng=4 (Ns=16), Nc=1, Nr=2 (Na=2), Codebook information: $\psi(2)$ and $\Phi(4)$ in SU Max: Ng=1 (Ns=52), Nc=8, Nr=8 (Na=56), Codebook information: $\psi(7)$ and $\Phi(9)$ in MU MCS: QPSK, ½ coding rate In this case, if header+FCS=20 bytes in a VHT compressed BF frame and a VHT MIMO control field=3 bytes, the length of the VHT compressed BF Frame and MU exclusive BF report field may be determined as follows.

the VHT compressed BF Frame

Min: 8*1+2*3*16=104, Max: 8*8+56*9*52=26272 the MU exclusive BF report field

Min: 4*1*16=64, Max: 4*8*52=26272

Based on the calculation, a minimum bit size may be calculated as 352 bits, and a maximum bit size may be calculated as 28120 bits. If QPSK and a ½ coding rate are applied to the minimum bit size and the maximum bit size, a frame may have a length from a minimum of about 68 µs to a maximum of about 2.204 ms per STA. Accordingly, assuming that 4 STAs perform feedback, a feedback length is increased up to a maximum of 9 ms if a case where a beamforming report poll frame is transmitted is taken into consideration. Accordingly, it may be seen that feedback overhead is very great.

Furthermore, an AP that has completed OFDMA scheduling does not require a beamforming feedback value (or matrix) for a resource unit allocated to another STA other than a resource unit allocated to a specific STA. Accordingly, a procedure for requesting a beamforming feedback value for a resource unit allocated to each STA may be separately requested.

Accordingly, in order to solve the above-described problems, three efficient feedback methods which may be newly applied to a next-generation system are proposed as follows. The description of the embodiments described with reference to FIGS. 30 to 38 may be identically/similarly applied to the three efficient feedback methods.

1. An HE control feedback method—The feedback of an SNR for a full bandwidth (or wideband) or partial bandwidth (or RU-band) using an HE control field In accordance with an embodiment of the present invention, an STA may feed a single SNR for all of the transfer channels of a PPDU (or a full bandwidth or a wideband) or some transfer channels of a PPDU (or a resource unit/band or partial bandwidth allocated to each STA) back through an HE control field. In this case, CSI information (e.g., the SNR) may be included in the HE control field and transmitted using a piggyback method.

In this case, the HE control field that carries (or included in) feedback information may include the following content (or information/fields).

A band indication (1 bit): if it indicates whether a feedback (or measurement) region is a full bandwidth (if it indicates a full bandwidth, full bandwidth information includes a BW field) or a bandwidth allocated to an STA (if it indicates an allocated bandwidth, the allocated bandwidth corresponds to a resource unit of a measured frame)

MRQ (1 bit): indicates whether it is a feedback request or a feedback response

MFB (15 bits): indicates NUM_STS, MCS (4 bits), BW (2 bits), and an SNR feedback value Unsolicited MFB (requested MFB) (1 bit): indicates whether it is a response to MRQ or not Information about a measured DL frame (information about a measured DL frame): an MSI/MFSI or GID is used in the 802.11ac system. In the 802.11ax system, the same specific information as TXOP duration included in the HE-SIG A field may be used.

Alternatively, an STA may feed both the SNR of a full bandwidth and the SNR of a band (partial bandwidth) (i.e., a selected/allocated resource unit) allocated to (or selected by) the STA back. Accordingly, in this case, a band indication may be excluded from an HE control field. In this case, if the space required to signal (to feed back) the SNR is insufficient in the HE control field, an SNR (6 bits) (for a full/partial bandwidth) may be added instead of the BW (2 bits) and the MCS (4 bits) in the MFB (15 bits).

The above-described embodiment illustrates that the SNR is fed back as feedback information, but a beamforming matrix may be fed back as the feedback information. In this case, if the beamforming matrix is fed back in the Ng unit having the same size as that of the legacy system, overhead is very great. Accordingly, an STA may fed only a single beamforming matrix for a band (i.e., a selected/allocated resource unit) allocated (or selected) like the SNR back. In this case, if the space required to signal (to feed back) the SNR is insufficient in the HE control field, a beamforming matrix (6 bits) (for a partial bandwidth) may be added instead of the BW (2 bits) and the MCS (4 bits) in the MFB (15 bits).

In this case, the HE control field including the pieces of content may be configured as in FIG. 39.

FIG. 39 is a diagram illustrating the format of an HE control field according to an embodiment of the present invention.

Referring to FIG. 39, the HE control field (i.e., the HT control field of an HE format) includes an aggregated control field in which HE control subfields (HE control 1~N) including different pieces of control information, respectively, have been aggregated, as described above. Accordingly, each subfield may include a control ID (corresponding to the control type field of the above embodiment) in order to be distinguished from another subfield. Accordingly, a single HE control subfield may be used in the HE control field for a feedback request/response. This means that the space allocated to the HE control field for feedback has been further reduced compared to feedback using a VHT control field in the case of feedback using the HE control field. Accordingly, in order to efficiently use the space allocated for feedback in the HE control field, an embodiment of the present invention proposes that the HE control field is configured as follows.

Assuming that feedback information is only transmitted through the HE control field, a control ID field may have 6 bits, and a control information field for feedback (or a field including feedback request/response information) may have 3 octets (24 bits).

In this case, 17 bits of the control information field for feedback may include MRQ (1 bit), information about a measured DL frame (6 bits), unsolicited MFB (1 bit), Num_STS (3 bits), and an SNR (for a full or partial bandwidth) (7 bits). A description of the pieces of content is the same as that described above. The remaining 7 bits of the control information field for feedback may include different content according to embodiments.

In an embodiment, if an STA feeds both the SNR of a full bandwidth and the SNR of a band (a partial bandwidth) (i.e., a selected/allocated resource unit) allocated to (or selected by) the STA back, the remaining 7 bits may be used to indicate an SIR that is already included and the SNR of other bands. That is, in the control information field for feedback, 12 bits may be used to indicate the SNR (6 bits) of a full bandwidth and the SNR (6 bits) of a band (a partial bandwidth) (i.e., a selected/allocated resource unit) allocated to (or selected by) the STA.

In another embodiment, the remaining 7 bits may be used to indicate a band indication (1 bit), a BW (2 bits), and an MCS (4 bits) or may be used to indicate a band indication (1 bit) and a beamforming matrix (6 bits) if a single beamforming matrix for a full band or some bands is fed back. A description of the pieces of content is the same as that described above.

In addition, the present embodiment and the embodiment described above with reference to FIGS. 31 and 32 may be combined and used. For example, at least one of the pieces of above-described content may be additionally included prior to the HE control field illustrated in FIG. 32(a) or at least one of the pieces of information included in a corresponding HE control field may be replaced with at least one of the pieces of above-described content.

2. DL NDP sounding for resource unit scheduling—Feedback of an SNR per resource unit (or FG_sch or CSI_unit)

STAs may report (may feed back) an SNR value for a full band or some bands in a unit of CSI_unit for the OFMDA scheduling of an AP (or for allocation/scheduling of a resource unit). Feedback information (e.g., an SNR) fed back by an STA as described above may be used for an AP to schedule the size and location of a resource unit to be allocated to each STA in an OFDMA/MU-MIMO transmission situation.

In this case, CSI_unit refers to a feedback measurement (or resource) unit in which an SNR will be measured (or reported) for resource unit scheduling, and is a concept corresponding to the above-described FG_sch. For example, if CSI_unit is a 26-tone resource unit, the number of SNR values fed back with respect to each of 20/40/80 MHz channels may be each of 9/18/37. The size of CSI_unit (or the size of a resource unit fixed to CSI_unit) may be fixed or variable. In the latter case, the size of CSI_unit may be determined based on the size (or MFR) of a target channel to be fed back (or to be measured), and may be directly/indirectly indicated by an AP.

An STA may send an indicated measurement band (e.g., a transmission bandwidth having the same size as the transmission bandwidth of an NDP frame), that is, an SNR value measured in a unit of CSI_unit with respect to an MFR, through UL SU/MU transmission (through a feedback frame).

If a full bandwidth is indicated for an STA as an MFR, CSI_unit is a 26-tone resource unit, and 6 bits are used to signal a single SNR value, the bit size of feedback information transmitted by the STA may be 6*9/18/37=54/108/222 bits in respective 20/40/80 MHz channels.

Alternatively, an STA does not respond an SNR for all of indicated MFRs, but may send information about the best N SNR and a resource unit having the corresponding SNR as feedback information through UL SU/MU transmission. In this case, the value of the best B SNR and information about the location of a frequency domain having the corresponding SNR value may be included in the feedback information and transmitted in UL. For example, if 6 bits are used to signal an SNR value and N is 3 (i.e., if the values of the best three SNRs are reported), the bit size of feedback information transmitted by an STA may be 6*3 bits (the best three SNR values)+4/5/6 bits (information about the location of a frequency domain having the best SNR).

CSI_unit (or FG_sch) is recommended to be set as a 26-tone resource unit, that is, a unit of a minimum resource unit, but is not limited thereto and may be set in a smaller tone size unit (e.g., Ng or FG_dat). If CSI_unit is set as a size less than a unit of a minimum resource unit, feedback information may also include beamforming matrix information. That is, an SNR value and beamforming feedback matrix information may be transmitted in UL as feedback information in a CSI_unit unit set less than 26 tones.

3. The SNR and beamforming (feedback) matrix of a DL NDP sounding-Ng unit (or FG_dat) for beamforming feedback STAs may feed an SNR value and a beamforming matrix, measured with respect to a partial bandwidth (or a partial band/resource unit) for DL beamforming, back to an AP as an Ng unit. Feedback information fed back by the STAs may be usefully used for the AP (or may help the AP) to send DL beamforming through a specific partial bandwidth (or a partial band/resource unit).

If STAs always feed an SNR value and a beamforming matrix back in the Ng unit with respect to a full bandwidth (or the whole bandwidth or a full band), overhead in transmitting a feedback frame (in particular, an UL MU feedback frame) may be significantly increased as described above. Accordingly, an AP may select a partial bandwidth (e.g., a transmission bandwidth having a smaller size than the transmission bandwidth of an NDP frame) for allocating a resource unit using information already known to the AP (e.g., feedback information of a unit of a resource unit previously received from an STA), and may receive beamforming information (e.g., an beamforming feedback matrix and an SNR) about the selected partial bandwidth. In this case, a method for indicating a resource unit allocated to an STA or the above-described method for indicating an MFR index may be used as a method for indicating the selected partial bandwidth.

An Ng (or FG_dat) size may be signaled by an AP or may be selected by an STA. Alternatively, the Ng size may be recommended (or suggested) by an AP, and an STA may select at least one of Ng sizes recommended (or suggested) by the AP. In this case, a minimum size of Ng selected by an STA may be limited by an HE-LTF type. That is, if an HE-LTF is a 2×HE-LTF, a minimum size of Ng which may be selected by an STA may be limited to 2 tones. Alternatively, if an HE-LTF is a 4×HE-LTF, a minimum size of Ng which may be selected by an STA may be limited to 4 tones. In this case, FFT of a 1×, 2× or 4× size refers to a relative size for the legacy WLAN systems (e.g., iEEE 802.11a, 802.11n, and 802.11ac). For example, if FFT sizes used in the L-part are 64, 128, 256, and 512 in 20 MHz, 40 MHz, 80 MHz, and 160 MHz, respectively, FFT sizes used in the HE-part may be 256, 512, 1024, and 2048, respectively, in 20 MHz, 40 MHz, 80 MHz, and 160 MHz.

In accordance with the above-described contents, if feedback has been transmitted in an Ng (=1, 2, 4 tones) unit with respect to a full bandwidth in 802.11ac, that is, a legacy system, feedback for a partial bandwidth not a full band may be transmitted in 802.11ax, that is, a next-generation system. In this case, the size of Ng, that is, a feedback transmission unit, may be changed. Furthermore, the unit or location of Ng may be differently used (or set) for each partial bandwidth (or MFR) or for each STA.

As described above with reference to FIG. 30, in a DL NDP sounding procedure according to an embodiment of the present invention, an AP may send an (HE) NDPA frame, an (HE) NDP frame, or a trigger frame for initiating/indicating a sounding procedure in DL, and STAs may send feedback frames for feeding the results of sounding back through UL MU transmission.

The VHT frame of a legacy system has included a frame control field, a duration field, an RA field, a TA field, a sounding dialog token number field and/or an STA info field (including the AID, feedback type, and Nc index of an STA). An (HE) NDPA frame may be configured to be newly defined as the format of a protocol version (PV) 1 in a next-generation system and to be newly defined as the format of a protocol version (PV) 0 in the legacy system and to indicate the presence of a trigger frame. For example, the (HE) NDPA frame may additionally indicate the notification of the start of a DL sounding procedure and simultaneously indicate that a trigger frame will be subsequently transmitted in DL.

Furthermore, an (HE) NDPA frame may include various pieces of content newly added for a next-generation system. For example, an (HE) NDPA frame configured for resource unit allocation (or scheduling) may include information about a feedback unit (CSI_unit or FG_sch) for each STA. Alternatively, an (HE) NDPA frame configured for beamforming may include information about a partial bandwidth (or MFR) and Ng (or FG_dat) size to be measured for each STA. In this case, the Ng size may be selected by an AP or STA as described above, and pieces of information, such as a PPDU transmission bandwidth (BW) and a codebook size, may also be selected by an AP or STA.

An (HE) NDP frame (or an HE NDP PPDU) may be configured in an SU PPDU format of a new format (or using the format) defined in the next-generation system 802.11ax (but not including an HE-SIG B field). Furthermore, there are four types of HE-SIG A field formats (MU/SU/TRIG-based/Ext) so far. However, the four types of HE-SIG A field formats are not perfectly matched with the HE-SIG A field of an (HE) NDP frame. The reason for this is that format information, BSS color information, and bandwidth information, that is, basic information, may be included in the HE-SIG A field of the (HE) NDP frame (in this case, spatial reuse and/or TXOP may be additionally included). Furthermore, the reason for this is that information about the number of HE-LTF symbols and/or an LTF size may be included in the HE-SIG A field of the (HE) NDP frame (but is not limited thereto, and the corresponding information may be indicated by an NDPA frame). Furthermore, since the (HE) NDP frame does not include an HE-SIG B field and MAC payload, information about the HE-SIG B field and MAC payload does not need to be included in the HE-SIG A field. Accordingly, the format of the HE-SIG A field included in the (HE) NDP frame needs to be newly defined as a new format different from other formats of an HE-SIG A field.

An (HE) trigger frame may include (or indicate) various pieces of trigger information which are necessary for STAs to send feedback frames, such as resource allocation information about the UL MU transmission format and/or UL MU feedback frame of the STAs, through UL MU transmission.

FIG. 40 is a diagram showing the format of an (HE) trigger frame according to an embodiment of the present invention.

Referring to FIG. 40, the trigger frame may include a frame control field (2 bits), a duration field (2 bits), an (A1) field (or (RA) field), an A2 field (or a TA field) (6 bits), a common Info field (or a common information field), a Per user Info N field (or a user-specific (user-specific) field), and an FCS (4 bits).

The RA field indicates the address of a receiving STA. The RA field may be included in or excluded from the trigger frame according to an embodiment.

The TA field indicates the address of an STA that sends the trigger frame.

The common Info field indicates a field including trigger information in common received by STAs that receive the trigger frame. The common Info field may include a trigger type field, a trigger common info field, and a type-specific common info field.

The Per user Info N field indicates a field including trigger information individually received by each STA. Accordingly, the Per user Info N field may include trigger frames corresponding to the number of STAs. The Per user Info N field may include a trigger Per user Info N and a type-specific Per user Info N field.

If the (HE) trigger frame complies with the format of FIG. 40, an additional type-specific common info field and type-specific per user info field may not be required.

Some information included in the above-described (HE) NDPA frame may be included in such an (HE) trigger frame. For example, only basic information about all of STAs participating in a sounding protocol may be transmitted in the (HE) NDPA frame, and detailed information about STAs which will subsequently send a feedback frame as a response to a corresponding frame may be transmitted in a trigger frame or an HE beamforming report polling frame. In this case, the number of STAs indicated in the NDPA frame may be greater than the number of STAs indicated in the trigger frame. Accordingly, the STAs may be aware that they participate in the sounding protocol through the NDPA frame, and may be aware a detailed method for performing sounding (or a feedback method) through the trigger frame.

Content (or information) included in an UL MU feedback frame (or an UL MU beamforming frame) may be differently configured as follows depending on the purpose of DL sounding.

(1) An UL MU feedback frame in a DL sounding protocol for resource unit allocation (or scheduling)

An HE MIMO control field: similar to a VHT MIMO control field. In this case, some values related to beamforming may be excluded. For example, the HE MIMO control field may include Nc information, Nr information, bandwidth (BW) information, remaining matrix (or feedback) segments information, first feedback segment information and/or sounding dialog token number information.

An HE SNR report field: information about average SNR value per CSI_unit and/or information about CSI_unit (or FG_sch) in the case of MU-MIMO and information about an SNR differential value (delta SNR) (for an average SNR) per Nc (2) An UL MU feedback frame in a DL sounding protocol for beamforming An HE MIMO control field: similar to a VHT MIMO control field. For example, the HE MIMO control field may include Nc information, Nr information, BW information, Ng information, code block (CB) size information, feedback (FB) type information, remaining feedback segments information, first feedback segment information and/or sounding dialog token number information.

An HE BF (beamforming) report field: information about an SNR measured in an Ng unit with respect to a partial bandwidth (or MFR) and information about beamforming (feedback) matrix and/or information about an SNR differential value (delta SNR) (for an average SNR) per Ng (or FG_data) or Nc in the case of MU-MIMO The format of an HE beamforming report polling frame may have a format similar to the format of the above-described trigger frame. In this case, unlike in the trigger frame, in the HE beamforming report polling frame, a feedback segment retransmission bitmap field may be added to a type-specific per-user info field. Furthermore, some information included in an (HE) NDPA frame may be included in the type-specific per user info field of some HE beamforming report polling frame.

UL Sounding Protocol

Various feedback methods for measuring the state of a DL channel have been described above. The above-described embodiments are embodiments of a method for measuring, by an STA (or AP), the state of a channel transmitted by the AP (or STA) in response to a command from the AP (or STA) and reporting it through a feedback channel. That is, when an STA A requests an STA B to measure a DL channel state and to report the results of the measurement by sending an NDPA frame, an NDP frame and/or a trigger frame, the STA B has reported a feedback value obtained with respect to the instructed channel. In this case, the STAs A and B may correspond to an AP or an STA.

Alternatively, a method for reporting, by STAs, their own state through a sounding channel in response to a command from an AP is described below. That is, when an AP sends NDPA information and requests an STA to send an NDP, the STA sends the NDP in response to the request. In this case, unlike in the above-described embodiments, the STA does not calculate a feedback value separately and report the calculated feedback value, but sends an UL channel itself. Accordingly, an NDPA frame and an NDP frame described hereinafter are an NDPA frame (or an NDPA_UL frame) and an NDP frame (or an NDP_UL frame) used in an UL channel sounding protocol, and may have content (or information) different from that of the NDPA frame (or the NDPA_DL frame) and the NDP frame (or the NDP_DL frame) in the above-described embodiments or the subject that sends the NDPA frame and the NDP frame may be different from the subject that sends the NDPA frame (or the NDPA_DL frame) and the NDP frame (or the NDP_DL frame) in the above-described embodiments.

FIG. 41 is a diagram illustrating an UL sounding protocol according to an embodiment of the present invention.

Referring to FIG. 41, an AP may send NDPA information indicating the UL transmission of an NDP frame (or initiating an UL sounding protocol/procedure) in DL. In other words, the AP may send NDPA information for UL sounding in D.

Next, the AP may send trigger information for triggering (or indicating/signaling) a method for sending an UL NDP frame. Information about the resource allocation of each STA that indicates (or triggers) the UL transmission resource (e.g., UL frequency/spatial resource) of an NDP frame may have been included in the trigger information. Alternatively, information about an UL channel (an UL frequency/space channel) whose state is to be measured by an AP may have been included in the trigger information.

In this case, the NDPA information and the trigger information may be carried on (included in) separate frames or transmitted in DL or may be carried on (included in) a single frame and transmitted in DL according to embodiments. In a first embodiment, the NDPA information and the trigger information may be carried on an NDPA frame and a trigger frame, respectively, and transmitted. In a second embodiment, the NDPA information and the trigger information may be carried on a single NDPA frame and transmitted. In this case, the trigger frame is not separately transmitted in DL. In a third embodiment, the NDPA information and the trigger information may be carried on a single trigger frame and transmitted. In this case, the NDPA frame is not separately transmitted in DL. In each of the first to the third embodiments, a frame format on which the NDPA information and/or the trigger information is carried is described in detail later.

Next, each of the STA(s) may send an NDP frame, generated based on the received NDPA information and trigger information, UL. In this case, each STA may send the NDP frame in UL through an MU or SU method, which is described in detail later with reference to FIGS. 32 and 33.

Next, the AP may send a polling frame, including trigger information for triggering the transmission of UL NDP frames by other STA(s) other than the STA(s) that have transmitted the NDP frames in UL, in DL. Alternatively, the AP may send a polling frame, including retransmission indication information for triggering the retransmission of the NDP frames of the STA(s) that have transmitted the NDP frames in UL, in DL.

Next, each of the STA(s) that has received the polling frame may send an NDP frame, generated based on the previously received NDPA information and information included in the polling frame, in UL. In particular, each of STAs that have previously received the NDPA information, but have not received the trigger information (or have not previously transmitted NDP frames) may generate an NDP frame based on the trigger information included in the polling frame, and may send the NDP frame in UL. Furthermore, each of STA(s) that have previously received the NDPA information and the trigger information and transmitted NDP frames, but have received a request for the retransmission of NDP frames may generate an NDP frame based on the trigger information included in the polling frame, and may send the NDP frame in UL.

In the case of an embodiment in which NDPA information and trigger information are carried on a single (or the same) frame and transmitted in DL, the format of the corresponding frame may be newly defined in a next-generation system because it has not been defined in existing systems. Accordingly, the HE format of an NDPA frame or trigger frame including NDPA information and trigger information is newly proposed below.

1. The HE format of an NDPA frame

An embodiment proposes that an NDPA frame including NDPA information and trigger information is reused in the NDPA frame (see FIG. 8) defined in an existing system, an example of which is shown in Table 18. Contents redundant with the description of FIG. 8 are omitted with reference to Table 18, and differences between the NDPA frame and the VHT NDPA frame are chiefly described.

TABLE 18

| Frame control | 2 | | |
|---|---|---|---|
| Duration | 2 | In microseconds | |
| RA | 6 | A receiver address or a receiving station address If STA = 1, RA = STA info1, if not, RA = broadcast address | |
| TA | 6 | Transmitter address or transmitting station address | |
| Sounding Dialogue Token | 1 | Rsv(2) | 00: Existing VHT NDPA Frame 01: NDPA frame 10~11: Rsv |
| | | Sounding Dialogue Token Number (6) | Selected by the beamformer to identify the VHT NDPA |
| STA info 1~n | 2xn | AID (11) | In NDPA frame, 11 bits association identifier |
| | | Feedback type (1) | In NDPA frame, Send UL NDP in o for full band Send UL ND NDP only in frequency band of 1 for MFR |
| | | Nc index (2) | In NDPA frame, Nc index-0 |
| | | MFR (2) | In NDPA frame, When feedback type-0, rsv When feedback type-1, MFR index |
| FCS | 4 | | |

Referring to Table 18, 2 bits previously set as the reserved bit in the sounding dialog token field may be used as an indicator indicating that a corresponding NDPA frame is an NDPA frame for initiating an UL sounding protocol. For example, if the reserved bits within the sounding dialog token field are set to "00", a corresponding NDPA frame may indicate that it is the NDPA frame of an existing VHT format. If the reserved bits within the sounding dialog token field are set to "01", a corresponding NDPA frame may indicate that it is the NDPA frame (of an HE format) for initiating an UL sounding protocol. In this case, bit values indicating each piece of information are not limited thereto and may be set as different bit values. Alternatively, only one of the reserves bits of the sounding dialog token field may be used as an indicator for indicating that an NDPA frame is an NDPA frame for UL sounding and the remaining 1 bit may remain as a reserved bit.

Furthermore, in the NDPA frame, the bit size of an AID field is reduced from 12 bits to 11 bits (the NDPA frame is always transmitted by an AP and in 802.11ax, a 11-bit size is sufficient for a corresponding field), and an Nc index field is reduced from 3 bits to 2 bits (the subject that sends the NDP frame is an STA, and the STA is capable of sending a maximum of 4 space streams). Accordingly, marginal bits of 2 bits are generated, and the marginal 2 bits may be used for MFR indication (or a frequency information field).

Unlike in a related art, a feedback type field may be used to provide notification of whether an STA will send an NDP frame through a full band (or whether the NDP frame will be subjected to UL SU transmission) or a partial band (or whether the NDP frame will be subjected to UL MU transmission). For example, if the feedback type field is set "0", it indicates that an STA will send the NDP frame through a full band in UL. In contrast, if the feedback type field is set to "1", it indicates that an STA will send an NDP frame through UL MU transmission using an MFR.

If the feedback type field indicates NDP frame transmission using a partial band, each STA may need to be aware what an MFR allocated thereto is. Accordingly, an MFR allocated to each STA for NDP frame transmission may be indicated using 2 bits allocated for MFR indication. In this case, the MFR indication bits may indicate the index of an MFR which will be used to perform UL MU transmission on the NDP frame or may indicate subchannel information (e.g., an n-th 20 MHz subchannel of an 80 MHz channel).

Alternatively, unlike in the above description, the value of an Nc index may be always fixed to 4 and the 2 bits of the Nc index field may be added as bits for MFR indication. Alternatively, the value of the Nc index may be indicated using a reserved bit of a sounding dialogue token field, and the 2 bits of the Nc index field may be added as bits for MFR indication. Accordingly, in this case, the bits for MFR indication (or a frequency information field) may be composed of a total of 4 bits, and may indicate more diversified and detailed MFR information.

The MFR indication bits (or a frequency information field) may be used as reserved bits if a feedback type field indicates the UL SU transmission of an NDP frame (e.g., if the feedback type field is set to "0"), and may be used for MFR indication if the feedback type field indicates the UL MU transmission of an NDP frame (e.g., if the feedback type field is set to "1").

If the number of STAs to which the same frequency band has been allocated is plural, each STA may determine the index of Nc to be transmitted by itself (or the index of a space stream) (or the index of a space stream which will be used to send an NDP frame in UL) by taking into consideration the indices of space streams of other STAs. More specifically, each STA may obtain the index of a space stream by accumulating and calculating the index of a space stream of a previous STA. For example, if a full band has been allocated to each of STAs 1 and 2 and Nc indices are 2 and 2, respectively, the STA 1 sends an UL NDP frame using space stream indices 1 and 2 (or space streams corresponding to indices 1 and 2), and the STA 2 sends an UL NDP frame using space stream indices 3 and 4 (or space streams corresponding to indices 3 and 4), and the STA 2.

The NDPA frame may be configured by reusing the NDPA frame of an existing system as described above. In another embodiment, however, an NDPA frame of an HE format may be newly defined as in Table 19 below.

TABLE 19

| Frame control | 2 | HE NDPA frame for UL sounding |
|---|---|---|
| Duration | 2 | In microseconds |
| RA | 6 | A receiver address or a receiving station address If STA = 1, RA = STA info1, if not, RA = broadcast address |

TABLE 19-continued

| TA | 6 | Transmitter address or transmitting station address | |
|---|---|---|---|
| Sounding Dialogue Token | 1 | Rsv(2) | 00: NDPA frame 01~11: Rsv |
| | | Sounding Dialogue Token Number (6) | Selected by the beamformer to identify the VHT NDPA |
| STA info 1~n | 2xn | AID (11) | In NDPA frame, 11 bits association identifier |
| | | Feedback type (1) | In NDPA frame, Send UL NDP in o for full band Send UL ND NDP only in frequency band of 1 for MFR |
| | | Nc index (2) | In NDPA frame, Nc index-0 |
| | | MFR (2): Apply the above MFR description | In NDPA frame, When feedback type-0, rsv When feedback type-1, MFR index |
| FCS | 4 | | |

The description of Table 19 may be identically applied the description of Table 18, but there is a difference between them in that the number of bits for MFR indication can be configured without any limitations. There is an advantage in that a combination of various MFRs can be indicated in more detail because the number of bits for MFR indication is not limited as described above.

2. The HE format of a trigger frame

In an embodiment, a trigger frame including NDPA information and trigger information may be newly defined. This may also be represented, reading that an "NDPA frame may be newly defined as one type of a trigger frame." To this end, first, the HE format of a trigger frame determined so far is described.

FIG. 42 is a diagram illustrating the HE format of a trigger frame.

Referring to FIG. 42, the trigger frame may include a frame control field, a duration field, an (A1) field (or (RA) field), an A2 field (or a TA field), a common Info field (or a common information field), a Per user Info N field (or a user-specific field), and an FCS.

The RA field indicates the address of a receiving STA. The RA field may be included in or excluded from the trigger frame according to an embodiment.

The TA field indicates the address of an STA that sends the trigger frame.

The common Info field indicates a field including trigger information in common received by STAs that receive the trigger frame. The common Info field may include a trigger type field, a trigger common info field, and a type-specific common info field. Furthermore, the trigger common info field may include a Max. UL PPDU length field, a BW field, a GI field, an LTF type field, and an LTF Num field. The Max. UL PPDU length field indicates the length of an UL MU PPDU (maximum) triggered by the trigger frame. The BW field indicates the transmission bandwidth of a corresponding UL MU PPDU. The GI field indicates a guard interval applied to a corresponding UL MU PPDU (or indicates a guard interval used when a corresponding UL MU PPDU is generated). The LTF type field indicates the LTF type of a corresponding UL MU PPDU. The LTF Num field indicates the number of HE-LTFs included in a corresponding UL MU PPDU. In addition, information about the content of the HE-SIG A field of an NDP frame, information about the type of trigger frame and/or cyclic prefix (CP) information may have been included in the common Info field.

The Per user Info N field indicates a field including trigger information that is individually received by each STA. Accordingly, the Per user Info N field may include a trigger frame corresponding to the number of STAs. The Per user Info N field may include a trigger Per user Info N and a Type-specific Per user Info N field. Information about the AID of a specific STA that receives a corresponding field, information about an MCS that will be used for a corresponding STA to generate/send an UL MU frame, coding (type) information, information about the number of streams (Nsts), frequency/spatial resource allocation information, dual subcarrier modulation (DCM) information, Tx beamforming (TxBF) information, and space-time block coding (STBC) information may have been included in the trigger Per user Info N field. In this case, DCM is a method for redundantly carrying one piece of information on two tones discontiguously spaced apart from each other on a frequency without carrying the one piece of information on a single tone in order to obtain frequency diversity. DCM can lower an error rate, but may have a data rate reduced by half.

The above-described Trigger common info field and trigger STA info field include various pieces of information about the allocation region of an UL MU PPDU frame and an UL MU transmission method. The type-specific common info field and the type-specific Per user Info field are fields added if information that needs to be separately included depending on the type of trigger frame is present. The trigger frame of a type (or an NDPA frame type) newly defined in this specification may include NDPA information and/or trigger information about the fields for the UL transmission of an NDP frame. This is described in detail below with reference to FIG. 43.

FIG. 43 is a diagram illustrating the HE format of a trigger frame according to an embodiment of the present invention.

Referring to FIG. 43(*a*), the type-specific common info field of a trigger frame newly defined for an UL sounding protocol may be replaced with (or may include) the sounding dialog token field of an NDPA frame. Accordingly, a corresponding type-specific common info field (or a sounding dialog token field) includes sounding dialog token information selected to identify a trigger frame. Furthermore, a type-specific Per user Info field may be replaced with (or may include) a feedback type field (indicates the UL SU or MU transmission of an NDP frame), an Nc index field (indicate the Nc index of the NDP frame), and an MFR indication field (the MFR indication of the NDP frame).

In this case, the Nc index field and the MFR indication field may be replaced with a steam number (Nsts) field and a resource unit (RU) allocation field in the trigger STA Info N field. Although the RU allocation field has not been separately shown in FIG. 43, the corresponding field may be included in a trigger common information field or a trigger STA info N field according to a resource allocation method.

An UL MU PPDU triggered by this trigger frame (or transmitted using this trigger frame) may not require a field for providing notification of a data configuration method because it does not includes an UL NDP frame (i.e., it does not include a data field). That is, the Max. UL PPDU length field, GI field and/or the trigger STA info N field may not be necessary in the trigger common information field. Accordingly, the corresponding fields may remain as reserved bits or may be deleted for commonality with other types of a trigger frame.

In another method for configuring a trigger frame, referring to FIG. 36(*b*), the trigger frame of an NDPA frame format may be configured by adding only a sounding dialog token field to a common trigger frame. That is, the format of a basic trigger frame is used without any change, but only the sounding dialog token field may be added to the common info field.

In this case, the resource unit (RU) allocation field of the trigger STA Info N field plays the role of the MFR indication field, and thus the MFR indication field indicates MFR information. That is, the resource unit allocation field may indicate an MFR (e.g., an MFR index) for an NDP UL frame. An UL MU PPDU triggered by this trigger frame (or transmitted using this trigger frame) may not require a Max. UL PPDU length field, a GI field and/or coding type information, TxBF information, STBC information, etc. because it includes an UL NDP frame (i.e., because it does not include a data field). Accordingly, the corresponding field/information may remain as reserved bits or may be deleted.

The trigger STA Info N field (or the STA Info N field) may include a feedback type field (indicate the UL SU or MU transmission of an NDP frame), and contents (or a field) that follow the corresponding field may be determined depending on contents indicated by the feedback type field. For example, if the feedback type field indicates UL SU transmission, a field indicating the number of space streams (Nsts) used in NDP UL frame transmission, a Tx beamforming (TxBF) field, and a space-time block coding (STBC) field may follow (or may be included in) the corresponding field. Alternatively, if the feedback type field indicates UL MU transmission, the number of space streams (Nsts) used in NDP UL frame transmission and fields indicating respective indices may follow (or may be included in) the corresponding field.

In the present embodiment, the type of trigger frame may not be separately defined as an UL NDPA frame type or a trigger frame for UL sounding, but may be defined as one "trigger frame type for sounding, 응 " regardless of UL/DL. Instead, in order to determine whether a trigger frame is for a frame for an UL sounding protocol or a frame for a DL sounding protocol, reserved bits (2 bits) of a sounding dialog token field may be used. In the case of UL, a type-specific Per user Info field may not be present.

The HE format of each frame if the NDPA information and the trigger information are included in the NDPA frame or the trigger frame has been described above. It is to be noted that new fields may be added to the format of the frame introduced in the above-described embodiments or the fields may be jointed to form a field(s) or some of the fields may be excluded according to embodiment. Furthermore, in the above description, the "field" may be replaced with or represented as "information."

An UL sounding protocol in a second embodiment, that is, a case where NDPA information and trigger information are included in an NDPA frame and transmitted, is described in detail below.

FIG. 44 is a diagram illustrating an UL sounding protocol according to an embodiment of the present invention.

Referring to FIG. 44, an AP may perform DL MU transmission on an NDPA frame that initiates an UL sounding protocol. In this case, the NDPA frame may be configured as in the example of Table 17 or 18. Information about an MFR index and information about the index of a space stream may have been included in the NDPA frame as trigger information for the UL MU transmission of an NDP frame. In FIG. 44, the NDPA frame may be information for the UL OFDMA transmission of the NDP frame, and may indicate an MFR index 1, an MFR index 2, and an MFR index 0 with respect to an STA 1, an STA 2, and an STA 3, respectively. Furthermore, the NDPA frame may be information for the MU MIMO transmission of the NDP frame, and may indicate stream indices 1 and 2, the stream indices 1 and 2, and stream indices 3 and 4 with respect to the STA 1, the STA 2, and the STA 3, respectively.

Next, each STA may generate an NDP frame based on the NDPA frame and send the NDP frame through UL MU transmission. Accordingly, the STA 1 may send the NDP frame through UL MU transmission using a frequency resource corresponding to the MFR index 1 and a spatial resource corresponding to the stream indices 1 and 2. Furthermore, the STA 2 may send the NDP frame through UL MU transmission using a frequency resource corresponding to the MFR index 2 and a spatial resource corresponding to the stream indices 1 and 2. Furthermore, the STA 3 may send the NDP frame through UL MU transmission using a frequency resource corresponding to the MFR index 0 and a spatial resource corresponding to the stream indices 3 and 4.

The AP that has received a corresponding NDP frame may measure and obtain an UL channel state based on the training field (e.g., HE-LTF) of the received NDP frame. Accordingly, the AP may use the measured UL channel state to efficiently allocate UL MU frequency/spatial resources to each STA. UL MU resource allocation information about each STA may be subsequently carried on a trigger frame and transmitted to each STA.

Next, the AP indicates MFR indices 3 to 6 for STAs 4 to 7, respectively, and may send an NDPA frame (or a polling frame) indicating stream indices 1 to 4 to all of the STAs 4 to 7 through DL transmission. Each of the STAs 4 to 7 that have receive the corresponding NDPA frame may send an NDP frame through UL MU transmission using the indicated UL MU resource.

FIG. 45 is a flowchart illustrating the UL sounding supporting method of an STA device according to an embodiment of the present invention. The above-described embodiments may be identically applied in relation to the present flowchart. Accordingly, a redundant description hereinafter is omitted.

Referring to FIG. 45, first, an STA may receive an NDPA frame, providing notification of the transmission of an NDP frame, from an AP (S4510). In this case, various types of control information regarding a sounding protocol may have been included in the NDPA frame received by the STA. For example, feedback indication information (or sounding indication information) regarding that which STA will measure which DL channel using what method may have been included in the NDPA frame.

Next, the STA may receive an NDP frame from the AP (S4520). In this case, an HE-STF/LTF indicating information about a target DL channel to be measured by the STA or an HE-STF/LTF for the sounding of a DL channel (or for DL channel state information (CSI)) may have been included in the NDP frame received by the STA. Furthermore, an HE-LTF equal to or greater than the number of space streams whose channel state is to be reported by the STA may have been included in the NDP frame.

Next, the STA may receive a trigger frame from the AP (S4530). In this case, resource allocation information regarding UL MU resources allocated to each of STAs so that the STAs may send feedback information about a DL channel through UL MU transmission may have been included in the trigger frame received by the STA.

Next, the STA may generate feedback information based on a training field included in the NDP frame (S4540). More specifically, the STA may measure the state of a target DL channel to be measured based on an HE-LTF included in the NDP frame, and may generate the feedback information including the results of the measurement. In this case, if the AP has instructed the STA to feed only some frequency band back (through NDPA/trigger frame), the STA may generate only feedback information for the corresponding band.

More specifically, the feedback information generated in this step may be generated so that it includes the SNR value and/or beamforming feedback matrix of the target DL channel (e.g., a transmission bandwidth/channel having a size smaller than or equal to the transmission bandwidth of the NDP frame, that is, an MFR) indicated by the NDPA frame or the trigger frame. In this case, the feedback information may be generated in an FG unit, that is, a predetermined frequency size unit. In other words, the feedback information may be generated in an FG unit with respect to the target DL channel that has been indicated to be measured (or reported/fed back) by the AP.

In this case, an FG, that is, a unit in which the feedback information is generated, may be composed of at least one MFG (e.g., a 26-tone resource unit) or a 4-tone or 16-tone size. In particular, in a feedback procedure for obtaining feedback information (e.g., an SNR value) that will be used to schedule a frequency resource unit, an FG may be composed of at least one MFG. Alternatively, in a feedback procedure for obtaining feedback information (e.g., a beamforming feedback matrix) to be used for MU-MIMO transmission, an FG may be composed of a 4-tone or 16-tone size.

Next, the STA may send a feedback frame, including the generated feedback information, through UL MU transmission (S4550). In this case, the STA may send the feedback frame through UL MU transmission using the UL MU resource indicated by the trigger frame received at step S4530.

In the present flowchart, the NDPA frame, the NDP frame, and the trigger frame have been illustrated as being sequentially received by the STA at specific time intervals (e.g., an SIFS) (i.e., received by the STA through different DL PPDUs), but the present invention is not limited thereto. In order to reduce overhead, the NDPA frame, the NDP frame, and the trigger frame may be carried on a single DL PPDU and received by the STAs as described above. In this case, the AP may edit and send the NDPA frame, the NDP frame, and the trigger frame so that the same information present in the frames is not redundantly transmitted, as described above.

Furthermore, in this specification, channel state information and/or a beamforming feedback matrix may be collectively called feedback information.

FIG. 46 is a block diagram of each STA device according to an embodiment of the present invention.

In FIG. 46, the STA device 4610 may include memory 4612, a processor 4611, and an RF unit 4613. As described above, the STA device is an HE STA device, and may be an AP or a non-AP STA.

The RF unit 4613 is connected to the processor 4611, and may send/receive radio signals. The RF unit 4613 may up-convert data, received from the processor 4611, into transmission and reception bands, and may send a signal.

The processor 4611 is connected to the RF unit 4613, and may implement the physical layer and/or MAC layer according to the IEEE 802.11 system. The processor 4611 may be configured to perform the operations of various embodiments of the present invention according to the above-described drawings and descriptions. Furthermore, a module for implementing the operations of the STA 4610 according to the above-described various embodiments of the present invention may be stored in the memory 4612 and may be executed by the processor 4611.

The memory 4612 is connected to the processor 4611, and stores various pieces of information for driving the processor 4611. The memory 4612 may be included in the processor 4611 or installed outside the processor 4611 and may be connected to the processor 4611 by known means.

Furthermore, the STA device 4610 may include a single antenna or multiple antennas.

An overall configuration of the STA device 4610 of FIG. 46 may be implemented so that the contents described in the various embodiments of the present invention are independently applied or two or more of the embodiments are simultaneously applied to the overall configuration.

In the above-described embodiments, the elements and characteristics of the present invention have been combined in specific forms. Each of the elements or characteristics should be considered to be optional unless otherwise described explicitly. Each of the elements or characteristics may be implemented without being combined with other elements or characteristics. Furthermore, some of the elements and/or the characteristics may be combined to form an embodiment of the present invention. The sequence of the operations described in connection with the embodiments of the present invention may be changed. Some of elements or characteristics in an embodiment may be included in another embodiment or may be replaced with corresponding elements or characteristics in another embodiment. It is evident that in the claims, claims not having an explicit citation relation may be combined to form one or more embodiments or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the above-described functions or operations. Software code may be stored in memory and driven by a processor. The memory may be located inside or outside the processor, and may exchange data with the processor through a variety of known means.

In accordance with an embodiment of the present invention, there is proposed a sounding protocol which can be efficiently applied to a next-generation WLAN system to which the OFDMA technology has been applied.

Furthermore, in accordance with an embodiment of the present invention, each STA can send a feedback frame through UL MU transmission because an AP sends trigger information for the UL MU feedback frame transmission of STAs.

Furthermore, in accordance with an embodiment of the present invention, an AP can obtain channel state information about a DL channel more rapidly because STAs can send a feedback frame for the DL channel through UL MU transmission.

Furthermore, in accordance with an embodiment of the present invention, there is an advantage in that feedback overhead is reduced because STAs can feed some transmission bandwidth back not a full transmission bandwidth of a PPDU depending on a feedback type (or purpose).

Furthermore, in accordance with an embodiment of the present invention, there is an advantage in that feedback overhead is reduced because a feedback unit size is reduced compared to a legacy system.

In addition to the advantages, other advantages of the present invention have been additionally described in the above-described embodiments.

The frame transmission schemes in a wireless communication system according to an embodiment of the present invention have been described based on an example in which they are applied to an IEEE 802.11 system, but may be applied to various wireless communication systems in addition to the IEEE 802.11 system.

It is evident to those skilled in the art that the present invention may be materialized in other specific forms without departing from the spirit and essential characteristics of the present invention. Accordingly, the detailed description should not be construed as being limited from all aspects, but should be considered to be illustrative. The scope of the present invention should be determined by reasonable analysis of the attached claims, and all changes within the equivalent scope of the present invention are included in the scope of the present invention.

What is claimed is:

1. A sounding method of a station (STA) for reporting feedback information including a downlink (DL) channel state in a wireless LAN (WLAN) system, the method comprising:
   receiving a null data packet (NDP) announcement (NDPA) frame announcing transmission of an NDP frame;
   receiving the NDP frame;
   receiving a trigger frame comprising resource allocation information related to a resource unit allocated to the STA;
   generating feedback information including the downlink (DL) channel state by using the received NDP frame; and
   transmitting a feedback frame comprising the generated feedback information by uplink (UL) multi-user (MU) transmission via the allocated resource unit,
   wherein the feedback information is reported for each of a plurality of frequency granularities (FGs) with respect to a partial reception bandwidth of the received NDP frame,
   wherein the partial reception bandwidth is a report target bandwidth,
   wherein each of the plurality of FGs is a report unit, and
   wherein each of the plurality of FGs has a smaller size than the partial reception bandwidth.

2. The method of claim 1, wherein:
   each of the plurality of FGs comprises at least one minimum FG (MFG); and
   the at least one MFG is set as a 26-tone resource unit.

3. The method of claim 2, wherein the received NDPA frame or the received trigger frame comprises FG indication information related to the at least one MFG.

4. The method of claim 3, wherein the FG indication information comprises information related to an MFG located at a start point of a plurality of MFGs forming each of the plurality of FGs and an MFG located at an end point of the plurality of MFGs if the at least one MFG is continuously located in a frequency band.

5. The method of claim 3, wherein the FG indication information comprises information related to a number of the at least one MFG.

6. The method of claim 2, wherein the reported feedback information corresponds to an average of signal to noise ratio (SNR) values reported for each of the at least one MFG with respect to the partial reception bandwidth.

7. The method of claim 1, wherein each of the plurality of FGs is set as a 4-tone or 16-tone size.

8. The method of claim 7, wherein the reported feedback information corresponds to a beamforming feedback matrix reported for each of the plurality of FGs with respect to the partial reception bandwidth.

9. The method of claim 8, wherein the received NDPA frame includes size information of both the partial reception bandwidth and the plurality of FGs.

10. A station (STA) performing a sounding method in a wireless LAN (WLAN) system, the STA comprising:
a radio frequency (RF) unit configured to transmit and receive a radio signal; and
a processor configured to:
control the RF unit to receive a null data packet (NDP) announcement (NDPA) frame announcing transmission of an NDP frame;
control the RF unit to receive the NDP frame;
control the RF unit to receive a trigger frame comprising resource allocation information related to a resource unit allocated to the STA:
generate feedback information including a downlink (DL) channel state by using the received NDP frame; and
control the RF unit to transmit a feedback frame comprising the generated feedback information by uplink (UL) multi-user (MU) transmission via the allocated resource unit,
wherein the feedback information is reported for each of a plurality of frequency granularities (FGs) with respect to a partial reception bandwidth of the received NDP frame,
wherein the partial reception bandwidth is a report target bandwidth,
wherein each of the plurality of FGs is a report unit, and
wherein each of the plurality of FGs has a smaller size than the partial reception bandwidth.

11. The STA of claim 10, wherein:
each of the plurality of FGs comprises at least one minimum FG (MFG); and
the at least one MFG is set as a 26-tone resource unit.

12. The STA of claim 11, wherein the reported feedback information corresponds to an average of signal to noise ratio (SNR) values reported for each of the at least one MFG with respect to the partial reception bandwidth.

13. The STA of claim 10, wherein each of the plurality of FGs is set as a 4-tone or 16-tone size.

14. The STA of claim 13, wherein the reported feedback information corresponds to a beamforming feedback matrix reported for each of the plurality of FGs with respect to the partial reception bandwidth.

15. The STA of claim 14, wherein the received NDPA frame includes size information of both the partial reception bandwidth and the plurality of FGs.

16. The STA of claim 11, wherein the received NDPA frame or the received trigger frame comprises FG indication information related to the at least one MFG.

17. The STA of claim 16, wherein the FG indication information comprises information related to an MFG located at a start point of a plurality of MFGs forming each of the plurality of FGs and an MFG located at an end point of the plurality of MFGs if the at least one MFG is continuously located in a frequency band.

18. The STA of claim 16, wherein the FG indication information comprises information related to a number of the at least one MFG.

* * * * *